`US010452189B2`

(12) United States Patent
Mizuhashi et al.

(10) Patent No.: US 10,452,189 B2
(45) Date of Patent: Oct. 22, 2019

(54) DISPLAY DEVICE

(71) Applicant: Japan Display Inc., Tokyo (JP)

(72) Inventors: Hiroshi Mizuhashi, Tokyo (JP); Hayato Kurasawa, Tokyo (JP); Daichi Suzuki, Tokyo (JP); Fumitaka Gotoh, Tokyo (JP); Makoto Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 128 days.

(21) Appl. No.: 15/078,126

(22) Filed: Mar. 23, 2016

(65) Prior Publication Data

US 2016/0291785 A1 Oct. 6, 2016

(30) Foreign Application Priority Data

Mar. 31, 2015 (JP) ................................ 2015-074216

(51) Int. Cl.
*G06F 3/044* (2006.01)
*G06F 3/041* (2006.01)
*G06F 3/046* (2006.01)
*G06F 3/0354* (2013.01)

(52) U.S. Cl.
CPC ........ *G06F 3/0416* (2013.01); *G06F 3/03545* (2013.01); *G06F 3/046* (2013.01); *G06F 3/0412* (2013.01); *G06F 2203/04108* (2013.01)

(58) Field of Classification Search
CPC combination set(s) only.
See application file for complete search history.

(56) References Cited

U.S. PATENT DOCUMENTS

2007/0124515 A1 5/2007 Ishikawa et al.
2010/0194698 A1* 8/2010 Hotelling .............. G06F 1/3218
 345/173

(Continued)

FOREIGN PATENT DOCUMENTS

CN 103927072 7/2014
JP H10-049301 2/1998
(Continued)

OTHER PUBLICATIONS

Chinese Office Action dated May 3, 2018 in corresponding Chinese Application No. 201610193193.6.

*Primary Examiner* — Temesghen Ghebretinsae
*Assistant Examiner* — Sosina Abebe
(74) *Attorney, Agent, or Firm* — K&L Gates LLP

(57) ABSTRACT

To provide a display device with a touch detection function capable of suppressing an increase of price.
The display device includes a pixel array that has a plurality of pixels disposed in a matrix form, a plurality of scan lines that are disposed in each row of the pixel array and supply a scan signal to the plurality of pixels disposed in each corresponding row, a plurality of signal lines that are disposed in each column of the pixel array and supply an image signal to the plurality of pixels disposed in each corresponding column, and a plurality of drive electrodes that are disposed in the pixel array and supply a drive signal to the plurality of pixels at a time of displaying an image. A coil that generates a magnetic field is formed using the plurality of drive electrodes at a time of detecting an external proximity object.

20 Claims, 32 Drawing Sheets

(56) References Cited

U.S. PATENT DOCUMENTS

| | | | | |
|---|---|---|---|---|
| 2010/0328249 | A1* | 12/2010 | Ningrat | G06F 3/044 345/174 |
| 2012/0169400 | A1* | 7/2012 | Liu | G06F 3/0416 327/517 |
| 2013/0106769 | A1* | 5/2013 | Bakken | G06F 3/044 345/174 |
| 2014/0002413 | A1* | 1/2014 | Kim | G06F 3/0416 345/174 |
| 2014/0078104 | A1* | 3/2014 | Lee | G06F 3/044 345/174 |
| 2014/0152621 | A1* | 6/2014 | Okayama | G06F 3/044 345/174 |
| 2015/0091856 | A1* | 4/2015 | Park | G06F 3/0416 345/174 |
| 2016/0041644 | A1* | 2/2016 | Bae | G06F 3/044 345/174 |
| 2016/0062532 | A1* | 3/2016 | Tahara | G06F 3/046 345/173 |

FOREIGN PATENT DOCUMENTS

| | | |
|---|---|---|
| JP | 2005-352572 | 12/2005 |
| JP | 2006-163745 | 6/2006 |

* cited by examiner

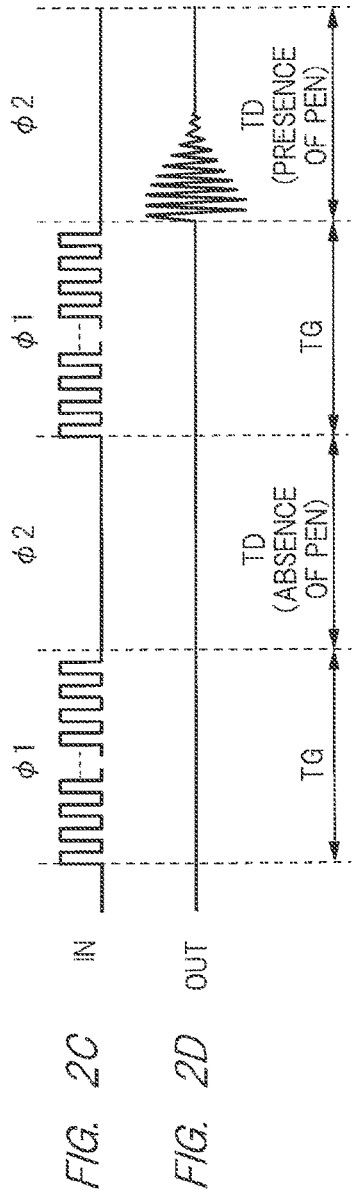

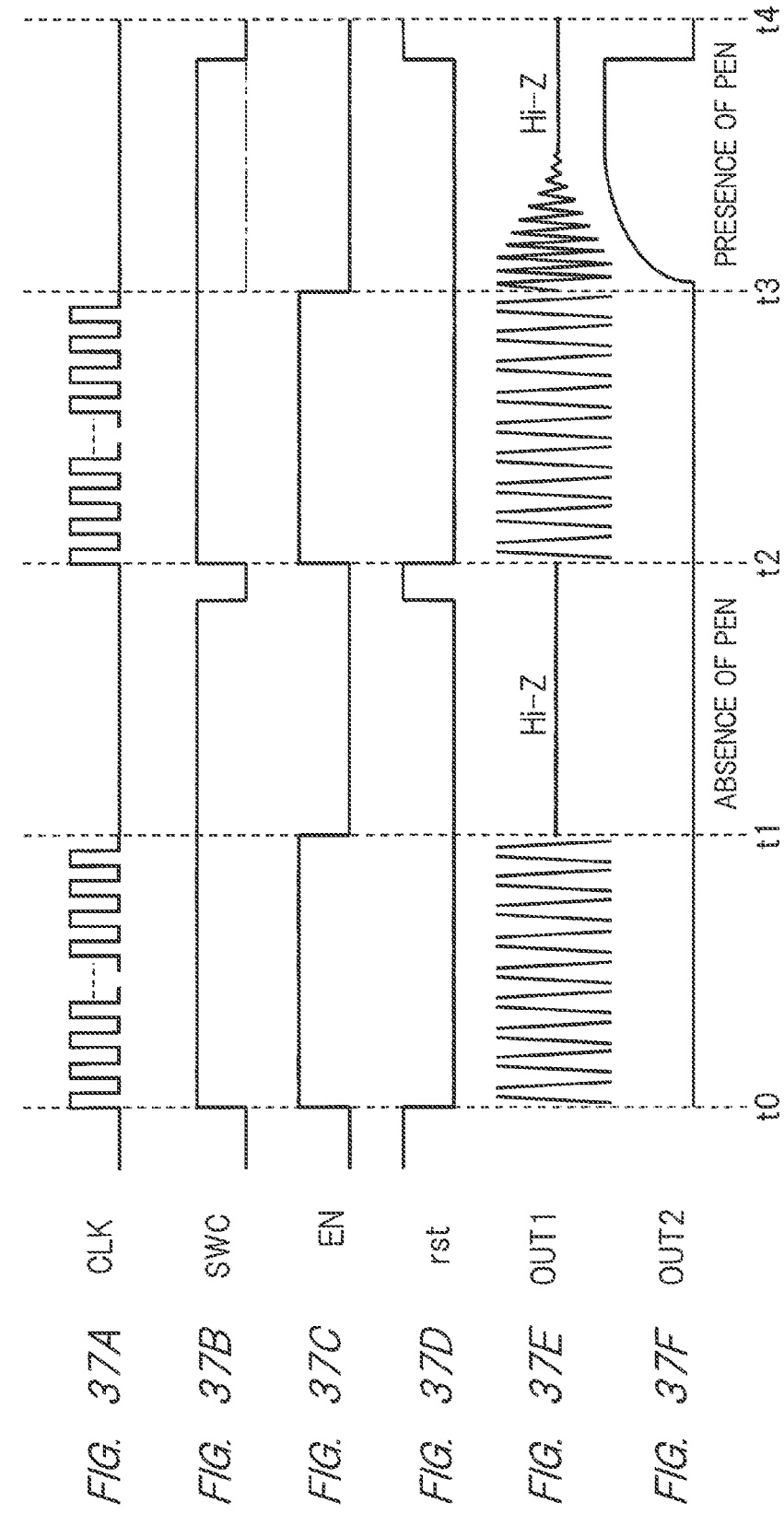

DISPLAY DEVICE

CROSS-REFERENCE TO RELATED APPLICATION

The present application claims priority from Japanese Patent Application No. 2015-074216 filed on Mar. 31, 2015, the content of which is hereby incorporated by reference into this application.

TECHNICAL FIELD OF THE INVENTION

The present invention relates to a display device, and particularly to a display device with a touch detection function capable of detecting an external proximity object.

BACKGROUND OF THE INVENTION

Recent years, a focus has been placed on a touch detection device capable of detecting an external proximity object which is a so-called a touch panel. The touch panel is mounted on a display device, for example, on a liquid crystal display device, or integrated with the liquid crystal display device, and provided as a display device with a touch detection function.

There is a touch panel capable of using a pen, for example, as the external proximity object. The use of pen makes designation of a small area or input of a handwritten character easier, for example. There are various types of techniques of detecting touch of the pen. One of such various types of techniques is an electromagnetic induction system. This electromagnetic induction system can realize high accuracy and highly accurate detection of writing pressure, and can also realize a function of hovering detection of the external proximity object being spaced apart from a touch panel surface, and thus, the technique is effective as the technique of detecting the touch of the pen.

A touch detection technique that uses the electromagnetic induction system is described in, for example, Japanese Patent Application Laid-Open Publication No. H10 (1998)-49301 (Patent Document 1), No. 2005-352572 (Patent Document 2), and No. 2006-163745 (Patent Document 3).

SUMMARY OF THE INVENTION

The electromagnetic induction systems include a system in which a coil and a battery are mounted to a pen, a magnetic field is generated by the pen, and the magnetic field energy is detected by a touch panel. In this case, a sensor plate to receive the magnetic field energy is required for the touch panel. In addition, there is another system in which a coil and a capacitor are mounted to a pen, a magnetic field is generated by a touch panel, and magnetic field energy is stored in the capacitor mounted to the pen and then is detected by the touch panel. In the case of this system, the magnetic field is generated by the touch panel, and a sensor plate to receive the magnetic field energy from the pen is required.

It is necessary to add the sensor plate in order to realize the display device with a touch detection function in any one of the electromagnetic induction systems, which leads an increase of price.

Patent Documents 1 to 3 illustrate a technique of forming a sensor plate using a scan line to select a pixel for display of an image, or a signal line for supplying an image signal to the pixel. However, a drive electrode to supply a drive signal to the pixel upon the display of the image is not considered in Patent Documents 1 to 3.

An object of the present invention is to provide a display device with a touch detection function capable of suppressing an increase of price (manufacturing cost).

A display device according to one aspect of the present invention is provided with a pixel array that has a plurality of pixels disposed in a matrix form, a plurality of scan lines that are disposed in each row of the pixel array and supply a scan signal to the plurality of pixels disposed in each corresponding row, a plurality of signal lines that are disposed in each column of the pixel array and supply an image signal to the plurality of pixels disposed in each corresponding column, and a plurality of drive electrodes that are disposed in the pixel array and supply a drive signal to the plurality of pixels at a time of displaying an image. Here, a coil that generates a magnetic field is formed using the plurality of drive electrodes at a time of detecting an external proximity object.

Further, a display device according to another aspect of the present invention is provided with a pixel array that has a plurality of pixels disposed in a matrix form, a plurality of scan lines that are disposed in each row of the pixel array and supply a scan signal to the plurality of pixels disposed in each corresponding row, a plurality of signal lines that are disposed in each column of the pixel array and supply an image signal to the plurality of pixels disposed in each corresponding column, and a plurality of drive electrodes that are disposed in the pixel array. Here, a display operation, which performs display according to an image signal by supplying a display drive signal to each of the plurality of drive electrodes, and a detection operation, which detects an external proximity object based on a magnetic field to be generated in a coil by forming a plurality of the coils using the plurality of drive electrodes and supplying a detection drive signal to the drive electrode, are alternately executed in one frame period.

BRIEF DESCRIPTIONS OF THE DRAWINGS

FIGS. 2A to 2D are explanatory diagrams illustrating a principle of an electromagnetic induction system;

FIGS. 37A to 37F are waveform diagrams illustrating operations of the tenth embodiment.

DETAILED DESCRIPTION

Figure 1:
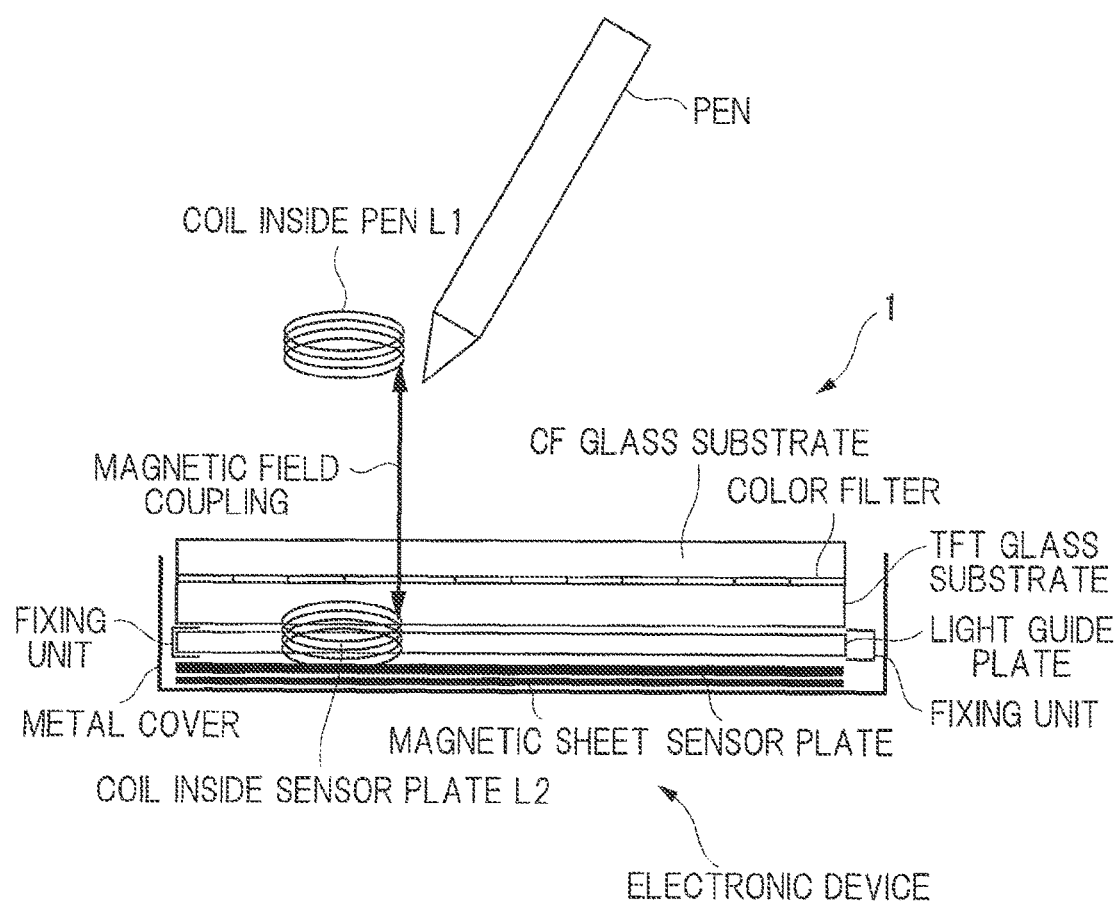
FIG. 1 is an explanatory diagram illustrating a relation between an electronic device having a liquid crystal display device with a touch detection function and a pen.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

The following description will be given by exemplifying a liquid crystal display device with a touch detection function as a display device with a touch detection function. However, the present invention is not limited thereto, and can be applied also to an OLED display device with a touch detection function. In addition, although there are the above-described two types of systems as electromagnetic induction systems, a description will be given regarding a case where the latter system that does not necessarily require a battery to be mounted to a pen is employed in the liquid crystal display device with a touch detection function according to embodiments. Since the battery may not be mounted to the pen, it is possible to reduce a size of the pen and/or to improve a degree of freedom in shape of the pen.

First Embodiment

<Basic Principle of Electromagnetic Induction System>

First, a basic principle of the electromagnetic induction system will be described. FIG. 1 is an explanatory diagram schematically illustrating a relation between an electronic device having the liquid crystal display device with a touch detection function and the pen. In addition, FIGS. 2A to 2D are explanatory diagrams schematically illustrating the basic principle of the electromagnetic induction system.

In FIG. 1, the electronic device has a liquid crystal display device 1 housed in a metal cover, a light guide plate, a sensor plate, and a magnetic sheet. In the example illustrated in FIG. 1, the sensor plate is mounted between the liquid crystal display device 1 and the metal cover. A plurality of coils are provided in this sensor plate. FIG. 1 schematically illustrates one coil, among the plurality of coils to be provided in the sensor plate, as a coil inside the sensor plate L2.

In addition, a coil and a capacitive element are built in the pen that corresponds to an external proximity object. FIG. 1 schematically illustrates the coil built in the pen as a coil inside the pen L1 (hereinafter, also referred to simply as the coil L1) although the capacitive element is not illustrated. The coil inside the pen L1 and the coil inside the sensor plate L2 (hereinafter, also referred to simply as the coil L2) are coupled by a magnetic field (magnetic field coupling).

Incidentally, a thin film transistor (TFT) glass substrate, a color filter and a color filter (CF) glass substrate, which are included in the liquid crystal display device 1, are drawn in FIG. 1 in order to schematically illustrate a structure of the liquid crystal display device 1. A TFT substrate is formed including the TFT glass substrate and a TFT (not illustrated), and a color filter substrate is formed including the CF glass substrate and the color filter. A liquid crystal layer (not illustrated) is sandwiched between the TFT substrate and the color filter substrate. In addition, the light guide plate is fixed at a fixing unit so as to be sandwiched between the liquid crystal display device 1 and the sensor plate.

When the pen is close to the electronic device, the coil inside the pen L1 becomes close to the coil inside the sensor plate L2. Accordingly, the magnetic field coupling is generated between the coil inside the pen L1 and the coil inside the sensor plate L2, and the proximity of the pen is detected.

Such detection will be described with reference to FIGS. 2A to 2D. FIG. 2A illustrates a state in which the coil L2 generates the magnetic field, and FIG. 2B illustrates a state in which the coil L1 generates the magnetic field.

In FIGS. 2A to 2D, the coil L2 and the capacitive element inside the pen (hereinafter, also referred to simply as the capacitive element) C are connected in parallel, thereby forming a resonant circuit. The coil L1 is illustrated by exemplifying a coil of a single-turn winding, and has a pair of terminals. At the time of detecting a touch (at the time of the touch detection), one terminal PT of the coil L1 is connected to an output of a transmission amplifier AP1 for a predetermined time, and is connected to an input of a reception amplifier AP2 for a predetermined time after elapse of a predetermined time. In addition, the other terminal of the coil L1 is connected to a ground voltage Vs at the time of the touch detection.

FIGS. 2C and 2D are waveform diagrams illustrating operations at the time of the touch detection. In FIGS. 2C and 2D, a horizontal axis represents time, FIG. 2C illustrates the waveform of the output of the transmission amplifier AP1, and FIG. 2D illustrates the waveform of an output of the reception amplifier AP2.

When the one terminal PT of the coil L2 is connected to the output of the transmission amplifier AP1, a transmission signal IN with periodically changing voltage is supplied to an input of the transmission amplifier AP1. Accordingly, the transmission amplifier AP1 supplies a drive signal $\phi 1$ with periodically changing voltage according to the change of the transmission signal IN, to the one terminal of the coil L2 for a predetermined time (magnetic field generation period) TG as illustrated in FIG. 2C. Accordingly, the coil L2 generates the magnetic field. A magnetic line at this time is indicated by $\phi G$ in FIG. 2A.

The magnetic line $\phi G$ is generated around a winding of the coil L2, and thus, a magnetic field at an inner side of the coil L2 is strong. When the coil L1 is close to the coil L2, and a central axis LO of the coil L1 is present at the inner side of the coil L2 as illustrated in FIG. 2A, for example, the magnetic line of the coil L2 reaches the coil L1. That is, the coil L1 is disposed inside the magnetic field to be generated by the coil L2, and the magnetic field coupling is formed between the coil L1 and the coil L2. The coil L2 generates the magnetic field with periodically changing voltage according to the change of the drive signal $\phi 1$. Thus, an inductive voltage is generated in the coil L1 according to a mutual induction action between the coil L2 and the coil L1. A capacitive element C is charged by the inductive voltage generated by the coil L1.

After elapse of the predetermined time, the one terminal PT of the coil L2 is connected to the input of the reception amplifier AP2 for a predetermined time (magnetic field detection period) TD. In the magnetic field detection period TD, the coil L1 generates the magnetic field by electric charge that has been charged in the capacitive element C if the capacitive element C has been already charged in the previous magnetic field generation period TG. FIG. 2B illustrates the magnetic line of the coil L1, generated by the electric charge that has been charged in the capacitive element C, using $\phi D$.

If the coil inside the pen L1 is close to the coil inside the sensor plate L2 at the time of the touch detection, that is, in the magnetic field generation period TG and the magnetic field detection period TD, the capacitive element C is charged in the magnetic field generation period TG, and the magnetic line $\phi D$ of the coil L1 reaches the coil L2 in the magnetic field detection period TD. Since the resonant circuit is configured of the coil L1 and the capacitive element C, the magnetic field generated by the coil L1 changes depending on a time constant of the resonant circuit. When the magnetic field to be generated by the coil L1 changes, an inductive voltage is generated in the coil L2. A signal (in other words, voltage) changes in the one terminal PT of the coil L2 due to the inductive voltage. Such a change of the signal is input to the reception amplifier AP2 as a detection signal $\phi 2$, is amplified, and then is output from the reception amplifier AP2 as a sensor signal OUT in the magnetic field detection period TD.

On the other hand, if the coil inside the pen L1 is not close to the coil inside the sensor plate L2 at the time of the touch detection, the capacitive element C is not charged or the charge amount to be charged is small in the magnetic field generation period TG. As a result, the magnetic line $\phi D$ of the magnetic field to be generated by the coil L1 does not reach the coil L2 in the magnetic field detection period TD. Thus, the detection signal $\phi 2$ in the one terminal PT of the coil L2 is not changed in the magnetic field detection period TD.

FIGS. 2C and 2D illustrate both the states in which the coil inside the pen L1 is close to and is not close to the coil inside the sensor plate L2. That is, in FIGS. 2C and 2D, $\phi 1$ and $\phi 2$ on the left side illustrate a state in which the coil L1 is not close to the coil L2, and $\phi 1$ and $\phi 2$ on the right side illustrate a state in which the coil L1 is close to the coil L2. Thus, in FIG. 2D, the detection signal $\phi 2$ does not change in the magnetic field detection period TD illustrated at the left side, but the detection signal $\phi 2$ changes in the magnetic field detection period TD illustrated at the right side. It is possible to detect the touch of the pen by determining a case where the detection signal $\phi 2$ changes as presence of the pen, and determining a case where the detection signal $\phi 2$ does not change as absence of the pen.

Although FIGS. 2A to 2D illustrate the determination on the presence of the pen or the absence of the pen, it is also possible to determine a distance between the pen and the sensor plate or a writing pressure of the pen, since a value of the detection signal $\phi 2$ changes depending on a distance between the coil L1 and the coil L2.

Incidentally, when the terminal PT of the coil L2 is switched from the output of the transmission amplifier AP1 to the input of the reception amplifier AP2, the terminal PT of the coil L2 is set to a floating state for a predetermined time until the energy stored in the coil inside the sensor plate L2 is discharged, and the terminal PT is connected to the input of the reception amplifier AP2 after elapse of the predetermined time.

In this manner, when the pen is present close to the coil inside the sensor plate L2 (including contact) during the touch detection period, an output signal of the reception amplifier AP2 changes in the magnetic field detection period TD. On the other hand, when the pen is not present close to the coil inside the sensor plate L2 (including contact), the output signal of the reception amplifier AP2 does not change in the magnetic field detection period TD. That is, it is possible to detect whether the pen touches or comes close to the coil inside the sensor plate L2 according to the output signal of the reception amplifier AP2. In addition, in a case where the coil inside the sensor plate L2 and the coil inside the pen L1 are close to each other, the magnetic field energy to be applied from the coil inside the pen L1 to the coil inside the sensor plate L2 changes depending on the distance therebetween. Thus, it is also possible to determine the writing pressure of the pen from the value of the output signal of the reception amplifier AP2.

<Integrated Structure of Liquid Crystal Display Device and Sensor Plate>

The inventors of the present application have considered that the electronic device becomes expensive since the sensor plate is expensive in a case where the liquid crystal display device 1 and the sensor plate are separately prepared as illustrated in FIG. 1. Thus, the inventors have considered integration of the liquid crystal display device and the sensor plate by forming the sensor plate using a conductive layer (layer) inside the liquid crystal display device 1. A description will be given regarding the liquid crystal display device considered by the inventors with reference to FIGS. 3A to 3C.

Figure 3A:
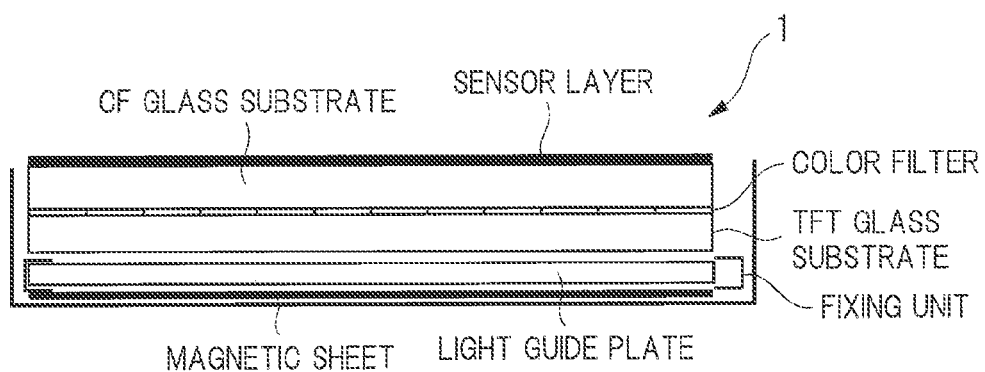
FIGS. 3A to 3C are cross-sectional views illustrating cross-sections of the liquid crystal display device.
Figure 3B:
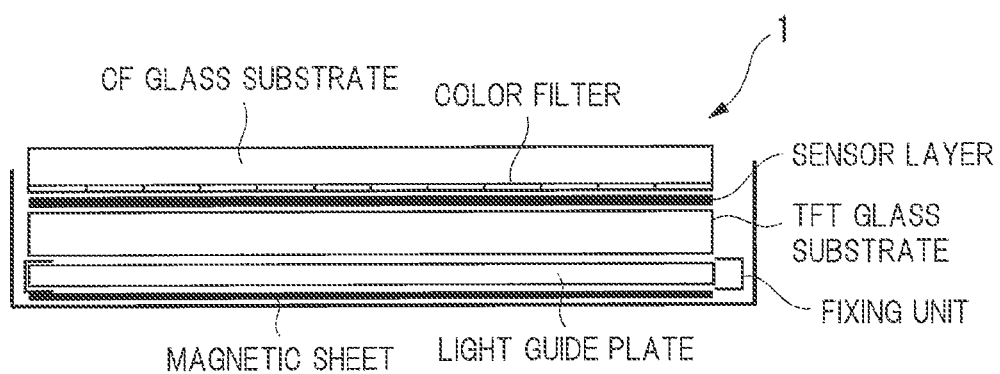
Figure 3C:
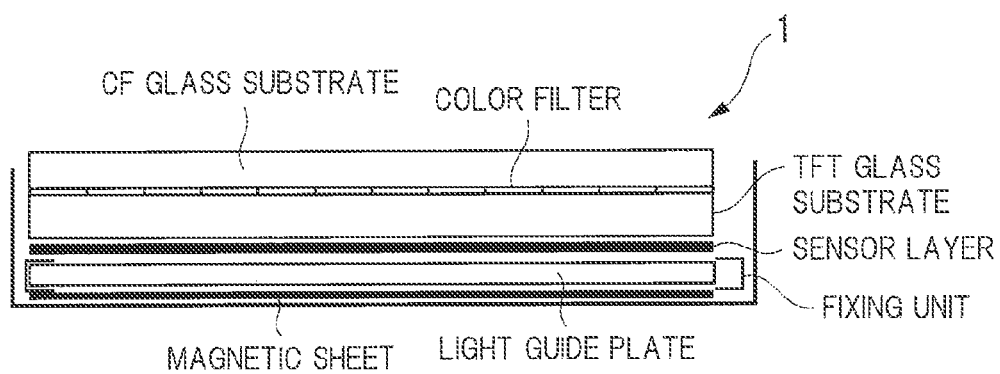

FIGS. 3A to 3C are cross-sectional views illustrating schematic cross-sections of the liquid crystal display device 1 to be integrated with the sensor plate as a sensor layer (layer). FIGS. 3A to 3C are similar to FIG. 1, and thus, differences will be mainly described. FIG. 3A is the cross-sectional view in a case where the sensor layer functioning as the sensor plate is formed on the CF glass substrate. FIG. 3B is the cross-sectional view in a case where the sensor layer is formed on the TFT glass substrate. In addition, FIG. 3C is the cross-sectional view in a case where the sensor layer is formed on a rear surface of the TFT glass substrate. In FIG. 1, the sensor plate is prepared in addition to the liquid crystal display device 1, and the sensor plate is provided between the light guide plate and the magnetic sheet. In contrast, the sensor layer corresponding to the sensor plate is provided in the liquid crystal display device 1 in FIGS. 3A to 3C, and thus, it is possible to suppress the increase of price.

Figure 4:
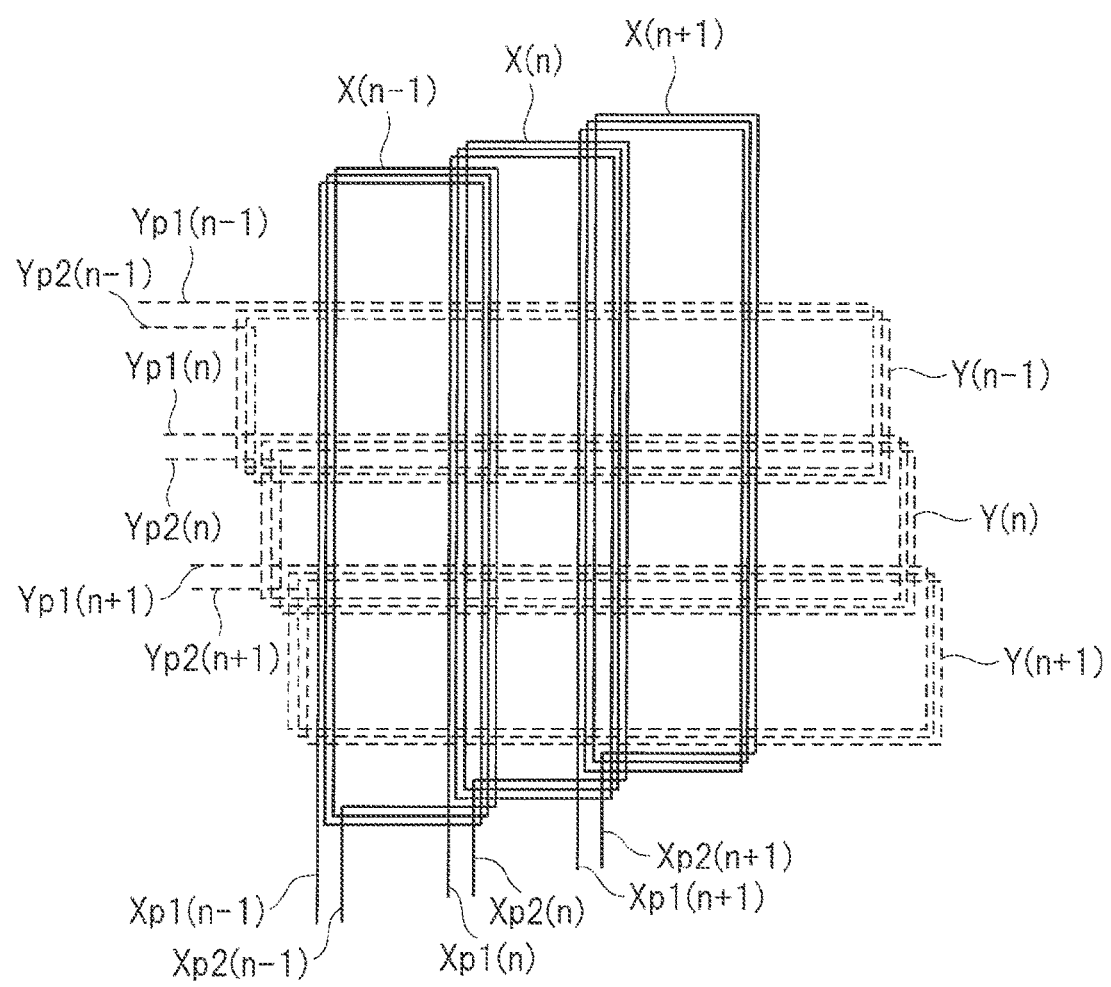
FIG. 4 is a plan view illustrating a configuration of a sensor layer.

FIG. 4 is a plan view illustrating a configuration of the sensor layer to be formed in FIGS. 3A to 3C. The sensor layer is provided with a plurality of coils which are disposed in a matrix form. That is, the sensor layer is provided with a plurality of coils X(0) to X(p), which extend in a vertical direction and are arranged in a horizontal direction, and a plurality of coils Y(0) to Y(p), which extend in the horizontal direction and are arranged in the vertical direction, in FIG. 4. FIG. 4 illustrates coils X(n−1) to X(n+1) and coils Y(n−1) to Y(n+1) among the plurality of coils. In the example illustrated in FIG. 4, each of the coils is provided as a coil of a multiple-turn winding (a three-turn winding in FIG. 4).

The coils X(0) to X(p) are formed such that an overlapping part is caused between the coils, adjacent to each other, in the coils X(0) to X(p) disposed in each column. When the coils X(n) to X(n+1) illustrated in FIG. 4 are exemplified, the coil X(n) is adjacent to the coils X(n−1) and X(n+1), and a part of the coil X(n) overlaps each part of the coil X(n−1) and the coil X(n+1). That is, the coils are formed such that each part of the winding of the coils X(n−1) and X(n+1) is disposed at an inner side of the winding of the coil X(n). As a matter of course, the coils X(0) to X(p) are formed so as not to be electrically in contact with each other. Each of the coils X(0) to X(p) has a pair of end portions, and a drive signal with a periodically changing voltage value is supplied to one-side end portions Xp1(0) to Xp1(p) among the respective pairs of end portions in the magnetic field generation period during the touch detection period. Meanwhile, a change of the voltage in the one-side end portions Xp1(0) to Xp1(p) is detected in the magnetic field detection period during the touch detection period.

In addition, a predetermined voltage (for example, the ground voltage Vs) is supplied to the other-side end portions Xp2(0) to Xp1(p) of the coils X(0) to X(p) during the touch detection period. It is possible to detect whether the pen touches or comes close to the coils X(0) to X(p), as illustrated in FIGS. 2A to 2D, by detecting whether the voltage changes in the one-side end portions Xp1(0) to Xp1(p) of the coils X(0) to X(p) in the magnetic field detection period during the touch detection period.

The coils Y(0) to Y(p) disposed in each row are the same as the coils X(0) to X(p). That is, the coils Y(0) to Y(p) are formed such that an overlapping part is caused between the coils adjacent to each other. As a matter of course, the coils Y(0) to Y(p) are disposed so as not to be electrically in contact with each other. The drive signal with a periodically changing voltage value is supplied to end portions Yp1(0) to Yp1(p) of the coils Y(0) to Y(p) in the magnetic field generation period during the touch detection period. On the other hand, the change of the voltage in the end portions Yp1(0) to Yp1(p) is detected in the magnetic field detection period during the touch detection period. In addition, a predetermined voltage (for example, the ground voltage Vs) is supplied to end portions Yp2(0) to Yp2(p) of the coils Y(0) to Y(p) during the touch detection period. Accordingly, it is possible to detect whether the pen touches or comes close to the coils Y(0) to Y(p), as illustrated in FIGS. 2A to 2D, by detecting whether the voltage changes in the end portions Yp1(0) to Yp1(p) of the coils Y(0) to Y(p) in the magnetic field detection period during the touch detection period.

The coils X(0) to X(p) and the coils Y(0) to Y(p) are disposed so as to intersect with each other. Thus, it is possible to obtain a coordinate of a touched position by the pen by detecting that the pen touches or comes close to the coils X(0) to X(p), and detecting that the pen touches or comes close to the coils Y(0) to Y(p). Incidentally, although the coils X(0) to X(p) and the coils Y(0) to Y(p) are disposed so as to intersect with each other, there is an insulator between the coils X(0) to X(p) and the coils Y(0) to Y(p) so as to prevent an electrical contact therebetween.

Accordingly, it is possible to provide the liquid crystal display device capable of detecting the touch of the pen without using the sensor plate.

In the liquid crystal display device 1, a scan line, a signal wiring and a drive electrode, each of which will be described later, are formed between the TFT glass substrate and the color filter. These wirings (the scan line, the signal wiring and the drive electrode) are used at the time of display of an image, but it is possible to achieve the structure illustrated in FIG. 3B without adding the sensor layer by forming the coils X(0) to X(p) and/or the coils Y(0) to Y(p) using those wirings at the time of performing the touch detection. Accordingly, it is possible to provide the liquid crystal display device 1 with the touch detection function while suppressing the increase of the price of the liquid crystal display device 1. Hereinafter, a description will be given regarding a mode in a case where the sensor layer is provided on the TFT glass substrate as illustrated in FIG. 3B.

<Structure of Liquid Crystal Display Device>

Figure 5:
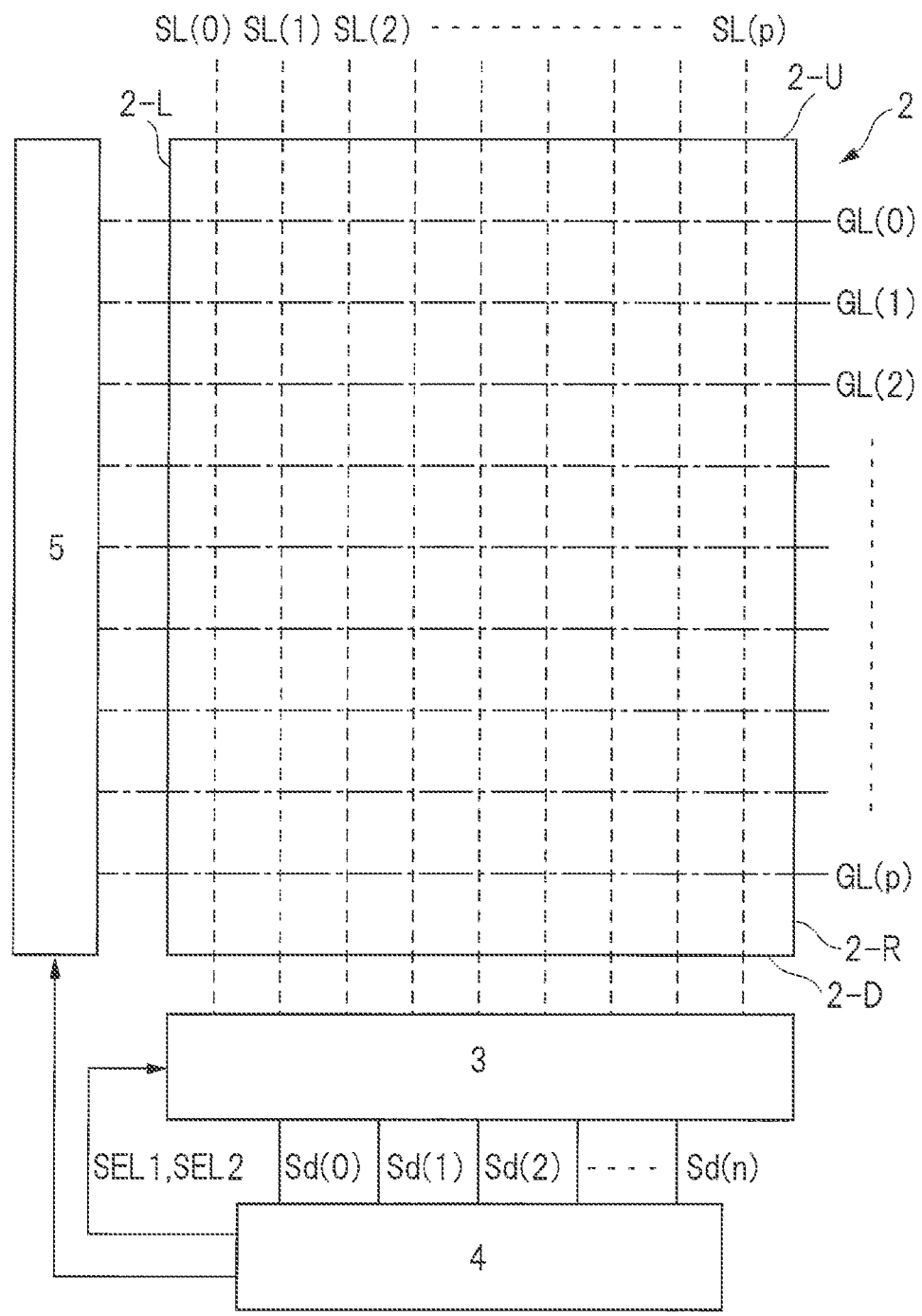
FIG. 5 is a plan view illustrating a plane of a liquid crystal display device according to a first embodiment.

First, a description will be given regarding the structure of the liquid crystal display device 1. FIG. 5 is a plan view schematically illustrating a configuration of the liquid crystal display device 1. In FIG. 5, reference numeral 2 represents a display panel (a liquid crystal panel). The display panel 2 is provided with a plurality of signal lines SL(0) to SL(p), which extend in the vertical direction and are disposed in parallel in the horizontal direction, and a plurality of scan lines GL(0) to GL(p), which extend in the horizontal direction and are disposed in parallel in the vertical direction, in FIG. 5. A liquid crystal display element (pixel) is disposed in each intersection between the signal lines SL(0) to SL(p) and the scan lines GL(0) to GL(p) which will be described later. The pixel has a selection terminal and a pair of terminals which will be described later. The selection terminal of the pixel disposed in the intersection is connected to the scan line in the intersection, and one terminal between the pair of terminals is connected to the signal line in the intersection. In addition, the other terminal of the pixel is connected to the drive electrode (not illustrated).

Incidentally, the signal lines SL(0) to SL(p) are indicated by the broken lines, and the scan lines GL(0) to GL(p) are indicated by the alternate long and short dash lines in FIG. 5. In addition, the signal line and the scan line intersect with each other, but are electrically separated from each other.

"To be parallel", the expression used in this specification, means to extend without crossing each other from one end to the other end. Thus, a state, in which two lines do not cross each other from one end to the other end even when a part or the entire part of one line is provided in the state of being inclined with respect to the other line, is also expressed "to be parallel" in this specification.

In FIG. 5, reference numeral 3 represents a signal line selector, reference numeral 4 represents a display control device, and reference numeral 5 represents a gate driver (scan line driving circuit).

The display control device 4 supplies an image signal which needs to be displayed to the signal line selector 3 in a time division manner at the time of performing display of the image. FIG. 5 illustrates signal wirings Sd(0) to Sd(n) as a signal wiring that supplies the image signal from the display control device 4 to the signal line selector 3. When a description is given by exemplifying the signal wiring Sd(0), the display control device 4 supplies an image signal, which needs to be supplied to a specific signal line, to the signal wiring Sd(0) at a first timing, and supplies an image signal which needs to be supplied to another signal line at a subsequent timing (second timing). That is, the image signal is supplied to the signal line selector 3 using the signal wiring Sd(0) in the time division manner. In the same manner, the image signal is supplied to the signal line selector 3 in the time division manner with respect to the remaining signal wirings Sd(1) to Sd(n). The display control device 4 notifies the signal line selector 3 of the first timing and the second timing described above using selection signals SEL1 and SEL2.

The signal line selector 3 is disposed in the vicinity of the display panel 2, and receives the image signal via the signal wirings Sd(0) to SD(n) in the time division manner. The signal line selector 3 supplies the image signal to any suitable one of the signal lines SL(0) to SL(p) based on the first timing and the second timing notified by the selection signals SEL1 and SEL2. That is, when the signal wiring Sd(0) is exemplified, the signal line selector 3 supplies the image signal in the signal wiring Sd(0) to the above-described specific signal line in a case where the first timing is notified by the selection signals SEL1 and SEL2. On the other hand, the signal line selector 3 supplies the image signal in the signal wiring Sd(0) to the above-described another signal line in a case where the second timing is notified by the selection signals SEL1 and SEL2. The same applies to the remaining signal wirings Sd(1) to Sd(n).

In this manner, it is possible to reduce the number of wirings between the display control device 4 and the signal line selector. When the number of wirings is reduced, it is possible to thicken a width of the wiring and to reduce a delay of the image signal. In addition, in a case where the display control device 4 is configured using a semiconductor integrated circuit device (hereinafter, also referred to as a semiconductor device), it is possible to reduce the number of terminals of the semiconductor device that configure the display control device 4 by reducing the number of wirings.

The gate driver 5 forms a scan line signal according to a timing signal from the display control device 4 at the time of performing the display of the image, and supplies the scan line signal to the scan lines (gate lines) GL(0) to GL(p). For example, the gate driver 5 forms the scan line signals which sequentially become a high level from the scan line GL(0) to the scan line GL(p) at the time of performing the display.

The drive electrode of a touch sensor operates as a common electrode of the pixels at the time of the display of the image. When the scan line signal of the high level is supplied to the scan line GL(0) in the display of the image, pixels provided in the intersections between the scan line GL(0) and each of the signal lines SL(0) to SL(p) are selected. The image signal is supplied to the selected pixels via the signal lines SL(0) to SL(p). The selected pixels perform display according to a difference between a voltage of the image signal supplied to a pixel electrode and a voltage of the common electrode (drive electrode). In this manner, the pixel is sequentially selected when the scan line signal sequentially becomes the high level from the scan line GL(0) to the scan line GL(p), and accordingly, the display is performed according to the difference between the voltage of the image signal supplied via the signal lines SL(0) to SL(p) and the voltage of the common electrode (drive electrode) at this time. Incidentally, the gate driver 5 outputs a pulsed signal as the scan line signal such that two scan lines does not become the high levels at the same time.

The drive electrode is disposed in the display panel 2, although not illustrated in FIG. 5. A predetermined voltage (first voltage), for example, the ground voltage Vs, is supplied to the common electrode (drive electrode) at the time of performing the display of the image. The voltage to be supplied to the common electrode (drive electrode) is not limited to the ground voltage Vs. The voltage to be supplied to the common electrode is not necessarily a fixed voltage, but may be a voltage that is changed according to a voltage of the image signal. That is, the above-described first voltage is not necessarily a fixed voltage, but may be a variable voltage that is changed according to the image signal.

In FIG. 5, an area in which the pixel is disposed in the display panel 2 is active (active area) or a display area, in the viewpoint of display. Further, an area except for the display panel 2 is not active (inactive area) or a peripheral area, in the viewpoint of display. In addition, 2-U represents a short side of the display panel 2 and 2-D represents another short side of the display panel 2 which opposes the side 2-U in FIG. 5. Similarly, 2-L represents a long side of the display panel 2, and 2-R represents another long side of the display panel 2 which opposes the long side 2-L. The active area is surrounded by the short sides 2-U and 2-D and the long sides 2-L and 2-R.

Figure 6:
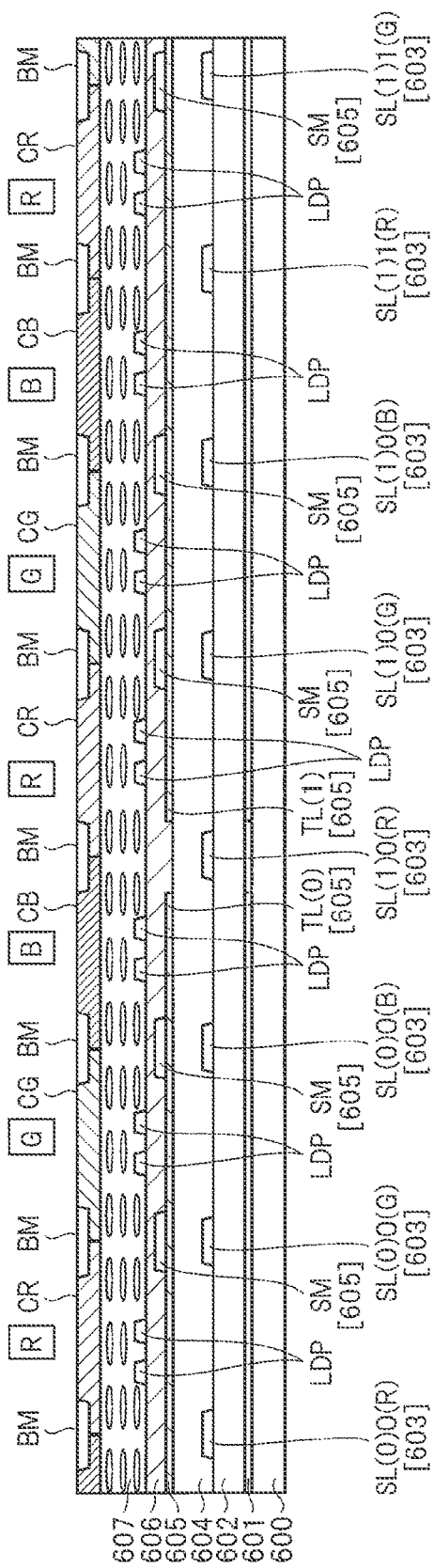
FIG. 6 is a cross-sectional view illustrating a cross-section of a display panel according to the first embodiment.

FIG. 6 is a cross-sectional view illustrating a cross-section of the active area and, for example, the cross-sectional view illustrating a cross-section A-A' inside the active area to be described later with reference to FIG. 8. The drive electrode is divided in plural, which will be described later with reference to FIG. 8. That is, the display panel 2 is provided with a plurality of drive electrodes TL(0) to TL(p). Here, the drive electrodes TL(0) to TL(p) correspond to the plurality of signal lines, respectively. Although the signal line has been described as the signal lines SL(0) to SL(p) in FIG. 5, a signal line SL(0) corresponds to the drive electrode TL(0) and the signal line SL(1) corresponds to the drive electrode TL(1). Hereinafter, the signal lines SL(2) to SL(p) correspond to the drive electrodes TL(2) to TL(p), respectively, in the same manner.

In addition, each of the signal lines SL(0) to SL(p) illustrates the plurality of signal lines collectively as one signal line. Further, the display panel 2 performs color display, and thus, the image signals to be supplied from the display control device 4 to the signal line selector 3 include image signals of R (red), G (green) and B (blue), which correspond to three primary colors, and the signal lines include some signal lines to transmit the image signals corresponding to the three primary colors to the corresponding pixel. But, the image signal is not limited to the signals of the three primary colors, but may be a signal of any color among R (red), G (green), B (blue), C (cyan), M (magenta), Y (yellow) and W (white).

A description will be given regarding a description method of the signal line to be used in this specification prior to describing a structure of the active area with reference to FIG. 6. FIG. 6 illustrates the two drive electrodes TL(0) and TL(1) and signal lines SL(0)0(R), SL(0)0(G), SL(0)0(B)(1), SL(1)0(R), SL(1)0(G) and SL(1)0(B). First, when a description is given by exemplifying the signal line SL(0)0(R) and the signal line SL(1)0(R), a number inside the first parentheses represents a number of a corresponding drive electrode, the next number represents a number of a pixel of the corresponding drive electrode, and an alphabetical character inside the parentheses represents one of the three primary colors (R, G and B) of the pixel. That is, the signal line SL(0)0(R) represents a signal line that corresponds to the drive electrode TL(0), the signal line that transmits an image signal corresponding to red among the three primary colors in a zeroth pixel. Similarly, the signal line SL(1)0(R) represents a signal line that corresponds to the drive electrode TL(1), which is disposed next to the drive electrode TL(0), the signal line that transmits an image signal corresponding to red among the three primary colors in a zeroth pixel.

Thus, signal lines SL(1)1(R) and SL(1)1(G) illustrated in FIG. 6 indicate signal lines that correspond to the drive electrode TL(1), the signal lines that transmits image signals corresponding to red and green, respectively, among the three primary colors of a first pixel. In addition, in FIG. 6, a number inside the brackets represents a wiring layer to be described next. Next, a description will be given regarding the structure of the active area with reference to FIG. 6.

In FIG. 6, reference numeral 600 represents a TFT glass substrate. A first wiring layer (metal wiring layer) 601 is formed in the TFT glass substrate 600. The scan line GL(p) is configured using a wiring formed in the first wiring layer 601. An insulating layer 602 is formed on the first wiring layer 601, and second wiring layers (metal wiring layers) 603 are formed on the insulating layer 602. The signal lines SL(0)0(R), SL(0)0(G), SL(0)0(B)(1), SL(1)0(R), SL(1)0(G) and SL(1)0(B) are configured using wirings formed in the second wiring layers 603. In FIG. 6, reference numeral 603 that represents the second wiring layer is described in the brackets subsequently to each reference numeral of the signal lines in order to illustrate that those signal lines are configured using the second wiring layers 603. For example, the signal line SL(0)0(G) is illustrated as SL(0)0(G)[603].

An insulating layer 604 is formed on the second wiring layers 603, and third wiring layers (metal wiring layers) 605 are formed on the insulating layer 604. The drive electrodes TL(0) and TL(1) and an auxiliary electrode SM are configured using wirings formed in the third wiring layers 605.

Here, the drive electrodes TL(0) and TL(1) are transparent electrodes (first electrodes). In addition, the auxiliary electrode SM (second electrode) is formed so as to be electrically connected to the drive electrodes TL(0) and TL(1). The auxiliary electrode SM has a smaller resistance value than the transparent electrode. Each resistance value of the drive electrodes TL(0) and TL(1) serving as the transparent electrode is relatively high, but it is possible to reduce the resistance of the drive electrodes by combined resistance when the auxiliary electrode SM is electrically connected to the drive electrodes TL(0) and TL(1). Here, similarly above, [605] attached to each reference numeral of the drive electrode and the auxiliary electrode represents being formed in the third wiring layers 605.

An insulating layer 606 is formed on the third wiring layer 605, and pixel electrodes LDP are formed on an upper surface of the insulating layer 606. In FIG. 6, CR, CB and CG represent the color filters. A liquid crystal layer 607 is sandwiched between each of the color filters CR (red), CG (green) and CB (blue) and the insulating layer 606. Here, the pixel electrode LDP is provided at an intersection point between the scan line and the signal line, and the color filter CR, CG or CB, which corresponds to each of the pixel electrodes LDP, is provided above each of the pixel electrodes LDP. Black matrixes BM are provided between the respective color filters CR, CG and CB.

In addition, the CF glass substrate is formed on the color filters CR, CG and CB as illustrated in FIG. 3B, although not illustrated in FIG. 6.

<Pixel Array>

Figure 7:
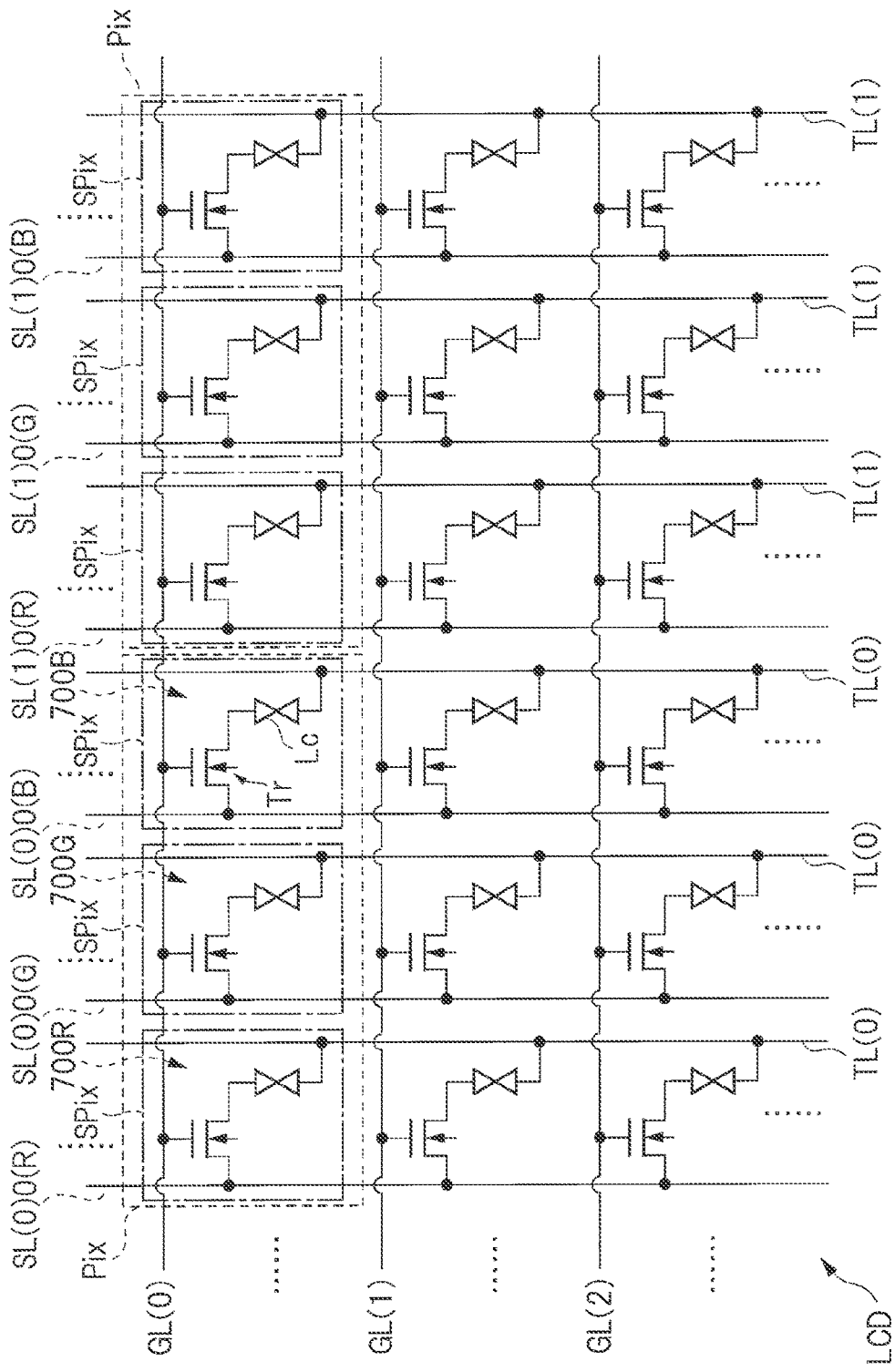
FIG. 7 is a circuit diagram illustrating a circuit configuration of the display panel according to the first embodiment.

Next, a description will be given regarding a circuit configuration of the display panel 2. FIG. 7 is a circuit diagram illustrating the circuit configuration of the display panel 2 illustrated in FIG. 5. In FIG. 7, each of a plurality of pixels SPix, indicated by the alternate long and short dash lines, represents one liquid crystal display element (pixel). The pixels SPix are disposed in a matrix form in the display panel 2 to form a liquid crystal element array (pixel array) LCD. The pixel array LCD is provided with the plurality of scan lines GL(0) to GL(p), which are disposed in each row and extend in a row direction, and the signal lines SL(0)0 (R), SL(0)0(G), SL(0)0(B) to SL(p)p(R), SL(p)p(G) and SL(p)p(B) which are disposed in each column and extend in a column direction. In addition, the pixel array LCD has the drive electrodes TL(0) to TL(p) which are disposed in each column and extend in the column direction. FIG. 7 illustrates a part of the pixel array in relation to the scan lines GL(0) to GL(2), the signal lines SL(0)0(R), SL(0)0(G), SL(0)0(B) to SL(1)0(R), SL(1)0(G) and SL(1)0(B), and the drive electrodes TL(0) and TL(1).

Although the drive electrodes TL(0) and TL(1) are illustrated in FIG. 7 to be disposed in each column in order to facilitate the description, it should be understood that one drive electrode is disposed with respect to the plurality of signal lines as described in FIG. 6. As a matter of course, the drive electrode may be disposed in each column of the pixel array LCD as illustrated in FIG. 7.

Each of the pixels SPix disposed at the intersection points between the rows and the columns of the pixel array LCD is provided with a thin film transistor Tr formed in a TFT glass substrate 300, and a liquid crystal element LC of which one terminal is connected to a source of the thin film transistor Tr. Gates of the thin film transistors Tr of the plurality of pixels SPix disposed in the same row are connected to the scan line disposed in the same row in the pixel array LCD, and drains of the thin film transistors Tr of the plurality of pixels SPix disposed in the same column are connected to the signal line disposed in the same column. In other words, the plurality of pixels SPix are disposed in a matrix form, and the scan line is disposed in each row, and the plurality of pixels SPix, disposed in the corresponding row, are connected to the scan line. In addition, the signal line is disposed in each column, and the pixels SPix disposed in the corresponding column are connected to the signal line. In addition, the other end of the liquid crystal element LC of each of the plurality of pixels SPix disposed in the same column is connected to the drive electrode disposed in the column.

When a description is given with the example illustrated in FIG. 7, the gates of the respective thin film transistors Tr of the plurality of liquid crystal display elements SPix disposed in the uppermost row are connected to the scan line GL(0) disposed in the uppermost row in FIG. 7. In addition, the drains of the respective thin film transistors Tr of the plurality of liquid crystal display elements SPix disposed in the leftmost column are connected to the signal line SL(0)0(R) disposed in the leftmost column in FIG. 7. In addition, the other ends of the respective liquid crystal elements of the plurality of liquid crystal display elements SPix disposed in the leftmost column are connected to the drive electrode TL(0) disposed in the leftmost side in FIG. 6. As described above, one drive electrode corresponds to the plurality of signal lines. Thus, it is also possible to use the drive electrode TL(0) as a common drive electrode with respect to three columns, in the example illustrated in FIG. 7.

The one pixel SPix described above corresponds to one subpixel. Accordingly, subpixels of the three primary colors of R, G and B are configured by the three pixels SPix. In FIG. 7, one pixel Pix includes three sub-pixels SPix which are successively disposed in the same row, and the color is expressed by the pixel Pix. That is, in FIG. 7, the pixel SPix to be represented by 700R is a subpixel SPix(R) of R (red), the pixel SPix to be represented by 700G is a subpixel SPix(G) of G (green), and the pixel SPix to be represented by 700B is a subpixel SPix(B) of B (blue). Thus, the color filter CR of red is provided as the color filter in the subpixel SPix(R) to be represented by 700R, the color filter CG of green is provided as the color filter in the subpixel SPix(G) of 700G, and the color filter CB of blue is provided as the color filter in the subpixel SPix(B) of 700B.

In addition, an image signal corresponding to R among signals indicating one pixel is supplied from the signal line selector 3 to the signal line SL(0)0(R), an image signal corresponding to G is supplied from the signal line selector 3 to the signal line SL(0)0(G), and an image signal corresponding to B is supplied from the signal line selector 3 to the signal line SL(0)0(B).

The thin film transistor Tr of each of the pixels SPix is an n-channel field-effect transistor (hereinafter, also referred to as an MOSFET), although not particularly limited thereto. The pulsed scan line signals are supplied from the gate driver 5 (FIG. 5) to the scan lines GL(0) to GL(p), for example, the signals becoming sequentially the high level in this order. That is, each voltage of the scan lines becomes sequentially the high level from the scan line GL(0) disposed at an upper row toward the scan line GL(p) disposed at a lower row in the pixel array LCD. Accordingly, the thin film transistors Tr of the pixels SPix become sequentially a conduction state from the pixel SPix disposed at the upper row toward the pixel SPix disposed at the lower row in the pixel array LCD.

As the thin film transistors Tr become the conduction states, the image signal to be supplied in the signal line at this time is supplied to the liquid crystal element LC via the thin film transistor in the conduction state. An electric field of the liquid crystal element LC is changed depending on a voltage difference between a voltage of the display drive signal to be supplied to the drive electrodes TL(0) and TL(1) and a voltage of the supplied image signal, and modulation of light passing through the liquid crystal element LC is changed. Accordingly, in synchronization with the scan line signals to be supplied to the scan lines GL(0) to GL(p), a color image according to the image signals supplied to the signal line SL(0)0(R), SL(0)0(G), SL(0)0(B) to SL(p)p(R), SL(p)p(G) and SL(p)p(B) is displayed on the display panel 2.

The plurality of pixels SPix have the selection terminal and the pair of terminals. In this case, the gate of the thin film transistor Tr forming the pixel SPix is the selection terminal of the pixel SPix, the drain of the thin film transistor Tr is one terminal between the pair of terminals, and the other end of the liquid crystal element LC is the other terminal of the pixel SPix.

Here, a description will be described regarding a correspondence between a disposition of the display panel 2 illustrated in FIG. 5 and the circuit diagram illustrated in FIG. 7 as follows.

The pixel array LCD has a pair of sides which is substantially parallel with the row of the array, and a pair of sides which is substantially parallel with the column of the array. The pair of sides which is parallel with the row of the pixel array LCD is a first side and a second side corresponding to the short sides 2-U and 2-D of the display panel 2 illustrated in FIG. 5, and the pair of sides which is parallel with the column of the pixel array LCD is a third side and a fourth side corresponding to the long sides 2-L and 2-R of the display panel 2.

As illustrated in FIG. 5, the signal line selector 3 and the display control device 4 are disposed along the second side between the pair of sides which is parallel with the row of the pixel array LCD, that is, the one short side 2-D of the display panel 2. In the pixel array LCD, the image signal from the display control device 4 is supplied to the signal lines SL(0)0(R), SL(0)0(G), SL(0)0(B) to SL(p)p(R), SL(p)p(G) and SL(p)p(B) via the signal line selector 3 on the second side (the short side 2-D of the display panel 2).

In addition, the gate driver 5 is disposed along the third side between the pair of sides (the third side and the fourth side) which is parallel with the column of the pixel array LCD, that is, the long side 2-L of the display panel 2. In the pixel array LCD, the scan line signal from the gate driver 5 is supplied to the scan lines GL(0) to GL(p) on the third side. Although the gate driver 5 is disposed along the long side 2-L of the display panel 2 in FIG. 5, the gate driver 5 may be divided into two to be disposed respectively along the long side 2-L (the third side of the pixel array LCD) and the long side 2-R (the fourth side of the pixel array LCD).

Although the description has been given regarding a case where the number of the subpixels configuring the one pixel is three, the invention is not limited thereto. For example, one pixel may be configured of subpixels including white (W) or yellow (Y) in addition to the above-described colors of RGB, or additionally including any one or a plurality of colors of complementary colors (cyan (C), magenta (M) and yellow (Y)) of RGB.

<Description of Reference Numerals of Drawings>

Next, a description will be given regarding a layout of a liquid crystal display device according to a first embodiment with reference to FIG. 8. In addition, a description will be given regarding a layout of a liquid crystal display device according to a second embodiment with reference to FIG. 12 later, and a description will be given regarding a liquid crystal display device according to a third embodiment with reference to FIG. 16. Further, a description will be given regarding a layout of a liquid crystal display device according to a fourth embodiment later with reference to FIG. 20, a description will be given regarding a liquid crystal display device according to a fifth embodiment with reference to FIG. 23, and a description will be given regarding a liquid crystal display device according to a sixth embodiment with reference to FIG. 29.

These drawings are complicated for detailed descriptions of each layout. Thus, reference numerals are simplified in these drawings to allow easy viewing of the drawings. Here, each correspondence between simplified reference numerals to be used in the drawings (FIGS. 8, 12, 16, 20, 23 and 29), which illustrate the layouts, and terms to be used in this specification will be illustrated. Incidentally, the terms corresponding to the reference numerals will be described when the respective drawings are described, and thus, the descriptions thereof will be omitted here.

Figure 8:
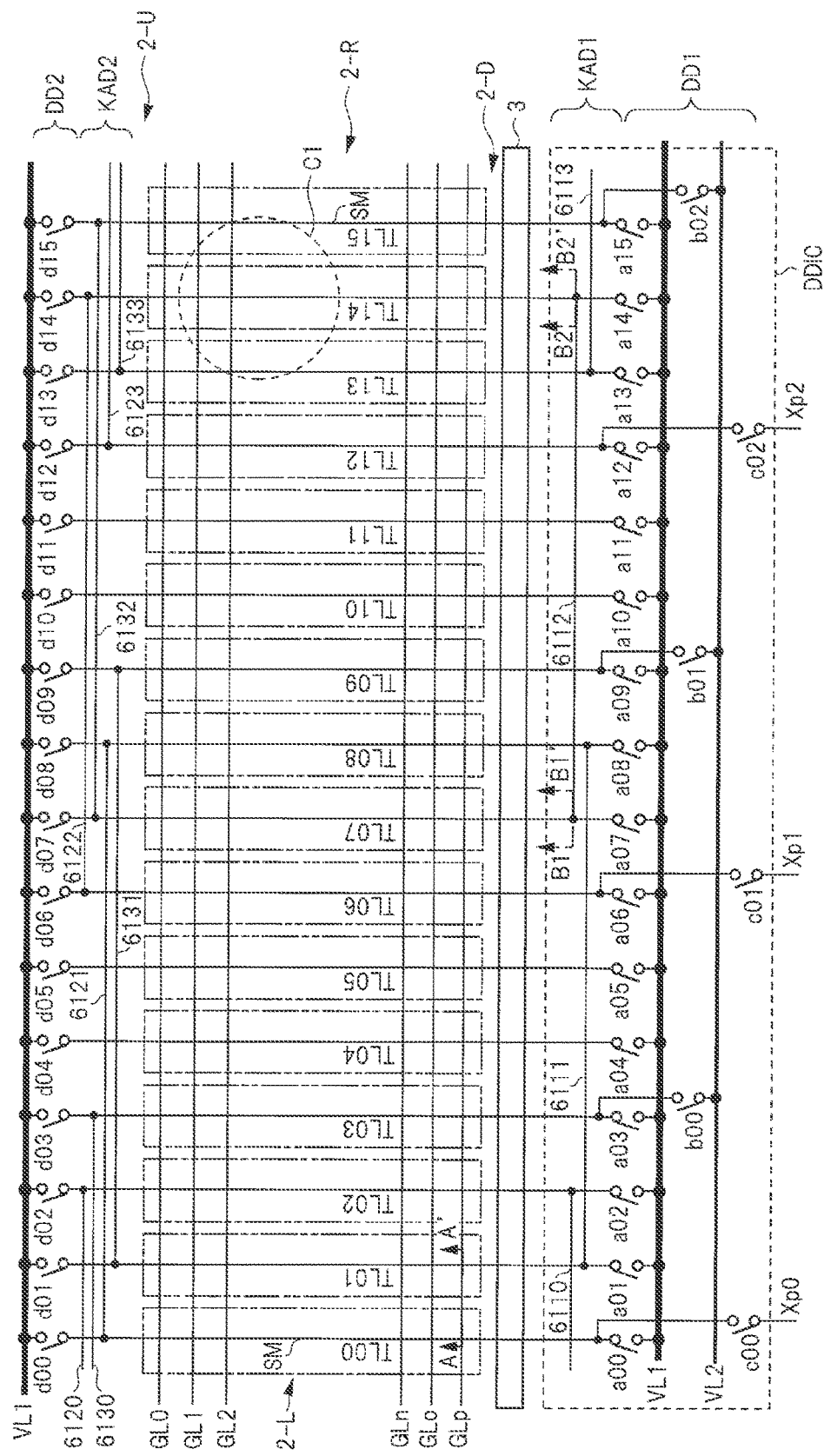
FIG. 8 is a plan view illustrating a layout of the liquid crystal display device according to the first embodiment.

<<Reference Numerals of FIG. 8>>

In FIG. 8, TL00 to TL15 represent drive electrodes TL(n−6) to TL(n+9), GL0 to GLp represent the scan lines GL(0) to GL(p), and Xp0 to Xp2 represent input/output nodes Xp1(n−1), Xp1(n) and Xp1(n+1). In addition, a00 to a15 represent first switches S1(n−6) to (n+9), b00 to b02 represent second switches S2(n−2) to S2(n+1), c00 to c02 represent third switches S3(n−1) to S3(n+1), and d00 to d15 represent fourth switches S4(n−6) to S4(n+9).

Further, in FIGS. 8, 6110 to 6113 represent signal wirings 601-1(n−2) to 601-1(n+1), 6120 to 6123 represent signal wirings 601-2(n−2) to 601-2(n+1), and 6130 to 6133 the signal wirings 601-3(n−2) to 601(n+1). Incidentally, here, reference numeral 601 attached to the signal wiring represents the wiring of the first wiring layer 601 described in FIG. 6.

Figure 12:
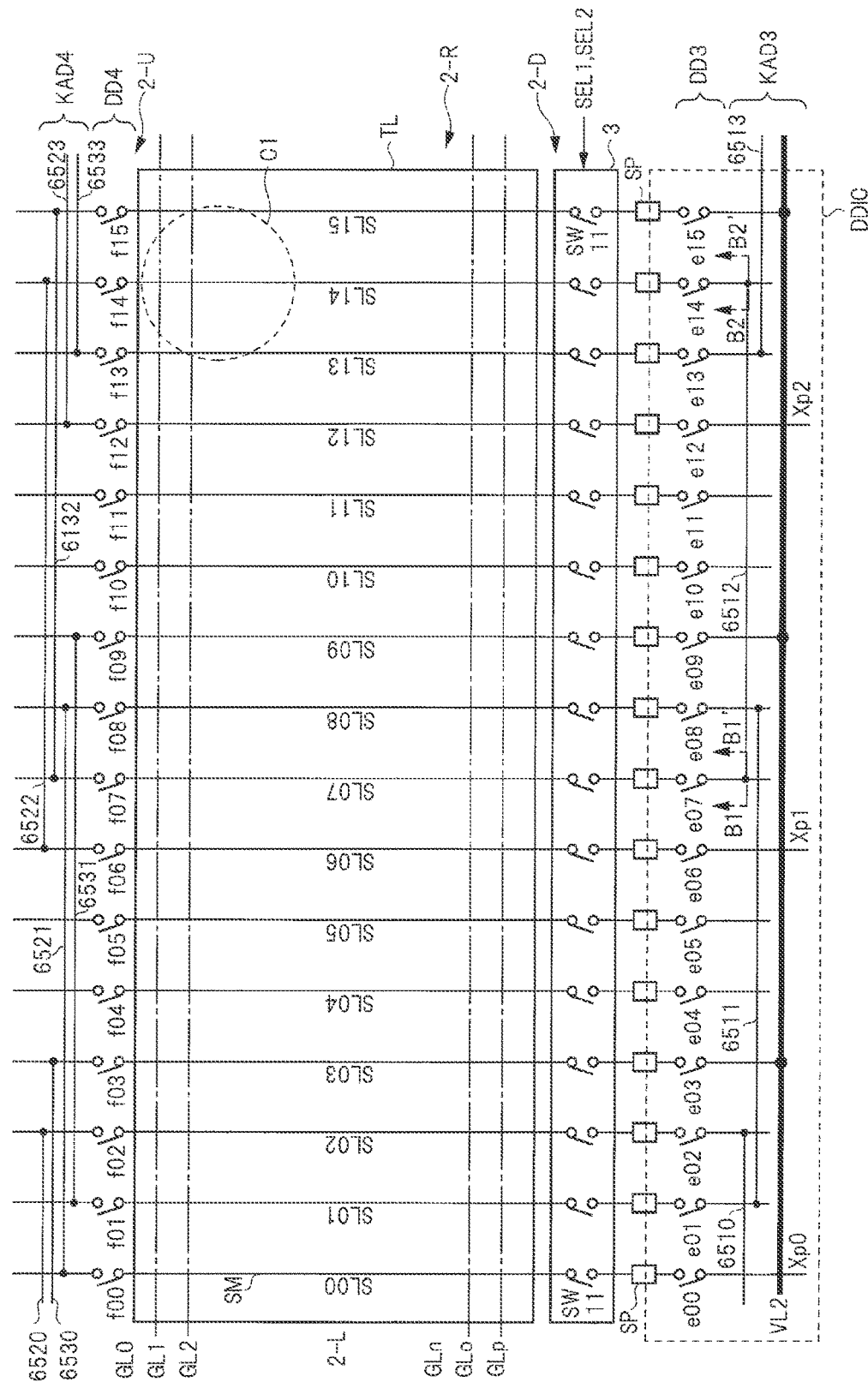
FIG. 12 is a plan view illustrating a layout of a liquid crystal display device according to a second embodiment.

<<Reference Numerals of FIG. 12>>

In FIG. 12, SL00 to SL15 represent signal lines SL(n−6) to SL(n+9), GL0 to GLp represent the scan lines GL(0) to GL(p), and Xp0 to Xp2 represent the input/output nodes Xp1(n−1) to Xp(n+1). In addition, in FIG. 12, e00 to e15 represent fifth switches S5(n−6) to S5(n+9), and f00 to f15 represent sixth switches S6(n−6) to S6(n+9).

In addition, in FIGS. 12, 6510 to 6513 represent signal wirings 605-1(n−2) to 605-1(n+1), 6520 to 6523 represent signal wirings 605-2(n−2) to 605-2(n+1), and 6530 to 6533 represent signal wirings 605-3(n−2) to 605-3(n+1). Here, similarly, reference numeral 605 attached to the signal wiring represents the wiring of the third wiring layer 605 described in FIG. 6.

Figure 16:
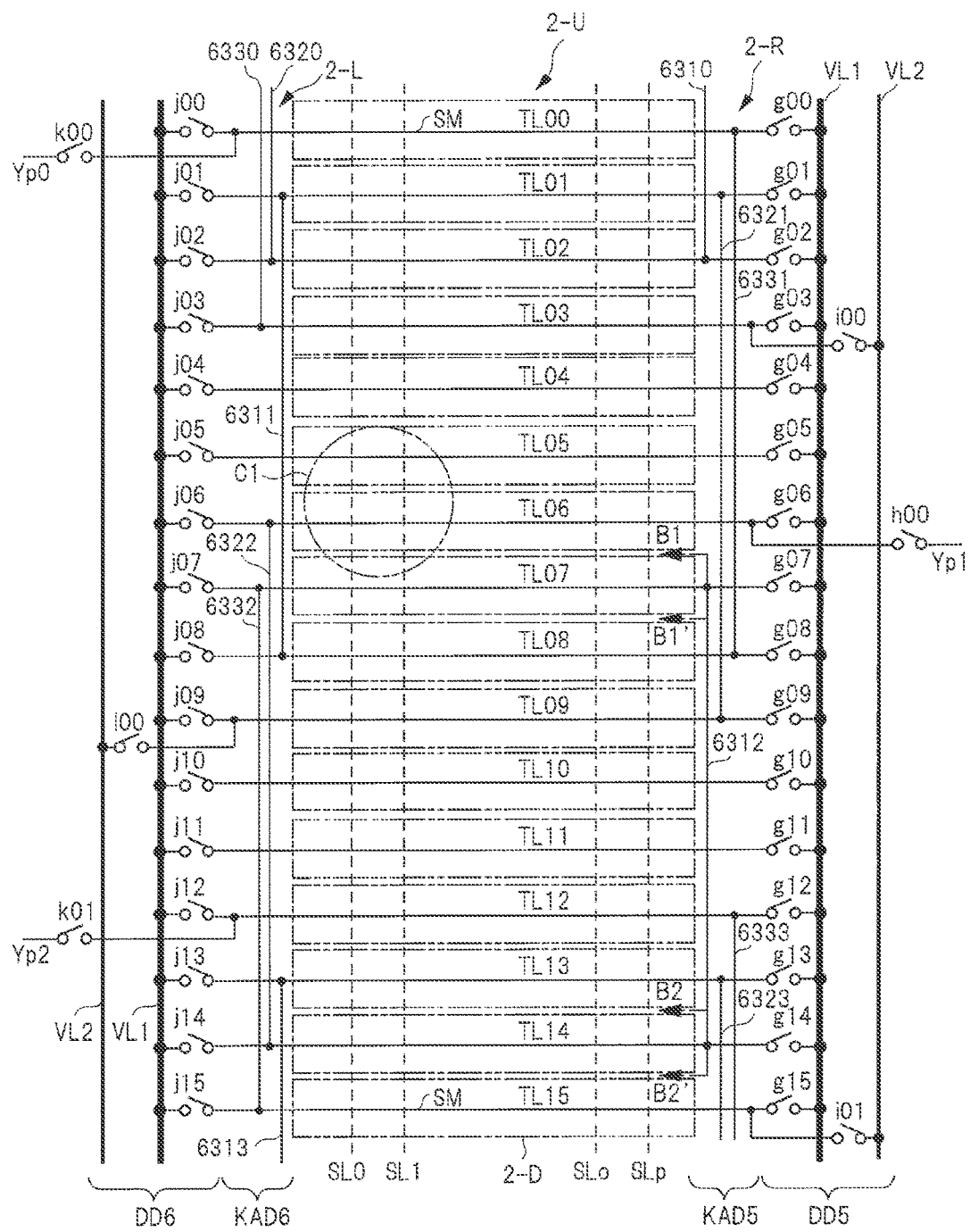
FIG. 16 is a plan view illustrating a layout of a liquid crystal display device according to a third embodiment.

<<Reference Numerals of FIG. 16>>

In FIG. 16, TL00 to TL15 represent the drive electrodes TL(n−6) to TL(n+9), SL0 to SLp represent the signal lines SL(0) to SL(p), and Yp0 to Yp2 represent input/output nodes Yp1(n−1) to Yp1(n+1). In addition, g00 to g15 represent seventh switches S7(n−6) to S7(n+9), h00 represents an eighth switch S8(n), and i00 and i01 represent ninth switches S9(n−1) and S9(n). Further, in FIG. 16, j00 to j15 represent tenth switches S10(n−6) to S10(n+9), k00 and k01 represent eleventh switches S11(n−1) and S11(n+1), and l00 represents a twelfth switch S12(n−1).

In addition, in FIGS. 16, 6310 to 6313 represent signal wirings 603-1(n−2) to 603-1(n+1), 6320 to 6323 represent signal wirings 603-2(n−2) to 603-2(n+1), and 6330 to 6333 represent signal wirings 603-3(n−2) to 603-3(n+1). Here, reference numeral 603 attached to the signal wiring represents the wiring of the second wiring layer 603 described in FIG. 6.

Figure 20:
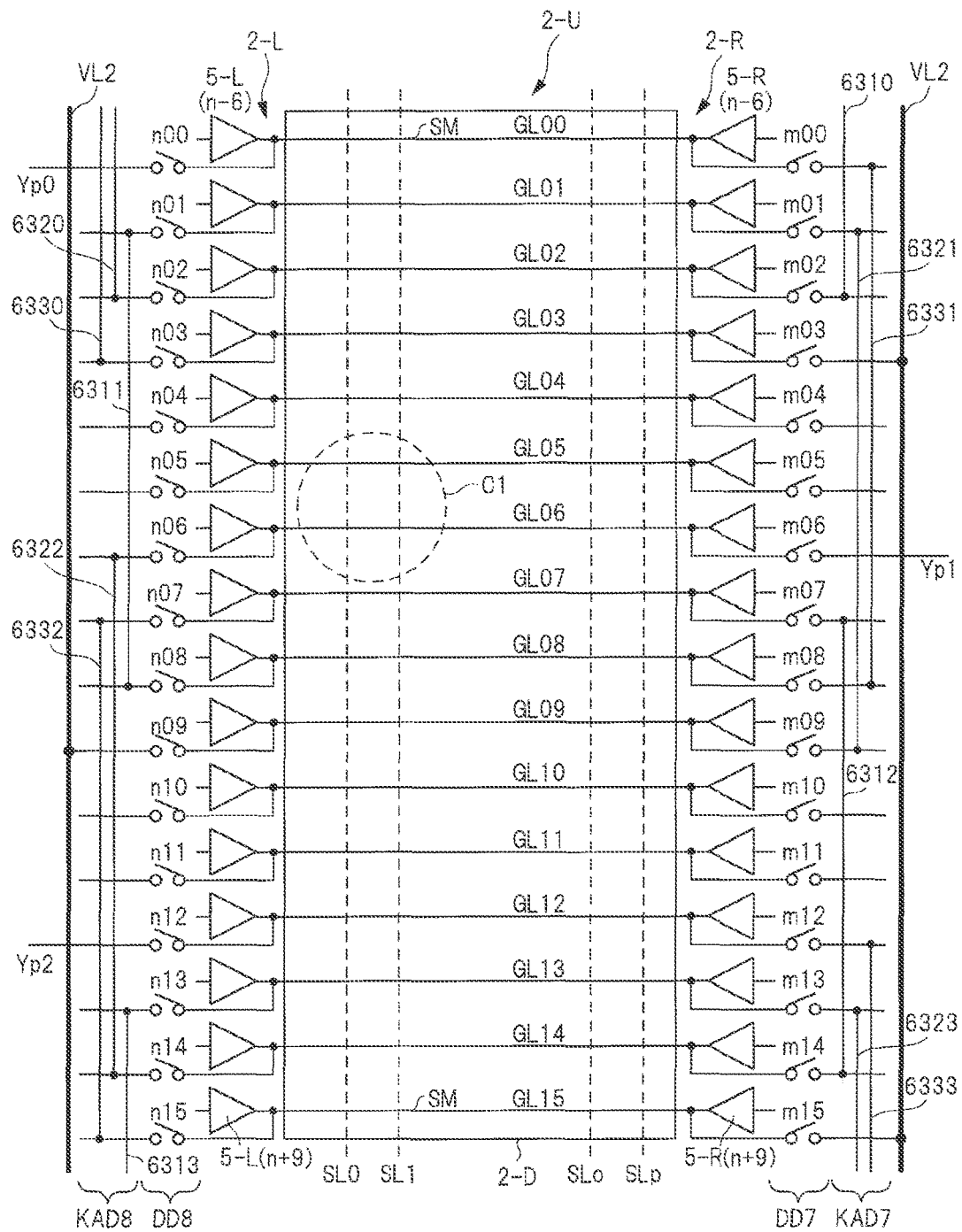
FIG. 20 is a plan view illustrating a layout of a liquid crystal display device according to a fourth embodiment.

<<Reference Numerals of FIG. 20>>

In FIG. 20, GL00 to GL15 represent scan lines GL(n−6) to GL(n+9), SL0 to SLp represent the signal lines SL(0) to SL(p), and Yp0 to Yp2 represent the input/output nodes Yp1(n−1) to Yp1(n+1). In addition, in FIG. 20, m00 to m15 represent thirteenth switches S13(n−6) to S13(n+9), and n00 to n15 represent fourteenth switches S14(n−6) to S14(n+9).

Further, in FIGS. 20, 6310 to 6313 represent the signal wirings 603-1(n−2) to 603-1(n+1), 6320 to 6323 represent the signal wirings 603-2(n−2) to 603-2(n+1), and 6330 to 6333 represent the signal wirings 603-3(n−2) to 603-3(n+1). Here, similarly, reference numeral 603 attached to the signal wiring represents the wiring of the second wiring layer 603.

Figure 23:
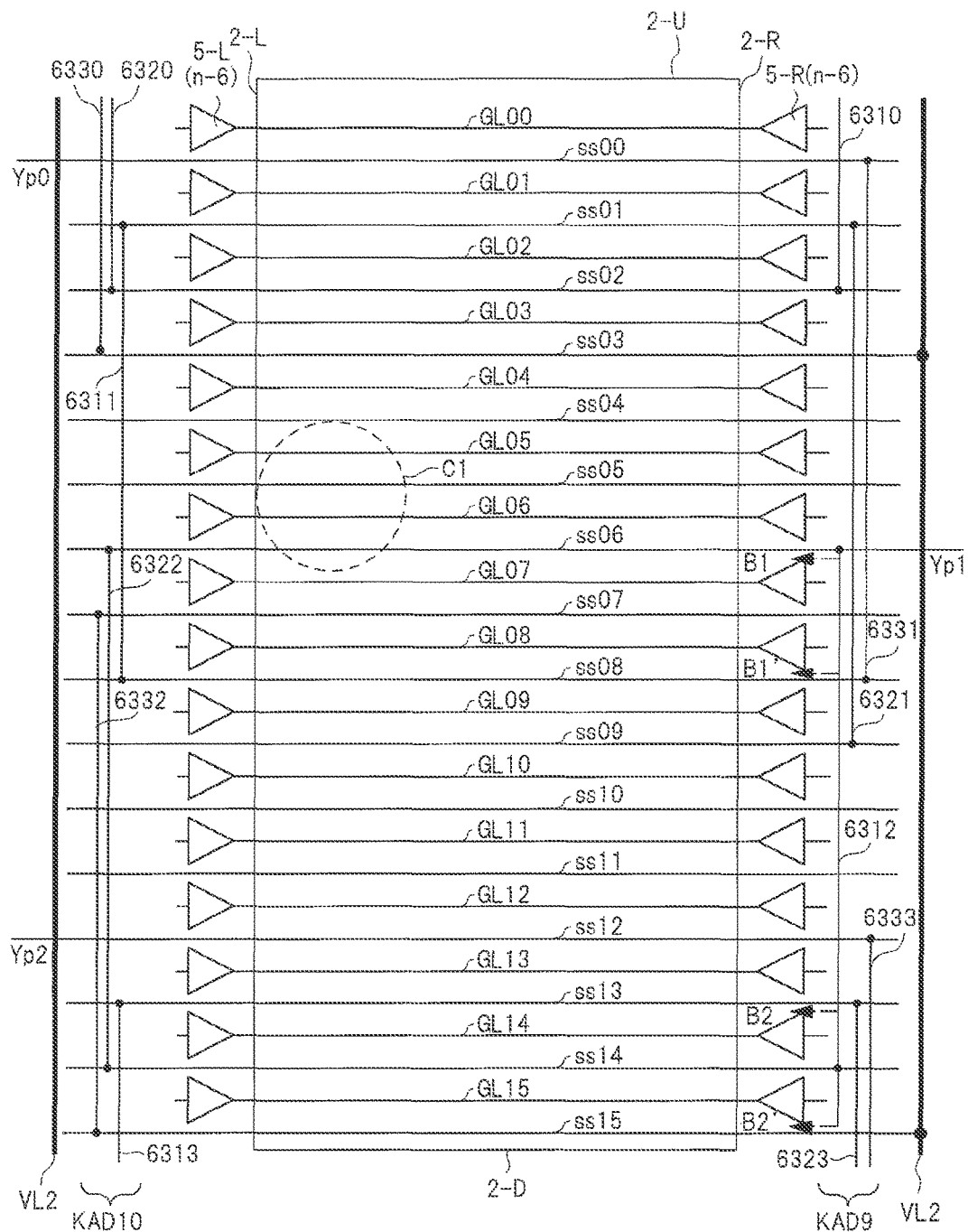
FIG. 23 is a plan view illustrating a layout of a liquid crystal display device according to a fifth embodiment.

<<Reference Numerals of FIG. 23>>

In FIG. 23, GL00 to GL15 represent the scan lines GL(n−6) to GL(n+9), and ss00 to ss15 represent sense lines ss(n−6) to ss(n+9). In addition, Yp0 to Yp2 represent the input/output nodes Yp1(n−1) to Yp1(n+1).

Further, in FIGS. 23, 6310 to 6313 represent the signal wirings 603-1(n−2) to 603-1(n+1), 6320 to 6323 represent the signal wirings 603-2(n−2) to 603-2(n+1), and 6330 to 6333 represent the signal wirings 603-3(n−2) to 603-3(n+1). Here, similarly, reference numeral 603 attached to the signal wiring represents the wiring of the second wiring layer 603.

Figure 29:
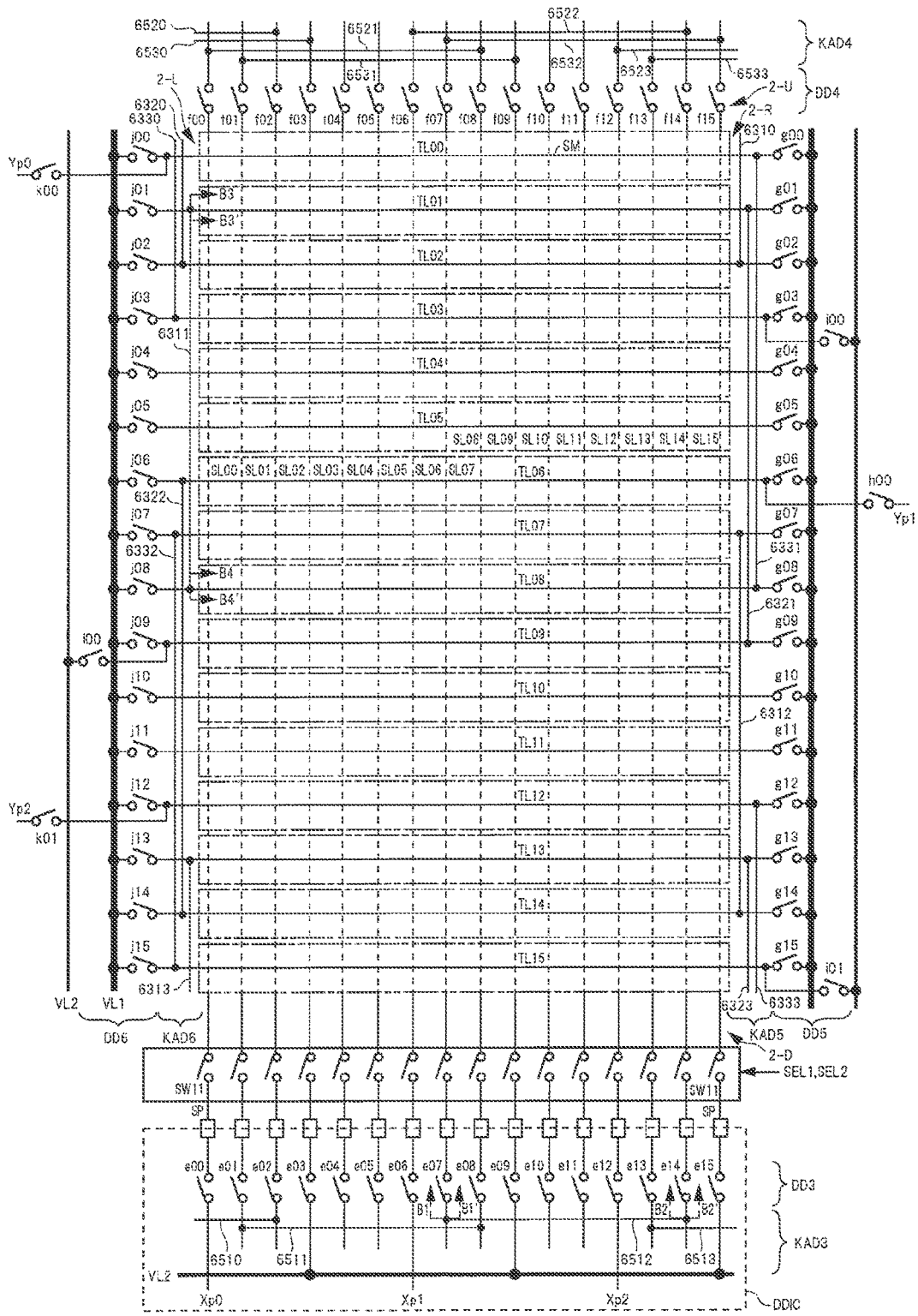
FIG. 29 is a plan view illustrating a layout of the liquid crystal display device according to the sixth embodiment.

<<Reference Numerals of FIG. 29>>

In FIG. 29, SL00 to SL15 represent the signal lines SL(n−6) to SL(n+9), TL00 to TL15 represent the drive electrodes TL(n−6) to TL(n+9), Xp0 to Xp2 represent the input/output nodes Xp1(n−1) to Xp1(n+1), and Yp0 to Yp2 represent the input/output nodes Yp1(n−1) to Yp1(n+9).

In addition, in FIG. 29, e00 to e15 represent the fifth switches S5(n−6) to S5(n+9), f00 to f15 represent the sixth switches S6(n−6) to S6(n+9), g00 to g15 represent the seventh switches S7(n−6) to S7(n+9), h00 represents the eighth switch S8(n), and i00 and i01 represent the ninth switches S9(n−1) and S9(n). Further, in FIG. 29, j00 to j15 represent the tenth switches S10(n−6) to S10(n+9), k00 and k01 represent the eleventh switches S11(n−1) and S11(n+1), and l00 represents the twelfth switch S12(n−1).

Further, in FIGS. 29, 6310 to 6313 represent the signal wirings 603-1(n−2) to 603-1(n+1), 6320 to 6323 represent the signal wirings 603-2(n−2) to 603-2(n+1), and 6330 to 6333 represent the signal wirings 603-3(n−2) to 603-3(n+1). In addition, in FIGS. 29, 6510 to 6513 represent the signal wirings 605-1(n−2) to 605-1(n+1), 6520 to 6523 represent the signal wirings 605-2(n−2) to 605-2(n+1), and 6530 to 6533 represent the signal wirings 605-3(n−2) to 605-3(n+1). Here, similarly, reference numeral 603 attached to the signal wiring represents the wiring of the second wiring layer 603, and reference numeral 605 represents the wiring of the third wiring layer 605.

<Layout of Display Panel 2>

FIG. 8 illustrates the layout of the display panel 2 (FIG. 5) and a periphery thereof. In FIG. 8, 2-R, 2-L, 2-U and 2-D correspond to the sides 2-R, 2-L, 2-U and 2-D illustrated in FIG. 5. In addition, FIG. 8 is drawn in accordance with the actual disposition.

In the first embodiment, an adjustment unit and a switching circuit are disposed at an outer side (in a peripheral area) of the display panel 2, that is, the pixel array LCD (FIG. 7). In addition, the drive electrode TL is configured of the plurality of drive electrodes TL(0) to TL(p), and each of the drive electrodes TL(0) to TL(p) is disposed in the column of the pixel array LCD. That is, the drive electrodes TL(0) to TL(p) are disposed to be parallel with the signal lines SL(0) to SL(p). In addition, a plurality of the auxiliary electrodes SM are provided in each of the drive electrodes and electrically connected thereto.

FIG. 8 illustrates the drive electrodes TL(n−6) to TL(n+9) as representatives among the plurality of drive electrodes TL(0) to TL(p). The plurality of auxiliary electrodes are illustrated as the single auxiliary electrode SM in FIG. 8, although the plurality of auxiliary electrodes SM are provided in each of the drive electrodes TL(n−6) to TL(n+9). Incidentally, SM is attached only to each of the auxiliary electrodes provided in the drive electrodes TL(n−6) and TL(n+9), which are disposed on the rightmost side and the leftmost side in FIG. 8, in order to prevent the complicacy of the drawing.

As illustrated in FIG. 8, the auxiliary electrodes SM connected to the drive electrodes TL(n−6) to TL(n+9) extend in the column direction of the display panel 2, and are disposed in parallel in the row direction. In addition, the scan lines disposed to intersect the drive electrodes TL(n−6) to TL(n+9) and the auxiliary electrodes SM are illustrated as the scan lines GL(0) to GL(p) in FIG. 8. Although not illustrated in FIG. 8, the signal lines SL(0) to SL(p) are disposed to be parallel with the drive electrodes TL(n−6) to TL(n+9) and the auxiliary electrodes SM.

In the first embodiment, the coil to be used at the time of performing a touch detection operation is formed of the drive electrodes TL(0) to TL(p). The plurality of drive electrodes are electrically connected to each other by the adjustment unit in order to form the coil. In addition, a signal to be supplied to the drive electrode is switched between the display period and the touch detection period by the switching circuit. That is, a display drive signal is supplied to the drive electrodes TL(0) to TL(p) by the switching circuit at the time of the display, and a drive signal (detection drive signal) for generating the magnetic field in the coil is supplied at the time of the touch detection operation. In addition, the switching circuit transmits a change of voltage generated in the coil at the time of the touch detection operation.

In the first embodiment, the adjustment unit is provided with a first adjustment unit KAD1 and a second adjustment unit KAD2 which are disposed along the sides 2-D and 2-U, respectively, of the display panel 2 (the pixel array LCD). In addition, the switching circuit is also provided with a first switching circuit DD1 and a second switching circuit DD2 which are disposed along the sides 2-D and 2-U, respectively, of the display panel 2 (the pixel array LCD).

The adjustment unit (the first adjustment unit KAD1 and the second adjustment unit KAD2) is connected to the plurality of drive electrodes and the auxiliary electrode. During the touch detection period, the plurality of coils are formed using the plurality of drive electrodes TL(0) to TL(p) and the auxiliary electrode SM, and the number of turns of each coil is adjusted to be a desired number of turns by the adjustment unit (the first adjustment unit KAD1 and the second adjustment unit KAD2). Next, a description will be given regarding an example in which the coil of the desired number of turns is formed by the adjustment unit, taking the drive electrodes TL(n−6) to TL(n+9) and the auxiliary electrode SM illustrated in FIG. 8 as a representative.

Here, a description will be given regarding an example in which the coil of which the number of turns is two is formed. The first adjustment unit KAD1 is connected to the drive electrode TL(n−6) to TL(n+9) and the auxiliary electrode SM on the side 2-D side of the display panel 2, and the second adjustment unit KAD2 is connected to the drive electrodes TL(n−6) to TL(n+9) and the auxiliary electrode SM on the side 2-U side of the display panel 2. To be specific, the first adjustment unit KAD1 is provided with the signal wiring 601-1(*n*) which is connected between the drive electrode TL(n+1) and the drive electrode TL(n+8), the signal wiring 601-1(*n*−1) which is connected between the drive electrode TL(n−5) and the drive electrode TL(n+2), the signal wiring 601-1(*n*+1) which is connected to the drive electrode TL(n+7), and the signal wiring 601-1(*n*−2) which is connected to the drive electrode TL(n−4).

In addition, the second adjustment unit KAD2 is provided with the signal wiring 601-2(*n*) which is connected between the drive electrode TL(n) and the drive electrode TL(n+8), and the signal wiring 601-3(*n*) which is connected between the drive electrode TL(n+1) and the drive electrode TL(n+9). Further, the second adjustment unit KAD2 is provided with the signal wiring 601-2(*n*−1) which is connected between the drive electrode TL(n−6) and the drive electrode TL(n+2), and the signal wiring 601-3(*n*−1) which is connected between the drive electrode TL(n−5) and the drive electrode TL(n+3). In addition, the second adjustment unit KAD2 is provided with the signal wiring 601-2(*n*+1) which is connected to the drive electrode TL(n+6)), the signal wiring 601-3(*n*+1) which is connected to the drive electrode (n+7), the signal wiring 601-2(*n*−2) which is connected to the drive electrode TL(n−4), and the signal wiring 601-3(*n*−2) which is connected to the drive electrode TL(n−3).

In this manner, the drive electrodes TL(n), TL(n+1), TL(n+8) and TL(n+9) are connected by the signal wirings 601-1(*n*), 601-2(*n*) and 601-3(*n*) in the first adjustment unit KAD1 and the second adjustment unit KAD2, and thus, it is possible to connect these drive electrodes TL(n), TL(n+1), TL(n+8) and TL(n+9) in series like a single stroke. As a matter of course, the auxiliary electrodes SM, which are provided in the respective drive electrodes TL(n), TL(n+1), TL(n+8) and TL(n+9), are also connected in series. Since these drive electrodes and auxiliary electrodes are disposed to be parallel with each other, a coil of a two-turn winding is formed by the plurality of drive electrodes TL(n), TL(n+1), TL(n+8) and TL(n+9) and the auxiliary electrodes SM which are connected to each other in series.

Similarly, the drive electrodes TL(n−6), TL(n−5), TL(n+2) and TL(n+3) are connected by the signal wirings 601-1(*n*−1), 601-2(*n*−1) and 601-3(*n*−1) in the first adjustment unit KAD1 and the second adjustment unit KAD2, and thus, it is possible to connect these drive electrodes TL(n−6), TL(n−5), TL(n+2) and TL(n+3) in series like a single stroke. As a matter of course, the auxiliary electrodes SM, which are provided in the respective drive electrodes TL(n−6), TL(n−5), TL(n+2) and TL(n+3), are also connected in series. Since these drive electrodes and auxiliary electrodes are disposed to be parallel with each other, a coil of a two-turn winding is formed by the plurality of drive electrodes TL(n−6), TL(n−5), TL(n+2) and TL(n+3) and the auxiliary electrodes SM which are connected to each other in series.

In the same manner, the drive electrodes TL(n−4) and TL(n−3) and the auxiliary electrodes SM, and the drive electrodes and the auxiliary electrodes (not illustrated) are connected in series using the signal wirings 601-1(*n*−2), 601-2(*n*−2) and 601-3(*n*−2), thereby forming a coil of a two-turn winding. In addition, the drive electrodes TL(n+6) and TL(n+7) and the auxiliary electrode SM, and the drive electrode and the auxiliary electrode (not illustrated) are connected in series using the signal wirings 601-1(*n*+1), 601-2(*n*+1) and 601-3(*n*+1), thereby forming a coil of a two-turn winding.

The first switching circuit DD1 is connected to the drive electrodes TL(n−6) to TL(n+9) on the side 2-D side of the display panel 2. This first switching circuit DD1 is provided with the first switches S1($n$−6) to S1($n$+9), the second switches S2($n$−2) to S2($n$), and the third switches S3($n$−1) to S3($n$+1). Here, each of the first switches S1($n$−6) to S1($n$+9) is connected between each of the corresponding drive electrodes TL(n−1) to TL(n+9) and auxiliary electrodes SM, and a voltage wiring VL1 to which a voltage VCOMDC corresponding to the ground voltage Vs is supplied, and is turned into an ON state during the display period, and turned into an OFF state during the touch detection period.

In addition, each of the second switches S2($n$−2) to S2($n$) is connected between each of the drive electrode and the auxiliary electrode forming the coil during the touch detection period, and a voltage wiring VL2 to which the ground voltage Vs is supplied, and is turned into the ON state during the touch detection period, and turned into the OFF state during the display period. In this case, the second switch S2 functions to supply the ground voltage Vs to the coil during the touch detection period, and thus, is connected between the drive electrode, which is one end portion of the plurality of drive electrodes (including the auxiliary electrodes) forming the coil, and the voltage wiring VL2. In the example illustrated in FIG. 8, the drive electrodes, each of which is the one end portion, of the plurality of drive electrodes forming the coil, are the drive electrodes TL(n−3), TL(n+3) and TL(n+9), and thus, each of the second switches S2($n$−2) to S2($n$) is connected between each of these drive electrodes TL(n−3), TL(n+3) and TL(n+9) and the voltage wiring VL2 on the side 2-D side of the display panel 2.

The third switches S3($n$−1) to S3($n$+1) are switches that select the coil during the touch detection period. The third switches S3($n$−1) to S3($n$+1) are turned into the OFF state during the display period, but are selectively turned into the ON state during the touch detection period. Each of the third switches S3($n$−1) to S3($n$+1) is connected between the drive electrode (including the auxiliary electrode) forming the coil and each of the input/output nodes Xp1($n$−1) to Xp1($n$+1) of the coil during the touch detection period.

That is, the third switch S3 is connected between the drive electrode, which is the other end portion of the plurality of drive electrodes (including the auxiliary electrodes) forming the coil, and the input/output node of the coil during the touch detection period. In the example illustrated in FIG. 8, the drive electrodes, each of which is the other end, of the plurality of drive electrodes forming the coil are the drive electrodes TL(n−6), TL(n) and TL(n+6), and thus, each of the third switches S3($n$−1) to S3($n$+1) is connected between each of these drive electrodes TL(n−6), TL(n) and TL(n+6) and each of the input/output nodes Xp1($n$−1) to Xp1($n$+1) of the coil on the side 2-D side of the display panel 2.

The second switching circuit DD2 has a plurality of the fourth switches S4($n$−6) to S4($n$+9). Each of these fourth switches S4($n$−6) to S4($n$+9) is disposed along the side 2-U side of the display panel 2, and is connected between each of the corresponding drive electrodes TL(n−6) to TL(n+9) and the voltage wiring VL1 on this side 2-U side. These fourth switches S4($n$−6) to S4($n$+9) are turned into the ON state during the display period, and turned into the OFF state during the touch detection period.

The first switches S1($n$−6) to S1($n$+9) and the fourth switches S4($n$−6) to S4($n$+9) are turned into the ON state during the display period, and accordingly, the voltage VCOMDC in the voltage wiring VL1 is supplied from the switching circuit (the first switching circuit DD1 and the second switching circuit DD2) to each of the drive electrodes TL(n−6) to TL(n+9) as the display drive signal.

On the other hand, the first switches S1($n$−6) to S1($n$+9) and the fourth switches S4($n$−6) to S4($n$+9) are turned into the OFF state during the touch detection period. Accordingly, the display drive signal is not supplied from the switching circuit to each of the drive electrodes TL(n−6) to TL(n+9). In addition, the second switches S2($n$−1) to S2($n$) are turned into the ON state during the touch detection period, and thus, the drive electrodes TL(n−3), TL(n+3) and TL(n+9), each of which is the one end portion of the coil, among the drive electrodes forming the coil are connected to the voltage wiring VL2 via the second switches, and the ground voltage Vs is supplied to the coil. In addition, the third switches S3($n$−1) to S3($n$+1) are selectively turned into the ON state during the touch detection period. Accordingly, the drive electrode TL(n−6), TL(n) or TL(n+6), which is the other end portion of the coil among the drive electrodes forming the coil, is connected to the input/output nodes Xp1($n$−1) to Xp1($n$+1) of the coil via the third switch.

When the third switch S3($n$) is turned into the ON state, for example, during the touch detection period, the drive signal with periodically changing voltage is supplied to the input/output node Xp1($n$) of the coil. Accordingly, the ground voltage Vs is supplied to the one end portion of the coil configured of the drive electrodes TL(n), TL(n+8), TL(n+1) and TL(n+9) and the auxiliary electrode SM, and the voltage in the other end portion periodically changes. As a result, the coil connected to the third switch S3($n$) generates the magnetic field with periodically changing voltage, similarly to the case illustrated in FIGS. 2A to 2D. It is possible to detect whether the pen touches or comes close to the coil by detecting a change of the signal in the input/output node Xp1($n$) of the coil in a state in which the third switch S3($n$) is maintained in the ON state after the generation of the magnetic field.

Although the description has been given by exemplifying the third switch S3($n$), the same description may be applied between each of the other third switches S3($n$−1) and S3($n$+1) and the coil.

Here, although the description has been given regarding a case where the third switch is selectively turned into the ON state during the touch detection period, a plurality of the third switches may be turned into the ON state at the same time. In this case, the drive signal is supplied to the plurality of coils. Thus, it is possible to shorten the touch detection period.

In FIG. 8, DDIC, indicated by the broken line, represents a driver semiconductor device. In a case where the display control device is configured using a semiconductor device, the semiconductor device configuring the display control device becomes the driver semiconductor device DDIC. In the above-described embodiment, the first switch S1, the second switch S2, the third switch S3 and the fourth switch S4 are formed using the thin film transistors (hereinafter, also referred to as the TFTs) on the TFT glass substrate 600, and the driver semiconductor device DDIC is mounted so as to cover these TFTs. In this case, the TFTs forming the first switch S1, the second switch S2, the third switch S3 and the fourth switch S4 are formed on the TFT glass substrate 600 described above. To be specific, the TFT forming each of the first switch S1, the second switch S2 and the third switch S3 is formed so as to be sandwiched between the driver semiconductor device DDIC and the TFT glass substrate 600 in a cross-sectional structure thereof in this embodiment. That is, the driver semiconductor device DDIC is formed so as to cover the TFTs forming the first switch S1, the second switch S2 and the third switch S3. Accordingly, it is possible to effectively utilize an area on the TFT glass substrate, thereby suppressing the increase of the price. Incidentally, in FIG. 8, reference numeral 3 represents the signal line selector described in FIG. 5.

Figure 9:
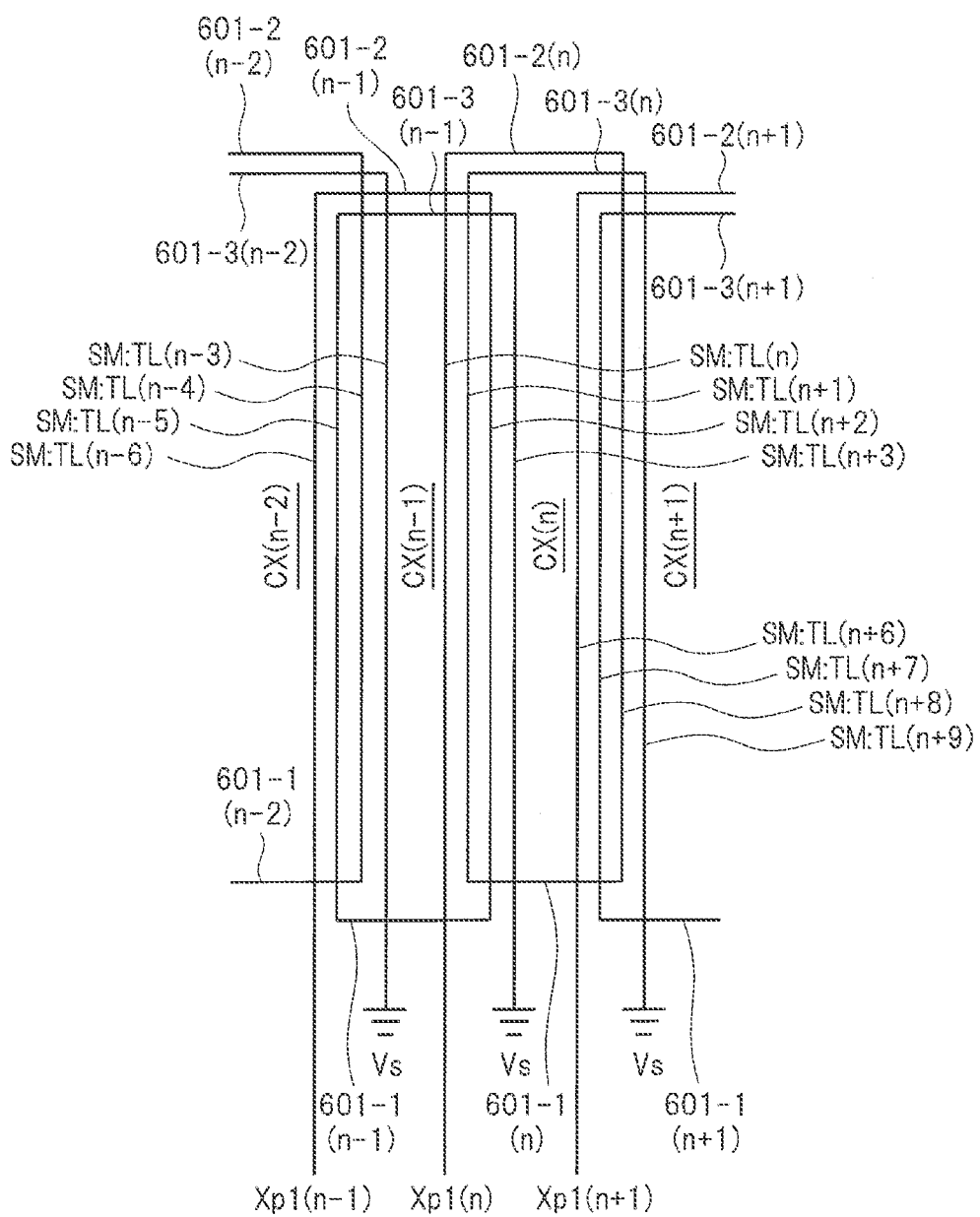
FIG. 9 is a circuit diagram illustrating a configuration of a coil according to the first embodiment.

FIG. 9 is a circuit diagram illustrating a configuration of the coil to be formed using the drive electrode, the auxiliary electrode and the signal wiring which has been described in FIG. 8. In the example illustrated in FIG. 8, two coils CX(n−1) and CX(n) and some of two coils CX(n−2) and CX(n+1) are configured during the touch detection period. Here, the coil CX(n) is configured of the drive electrodes TL(n), TL(n+1), TL(n+8) and TL(n+9), the auxiliary electrode SM and the signal wirings 601-1($n$), 601-2($n$) and 601-3($n$) which are connected between the input/output node Xp1($n$) of the coil and the ground voltage Vs. In addition, the coil CX(n−1) is configured of the drive electrodes TL(n−6), TL(n−5), TL(n+2) and TL(n+3), the auxiliary electrode SM and the signal wirings 601-1($n-1$), 601-2($n-1$) and 601-3($n-1$).

Since the drive electrode and the auxiliary electrode electrically connected to each other, the auxiliary electrode and the drive electrode are represented using a display form of "the auxiliary electrode: the drive electrode" in FIG. 9 in order to specify the auxiliary electrode and the drive electrode together. For example, when taking the drive electrode TL(n) as an example, the auxiliary electrode SM connected to the drive electrode TL(n) and the drive electrode TL(n) are combinedly displayed as "SM:TL(n)". In this case, the auxiliary electrode SM is configured of a plurality of wirings which extend in parallel with the drive electrode TL(n) and are connected to the drive electrode TL(n). The number of the auxiliary electrodes SM connected to the drive electrode TL(n) is set to several tens, for example. The same applies to the other drive electrodes and the other auxiliary electrodes.

The coils CX(n−2) to CX(n+1) are formed as coils adjacent to each other during the touch detection period. In this case, the coils adjacent to each other overlap with each other. That is, a part of the coil CX(n−1) overlaps with the coil CX(n), and the coil CX(n) overlaps with the coil CX(n+1). In other words, a winding of the coil CX(n−1) and a winding of the coil CX(n+1) are placed inside the winding of the coil CX(n). Here, the winding of the coil CX(n−1) placed inside the winding of the coil CX(n) is drive electrodes SM:TL(n+2) and SM:TL(n+3), and the winding of the coil CX(n+1) placed inside the winding of the coil CX(n) is drive electrodes SM:TL(n+6) and SM:TL(n+7).

The coil generates a strong magnetic field inside the winding thereof (at the inner side) and a weak magnetic field outside the winding when a voltage is supplied to the input/output node of the coil. Thus, it is considered that a magnetic field is weak in a gap portion when the gap is provided between the coils adjacent to each other, and thus, accuracy in the touch detection is reduced. When the coils adjacent to each other are disposed to be overlapped with each other as illustrated in FIGS. 8 and 9, it is possible to prevent generation of the portion in which the magnetic field is weak, and to prevent the reduction of the accuracy in the touch detection.

The signal wirings to be included in the first adjustment unit KAD1 and the second adjustment unit KAD2 are configured using the wirings formed in the first wiring layer 601 which is formed on the TFT glass substrate 600. That is, the respective wirings of the signal wirings 601-1($n-2$) to 601-1($n+1$), 602($n-2$) to 601-2($n+1$) and 601-3($n-2$) to 601-3($n+1$) are configured using the wirings of the first wiring layer 601 when FIG. 8 is taken as an example. In this case, the wirings of the first wiring layer configuring these signal wirings are wirings at an outer side of the display area (outside the active area) of the display panel 2 (the pixel array LCD) on which the pixel is formed.

Figure 10:
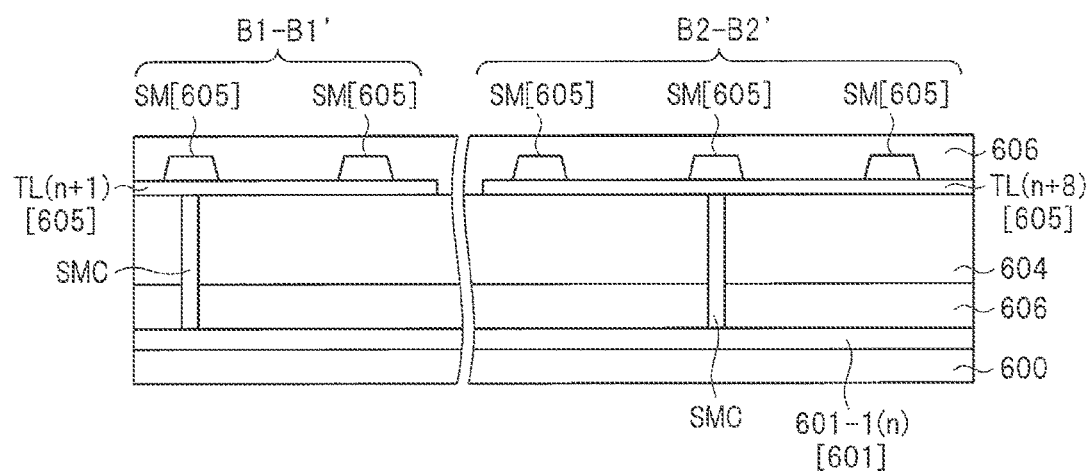
FIG. 10 is a cross-sectional view illustrating a cross-section of the liquid crystal display device according to the first embodiment.

FIG. 10 is a cross-sectional view illustrating cross-sections of areas B1-B1' and B2-B2' of the first adjustment unit KAD1 outside the active area in FIG. 8. Incidentally, the cross-section of the area A-A' inside the active area in FIG. 8 has been already described in FIG. 6.

In FIG. 10, [601] represents the wiring of the first wiring layer, and [605] represents the wiring of the third wiring layer. The wiring formed in the first wiring layer 601 is used as the signal wiring 601-1($n$) illustrated in FIG. 8. The drive electrode TL(n+1) and the plurality of auxiliary electrodes SM formed in the third wiring layer 605 are electrically connected to the signal wiring 601-1($n$) of the first wiring layer 601 via an interlayer wiring SMC in the cross-sectional portion B1-B1' of the first adjustment unit KAD1. In addition, the drive electrode TL(n+8) and the plurality of auxiliary electrodes SM formed in the third wiring layer 605 are electrically connected to the signal wiring 601-1($n$) of the first wiring layer 601 via the interlayer wiring SMC in the cross-sectional portion B2-B2'. In the same manner, the drive electrode and the plurality of auxiliary electrodes SM formed in the third wiring layer 605 are electrically connected to the signal wiring 601-1($n$) of the first wiring layer 601 via the interlayer wiring SMC in the second adjustment unit KAD2. The first adjustment unit KAD1 and the second adjustment unit KAD2 are present outside the active area of the display panel 2, and thus, the liquid crystal layer 607 is not necessarily formed on the insulating layer 606 illustrated in FIG. 11 although not particularly limited thereto.

In this first embodiment, the wiring of the first wiring layer 601 is used as the signal wiring to be connected between the drive electrodes in order to form the coil. That is, the wirings [601] of the same wiring layer 601 as the scan lines GL(0) to GL(p) are used as the signal wirings 601-1($n-2$) to 601-1($n+1$), 602-2($n-2$) to 601-2($n+1$) and 601-3($n-2$) to 601-3($n+1$). In addition, the drive electrode and the auxiliary electrode are used as the winding of the coil. Thus, it is possible to form the coil without additionally providing the wiring layers, thereby suppressing an increase of the price. For example, when the scan lines GL(0) to GL(p) are formed in the active area of the display panel 2, it may be configured such that a wiring is formed also at an outer side of the display area (outside the active area) of the display panel 2, and the wiring formed at the outer side of the active area is used as the above-described signal wiring.

In addition, a wiring which is parallel with the scan lines GL(0) to GL(p) may be formed also at the outer side of the active area when forming the scan lines GL(0) to GL(p), and the wiring formed at the outer side of the display panel 2 may be used as the above-described signal wiring. In this case, a portion which is not connected to the drive electrode may be cut. The unnecessary portion of the wiring, which is cut, may be left or removed.

Figure 11:
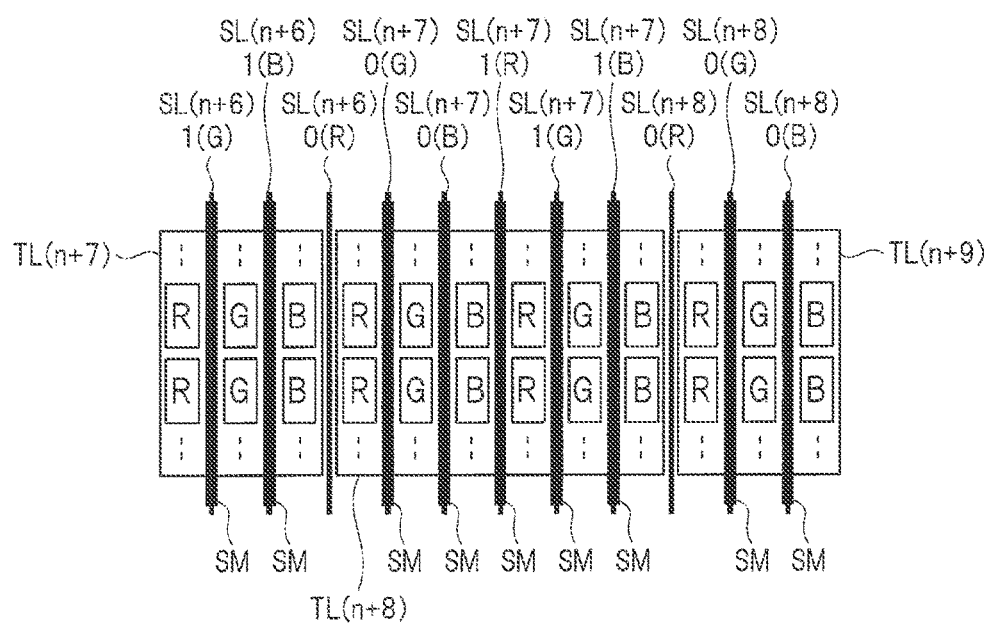
FIG. 11 is a plan view illustrating a partial plane of the display panel according to the first embodiment.

FIG. 11 is a plan view illustrating an area C1 around the broken line circle of FIG. 8 in detail. In FIG. 11, R, G and B represent the pixels of the three primary colors, and TL(n+7) to TL(n+9) represent the drive electrodes. In addition, SL(n+6)1(G) to SL(n+8)0(G), SL(n+6)1(B) to SL(n+8)0(B) and SL(n+7)0(R) to SL(n+8)0(R) represent the signal lines, and SM represents the auxiliary electrode.

As illustrated in FIG. 11, the plurality of auxiliary electrodes SM and the drive electrode TL(n+8) are connected to the first switch S1(n+8), the fourth switch S4($n$+8), and the signal wirings 601-1(*n*) and 601-2(*n*). Similarly, the plurality of auxiliary electrodes SM and the drive electrode TL(n+7) are connected to the first switch S1(*n*+7), the fourth switch S4(*n*+7), and the signal wirings 601-1(*n*+1) and 601-3(*n*+1). In addition, the plurality of auxiliary electrodes SM and the drive electrode TL(n+9) are connected to the first switch S1(*n*+9), the second switch S2(*n*), the fourth switch S4(*n*+9) and the signal wiring 601-3(*n*).

Although the number of the auxiliary electrodes SM to be connected to the drive electrode TL(n+8) is five in FIG. 11 in order to prevent the complicacy of the drawing, it is desirable that several tens of the auxiliary electrodes be connected to the drive electrode TL(n+8). When the number of the auxiliary electrodes to be connected is increased, it is possible to reduce the resistance of the coil at the time of the touch detection, and it is possible to strengthen the magnetic field to be generated.

Since the number of turns of the coil is two in the first embodiment, it is possible to strengthen the magnetic field at the time of the touch detection. The number of turns is not limited to two, and it is possible to further strengthen the magnetic field to be generated by increasing the number of turns. As a matter of course, the number of turns may be one.

It is possible to increase the number of turns of the coil by changing the connection in the first adjustment unit KAD1 and the second adjustment unit KAD2. In addition, it is possible to use any drive electrode as the winding of the coil by changing the connection in the first adjustment unit KAD1 and the second adjustment unit KAD2. Further, it is possible to change the overlapping amount between the coils adjacent to each other by changing the connection in the first adjustment unit KAD1 and the second adjustment unit KAD2. That is, it is possible to adjust the coil to be used during the touch detection period by the adjustment unit.

In addition, since the number of turns of the coil is equal to or larger than two, the detection accuracy of the magnetic field to be generated by a pen is also increased.

Although the description has been given regarding the example in which the wiring of the first wiring layer 601 is used as the signal wiring, the invention is not limited thereto. For example, the wiring of the second wiring layer may be used as the signal wirings 601-1(*n*−2) to 601-1(*n*+1), 602-2(*n*−2) to 601-2(*n*+1) and 601-3(*n*−2) to 601-3(*n*+1). In this case, the wirings to be used as the signal wirings 601-1(*n*−2) to 601-1(*n*+1), 602-2(*n*−2) to 601-2(*n*+1) and 601-3(*n*−2) to 601-3(*n*+1) are also formed when forming the signal lines SL(0) to SL(p). Accordingly, it is possible to suppress the increase of the price.

In this first embodiment, the voltage VCOMDC is supplied to the drive electrodes TL(0) to TL(p) as the display drive signal from the first switching circuit DD1 and the second switching circuit DD2 during the display period, and the drive signal for generating the magnetic field for the touch detection is supplied via the first switching circuit DD1 during the touch detection period. Thus, it is possible to say that the drive electrodes TL(0) to TL(p) are the common drive electrodes to be used for both the display and the generation of the magnetic field for the touch detection.

Second Embodiment

FIG. 12 is a plan view illustrating the layout of the liquid crystal display device according to the second embodiment. In the first embodiment, the drive electrode TL is configured using the plurality of drive electrodes TL(0) to TL(p), and the drive electrodes TL(0) to TL(p) are used as the winding of the coil during the touch detection period. In contrast, the signal lines SL(0) to SL(p) are used as the winding of the coil, instead of the drive electrode, during the touch detection period in the second embodiment.

Similar to FIG. 8, FIG. 12 illustrates a part of the display panel 2. That is, a portion of the signal lines SL(n−6) to SL(n+9) in the display panel 2 is illustrated. The signal line selector 3 is disposed along the side 2-D of the display panel 2. In FIG. 12, a plurality of terminals SP represent terminals to which the image signal is supplied from the display control device 4 during the display period. The signal wirings Sd(0) to Sd(n), which have been described in FIG. 5, are connected to the terminals SP, and the image signal is supplied to the terminals SP in the time division manner during the display period. Incidentally, reference numerals SP are attached only to the terminal disposed at the rightmost side and the terminal disposed at the leftmost side in FIG. 12 in order to prevent the complicacy of the drawing.

The signal line selector 3 has a plurality of switches to be controlled according to the selection signals SEL1 and SEL2, and supplies the image signal, which has been supplied to the terminal SP, to a suitable signal line. The switch of the signal line selector 3 selectively connects the terminal SP and the signal line during the display period, but connects all of the signal lines and the terminals SP substantially at the same time during the touch detection period. FIG. 12 schematically illustrates switches SW11 (reference numerals SW11 are attached only to the rightmost side and the leftmost side) as the switch to be included in the signal line selector 3 in order to illustrate that the connection between the signal line and the terminal SP is changed between the display period and the touch detection period. That is, the switches SW11 illustrated in FIG. 12 are drawn in order to express each connection between the signal lines SL(0) to SL(p) and the terminals SP during the touch detection period.

In addition, the display control device 4 illustrated in FIG. 5 is configured using the driver semiconductor device DDIC, similar to the first embodiment, and is formed so as to cover the first switching circuit and the first adjustment unit. This driver semiconductor device DDIC causes the signal wirings Sd(0) to Sd(n), which are connected to the terminals SP, to be turned into a high impedance state during the touch detection period.

The adjustment unit and the switching circuit are also provided in this second embodiment, and the adjustment unit is provided with a first adjustment unit KAD3 disposed along the side 2-D of the display panel 2, and a second adjustment unit KAD4 disposed along the side 2-U of the display panel 2. In addition, the switching circuit is provided with a first switching circuit DD3 disposed along the side 2-D of the display panel 2, and a second switching circuit DD4 disposed along the side 2-D of the display panel 2.

The first adjustment unit KAD3 and the second adjustment unit KAD4 adjust the coil to be used during the touch detection period, as similar to the first adjustment unit KAD1 and the second adjustment unit KAD2.

The first switching circuit DD3 has the fifth switches S5(*n*−6) to S5(*n*+9) connected between the terminal SP and the first adjustment unit KAD3. These fifth switches S5(*n*−6) to S5(*n*+9) are simultaneously or selectively turned into the ON state during the touch detection period, and turned into the OFF state during the display period. The first adjustment unit KAD3 has the signal wirings 605-1(*n*−2) to 605-1(*n*+1) to be connected between the signal lines, which form a winding of the coil, during the touch detection period. FIG. 12 illustrates an example in which the signal lines SL(n−6)

to SL(n−3), SL(n) to SL(n+3) and SL(n+6) to SL(n+9) are used as the signal lines which form the winding of the coil.

The first adjustment unit KAD3 is provided with the signal wiring 605-1(*n*−1), which connects the fifth switch S5(*n*−5) corresponding to the signal line SL(n−5) and the fifth switch S5(*n*+2) corresponding to the signal line SL(n+2) among the signal lines, and the signal wiring 605-1(*n*) which connects the fifth switch S5(*n*+1) corresponding to the signal line SL(n+1) and the fifth switch S5(*n*+8) corresponding to the signal line SL(n+8). In addition, the first adjustment unit KAD3 is provided with the signal wiring 605-1(*n*−2) connected to the fifth switch S5(*n*−4) corresponding to the signal line SL(n−4), and the signal wiring 605-1(*n*+1) connected to the fifth switch S5(*n*+7) corresponding to the signal line SL(n+7).

The fifth switches S5(*n*−3), S5(*n*+3) and S5(*n*+9), which respectively correspond to the signal lines SL(n−3), SL(n+3) and SL(n+9) among the signal lines SL(n−6) to SL(n−3), SL(n) to SL(n+3) and SL(n+6) to SL(n+9) forming the coil, are connected to the voltage wiring VL2 in the first adjustment unit KAD3. In addition, the fifth switches S5(*n*−6), S5(*n*) and S5(*n*+6), which respectively correspond to the signal lines SL(n−6), SL(n) and SL(n+6) among the signal lines SL(n−6) to SL(n−3), SL(n) to SL(n+3) and SL(n+6) to SL(n+9) forming the coil, are connected to the input/output nodes Xp1(*n*−1), Xp1(*n*) and Xp1(*n*+1) of the coil in the first adjustment unit KAD3.

The second switching circuit DD4 is provided with the sixth switches S6(*n*−6) to S6(*n*+9) each of which is connected between each of the signal lines SL(0) to SL(p) and the second adjustment unit KAD4. These sixth switches S6(*n*−6) to S6(*n*+9) are also turned into the ON state during the touch detection period, and turned into the OFF state during the display period.

The second adjustment unit KAD4 is provided with a plurality of signal wirings to be connected between the signal lines forming the coil. In the example of FIG. 12, the second adjustment unit KAD4 is provided with the signal wiring 605-2(*n*−1), which connects the sixth switch S6(*n*−6) corresponding to the signal line SL(n−6) and the sixth switch S6(*n*+2) corresponding to the signal line SL(n+2), and the signal wiring 605-3(*n*−1) which connects the sixth switch S6(*n*−5) corresponding to the signal line SL(n−5) and the sixth switch S6(*n*+3) corresponding to the signal line SL(n+3). In addition, the second adjustment unit KAD4 is provided with the signal wiring 605-2(*n*), which connects the sixth switch S6(*n*) corresponding to the signal line SL(n) and the sixth switch S6(*n*+8) corresponding to the signal line SL(n+8), and the signal wiring 605-3(*n*) which connects the sixth switch S6(*n*+1) corresponding to the signal line SL(n+1) and the sixth switch S6(*n*+9) corresponding to the signal line SL(n+9).

Further, the second adjustment unit KAD4 is provided with the signal wiring 605-2(*n*−2) connected to the sixth switch S6(*n*−4) corresponding to the signal line SL(n−4), the signal wiring 605-3(*n*−2) connected to the sixth switch S6(*n*−3) corresponding to the signal line SL(n−3), the signal wiring 605-2(*n*+1) connected to the sixth switch S6(*n*+6) corresponding to the signal line SL(n+6), and the signal wiring 605-3(*n*+1) connected to the sixth switch S6(*n*+7) corresponding to the signal line SL(n+7).

The fifth switches S5(*n*−6) to S5(*n*+9) and the sixth switches S6(*n*−6) to S6(*n*+9) are turned into the OFF state during the display period. Accordingly, the first adjustment unit KAD3 and the second adjustment unit KAD4 are electrically separated from the signal lines SL(n−6) to SL(n+9). At this time, the signal line selector 3 connects a suitable signal line among the signal lines SL(n−6) to SL(n+9) to the terminal SP according to the selection signals SEL1 and SEL2 (FIG. 5). The image signal from the driver semiconductor device DDIC (the display control device 4) is supplied to the terminal SP during the display period, and is supplied to a suitable signal line via the signal line selector 3. As the scan lines GL(0) to GL(p) become sequentially the high level, the image is displayed according to the image signal on the display panel 2.

On the other hand, the signal line selector 3 electrically connects the terminals SP and the signal lines SL(n−6) to SL(n+9) during the touch detection period. That is, all the switches SW11, schematically illustrated in FIG. 12, are turned into the ON state. In addition, the fifth switches S5(*n*−6) to S5(*n*+9) and the sixth switches S6(*n*−6) to S6(*n*+9) are simultaneously or selectively turned into the ON state during the touch detection period. Accordingly, the first adjustment unit KAD3 and the second adjustment unit KAD4 are electrically connected to the signal lines SL(n−6) to SL(n+9). At this time, the signal wirings Sd(0) to Sd(n) from the driver semiconductor device DDIC (the display control device 4) are in a high impedance state.

Figure 13:
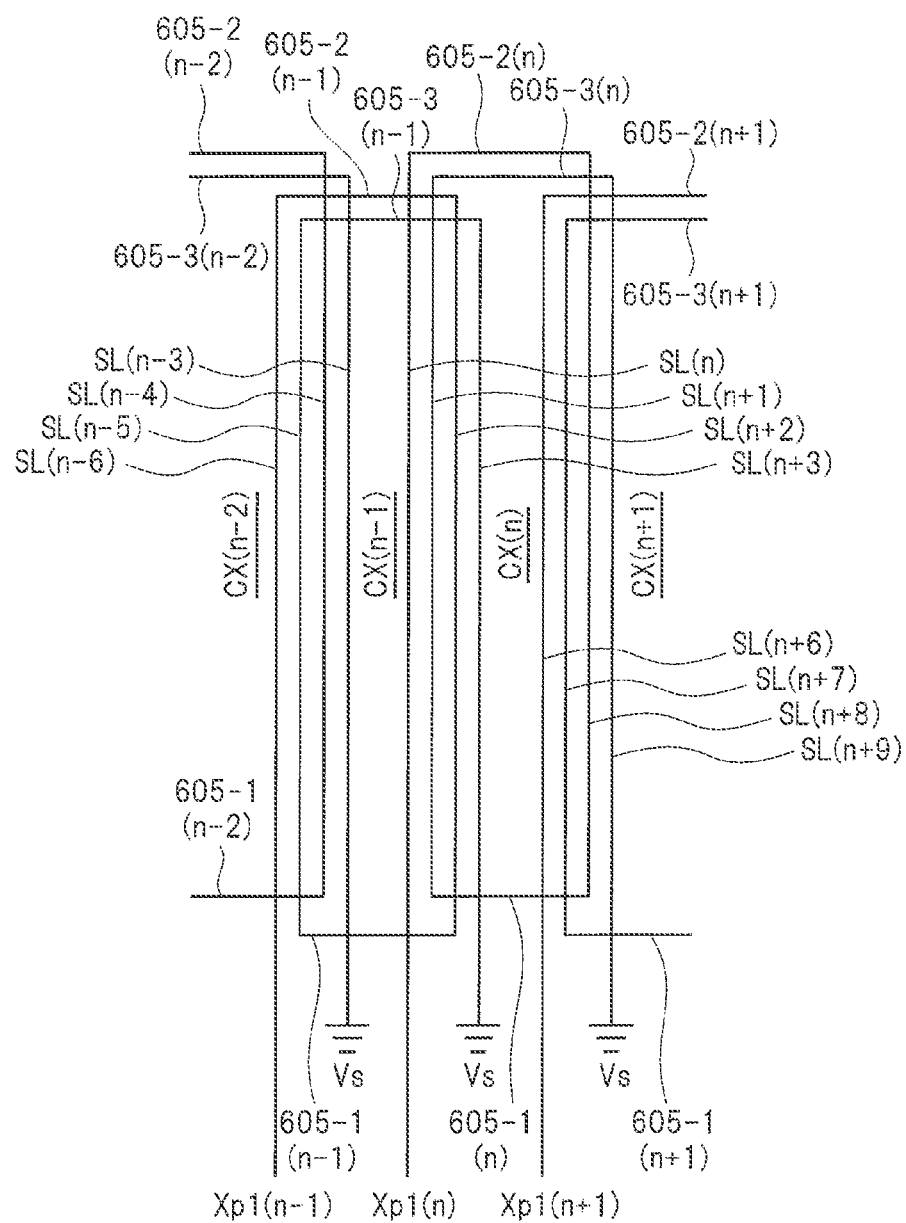
FIG. 13 is a circuit diagram illustrating a configuration of a coil according to the second embodiment.

Accordingly, as illustrated in FIG. 13, the coil CX(n−1) to CX(n+1) are formed of the signal lines SL(n−6) to SL(n−3), SL(n) to SL(n+3) and SL(n+6) to SL(n+9) and the signal wirings in the first adjustment unit KAD3 and the second adjustment unit KAD4 during the touch detection period. For example, a description will be given by exemplifying the coil CX(n) as follows. That is, in the coil CX(n), the signal lines SL(n), SL(n+8), SL(n+1) and SL(n+9) and the signal wirings 605-1(*n*), 605-2(*n*) and 605-3(*n*) are connected in series between the input/output node Xp1(*n*) of the coil and the ground voltage Vs when the fifth switches S5(*n*), S5(*n*+1), S5(*n*+8) and S5(*n*+9) and the sixth switches S6(*n*), S6(*n*+1), S6(*n*+8) and S6(*n*+9) are simultaneously or selectively turned into the ON state. Here, since the signal lines SL(n), SL(n+8), SL(n+1) and SL(n+9) are disposed to be parallel with each other, thereby forming the winding. The same applies to the other coil CX(n−1) and the like.

As illustrated in FIG. 13, the coils CX(n−2) to CX(n+1) overlap with each other also in the second embodiment. When a description is given by exemplifying the coil CX(n), the signal lines SL(n+2) and SL(n+3), which are adjacent to each other and form the coil CX(n−1), and the signal lines SL(n+6) and SL(n+7), which are adjacent to each other and form the coil CX(n+1), are disposed at an inner side of the coil CX(n). Accordingly, similar to the first embodiment, it is possible to prevent generation of the portion in which the magnetic field is weak, and to prevent the reduction of the accuracy in the touch detection.

Figure 14:
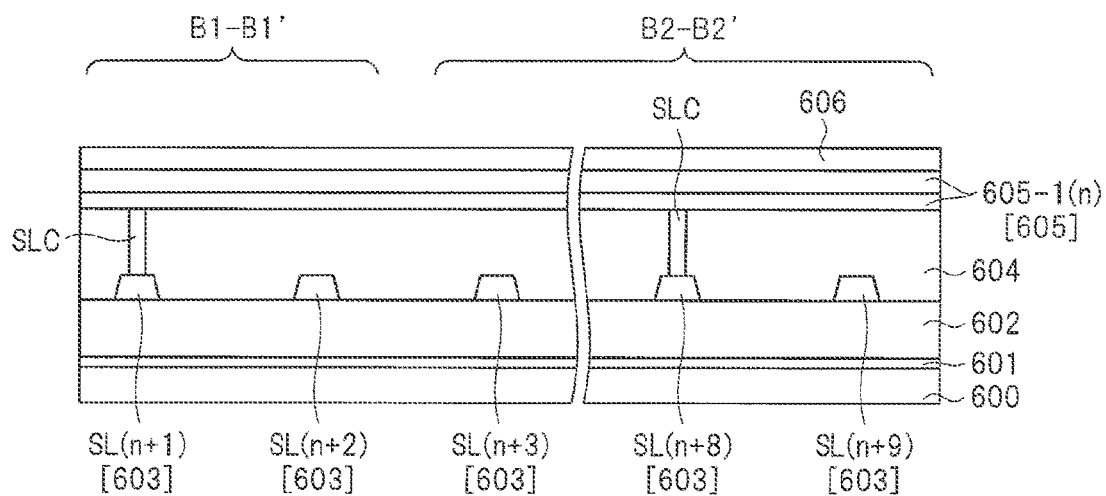
FIG. 14 is a cross-sectional view illustrating a cross-section of the liquid crystal display device according to the second embodiment.

The first adjustment unit KAD3 and the second adjustment unit KAD4 are disposed outside the active area of the display panel 2 (the pixel array LCD) also in the second embodiment, similar to the first embodiment. That is, the signal wirings to be included in the first adjustment unit KAD3 and the second adjustment unit KAD4 are configured using the wirings disposed outside the active area of the display panel 2. When a description is given with the example illustrated FIG. 12, the signal wirings 605-1(*n*−2) to 605-1(*n*+1), 605-2(*n*−2) to 605-2(*n*+1) and 605-3(*n*−2) to 605-3(*n*+1) are configured using wirings disposed outside the active area of the display panel 2. Here, a description will be given regarding a structure of a signal wiring using the wiring disposed outside the active area of the display panel 2 by exemplifying the signal wiring 605-1(*n*). FIG. 14 is a cross-sectional view illustrating a cross-section of B1-B1' and a cross-section of B2-B2' of FIG. 12. Here, a structure of the cross-section in the display panel 2 is similar to the structure illustrated in FIG. 6, and thus, a description thereof will be omitted.

In FIG. 14, [603] represents the wiring of the second wiring layer, and [605] represents the wiring of the third wiring layer. The signal lines SL(0) to SL(p) are configured using the wirings formed in the second wiring layer. The signal line formed in the display panel 2 is connected to the wiring of the second wiring layer in the first adjustment unit KAD3 and the second adjustment unit KAD4 via the first switching circuit DD3 and the second switching circuit DD4. In FIG. 14, SL(n+1)[603] to SL(n+3)[603] and SL(n+8)[603] represent the wirings of the second wiring layer to which the signal lines SL(n+1) to SL(n+3) and SL(n+8) are connected in the first adjustment unit KAD3. The signal wiring 605-1(*n*) illustrated in FIG. 12 is configured using a wiring 605-1(*n*)[605] formed in the third wiring layer 605. This wiring 605-1(*n*)[605] is connected to the signal lines SL(n+1)[603] and SL(n+8)[603] via the interlayer wiring SLC. In this case, the wiring 605-1(*n*)[605] includes a wiring corresponding to the auxiliary electrode SM and a wiring corresponding to the drive electrode. Incidentally, the first adjustment unit KAD3 and the second adjustment unit KAD4 are present outside the active area of the display panel 2, and thus, the liquid crystal layer 607 is not necessarily formed on the insulating layer 606 illustrated in FIG. 14.

In this second embodiment, the wiring of the third wiring layer 605 is used as the signal wiring to be connected between the signal lines in order to form the coil. That is, the wirings of the same wiring layer as the drive electrode TL and the auxiliary electrode SM are used as the signal wirings 605-1(*n*−2) to 605-1(*n*+1), 605-2(*n*−2) to 605-2(*n*+1) and 605-3(*n*−2) to 605-3(*n*+1). In addition, the signal line is used as the winding of the coil. Thus, it is possible to form the coil without additionally providing the wiring layer, thereby suppressing the increase of the price. For example, when the drive electrode TL and the auxiliary electrode are formed in the active area of the display panel 2, it may be configured such that a wiring is formed also at the outer side of the display panel 2 (outside the active area), and the wiring formed at the outer side of the display panel 2 is used as the above-described signal wiring.

In addition, it may be configured such that a wiring, which is parallel with the drive electrode TL and the auxiliary electrode, is also formed outside the active area of the display panel 2 when the drive electrode TL and the auxiliary electrode are formed, and the wiring formed at the outer side of the display panel 2 is used as the above-described signal wiring. In this case, a portion which is not connected to the signal wiring may be cut. The unnecessary portion of the wiring, which is cut, may be left or removed.

Figure 15:
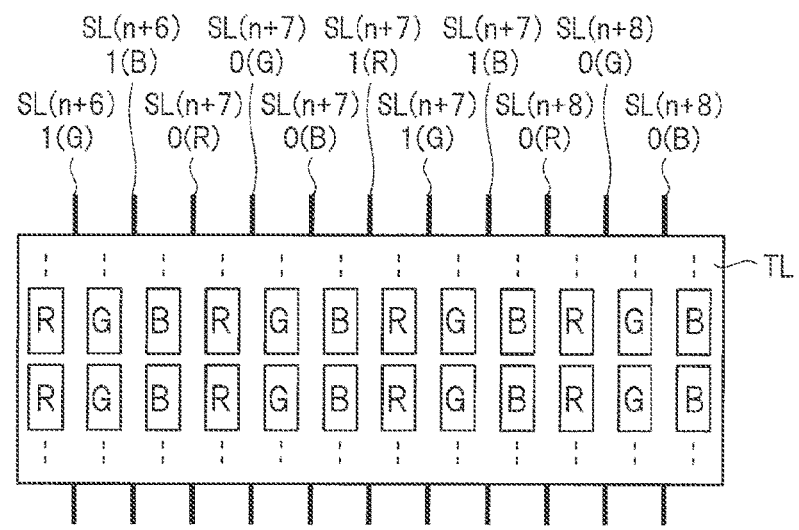
FIG. 15 is a plan view illustrating a partial plane of a display panel according to the second embodiment.

FIG. 15 is a plan view illustrating the area C1 around the broken line circle of FIG. 12 in detail. In FIG. 15, R, G and B represent the pixels of the three primary colors, and TL represents the drive electrode. In addition, SL(n+6)1(G) to SL(n+8)0(G), SL(n+6)1(B) to SL(n+8)0(B) and SL(n+7)0(R) to SL(n+8)0(R) represent the signal lines.

In this second embodiment, the plurality of signal lines among the signal lines SL(n+6)1(G) to SL(n+8)0(G), SL(n+6)1(B) to SL(n+8)0(B) and SL(n+7)0(R) to SL(n+8)0(R) illustrated in FIG. 15 are used as the signal line SL(n+8) illustrated in FIG. 12. That is, the plurality of signal lines are connected to each other to form one signal line, and used as a winding of a coil when forming the coil using the signal line. Accordingly, similar to the first embodiment, it is possible to reduce the resistance of the coil. In this case, it is desirable that several tens of signal lines, for example, be electrically connected to each other to be used as the winding of the coil.

Since the number of turns of the coil is also two in the second embodiment, it is possible to strengthen the magnetic field at the time of the touch detection. As a matter of course, the number of turns is not limited to two.

It is possible to increase the number of turns of the coil by changing the connection in the first adjustment unit KAD3 and the second adjustment unit KAD4. In addition, it is possible to use any signal line as the winding of the coil by changing the connection in the first adjustment unit KAD3 and the second adjustment unit KAD4. Further, it is possible to change the overlapping amount between the coils adjacent to each other by changing the connection in the first adjustment unit KAD3 and the second adjustment unit KAD4. That is, it is possible to adjust the coil to be used during the touch detection period by the adjustment unit.

In addition, since the number of turns of the coil is equal to or larger than two, the detection accuracy of the magnetic field to be generated by a pen is also increased.

Although the description has been given regarding the example in which the wiring of the third wiring layer 605 is used as the signal wiring, the invention is not limited thereto. For example, the wiring of the first wiring layer may be used as the signal wirings 605-1(*n*−2) to 605-1(*n*+1), 605-2(*n*−2) to 605-2(*n*+1) and 605-3(*n*−2) to 605-3(*n*+1). In this case, the wirings to be used as the signal wirings 605-1(*n*−2) to 605-1(*n*+1), 605-2(*n*−2) to 605-2(*n*+1) and 605-3(*n*−2) to 605-3(*n*+1) are formed when forming the scan lines GL(0) to GL(p), and accordingly, it is possible to suppress the increase of the price also in this case.

In this second embodiment, the image signal is supplied to the signal lines SL(0) to SL(p) during the display period, and the drive signal for generating the magnetic field for the touch detection is supplied via the first switching circuit DD3 during the touch detection period. Thus, it is possible to say that the signal lines SL(0) to SL(p) are the common signal lines to be used for both the display and the generation of the magnetic field for the touch detection.

In the second embodiment, the signal lines SL(0) to SL(p) are connected to the first adjustment unit KAD3 via the first switching circuit DD3 during the touch detection period. Thus, it is possible to say that the plurality of signal lines are connected to each other by the first switching circuit DD3 and the first adjustment unit KAD3 to form the coil during the touch detection period. In the case of being regarded as above, it is possible to say that a first adjustment and selection unit is configured using the first adjustment unit KAD3 and the first switching circuit DD3. Similarly, it is possible to say that a second adjustment and selection unit is configured using the second switching circuit DD4 and the second adjustment unit KAD4. Further, it is possible to say that the liquid crystal display device 1 is provided with the adjustment and selection unit which includes the first adjustment and selection unit disposed along the side 2-D of the display panel 2, and the second adjustment and selection unit disposed along the side 2-U of the display panel 2.

Third Embodiment

FIG. 16 is a plan view illustrating the layout of the liquid crystal display device according to the third embodiment. In the first embodiment, the plurality of drive electrodes TL(0) to TL(p) and the auxiliary electrode SM, which are disposed to be parallel with the signal lines SL(0) to SL(p), are used as the winding of the coil during the touch detection period.

In contrast, the plurality of drive electrodes TL(0) to TL(p) and the auxiliary electrode SM are disposed so as to intersect the signal lines SL(0) to SL(p), and these drive electrodes TL(0) to TL(p) and auxiliary electrode SM are used as the winding of the coil during the touch detection period in the third embodiment.

In this third embodiment, the signal lines SL(0) to SL(p) are disposed to be parallel with the sides 2-R and 2-L of the display panel 2 (the pixel array LCD) illustrated in FIG. 5, and the drive electrodes TL(0) to TL(p) are disposed to be parallel with the sides 2-U and 2-D of the display panel 2. In this case, the signal line selector 3 and the display control device 4 (the driver semiconductor device DDIC) are disposed along the side 2-D of the display panel 2 as illustrated in FIG. 5.

FIG. 16 illustrates a part of the display panel 2. That is, a portion in relation to the drive electrodes TL(n−6) to TL(n+9) and the auxiliary electrode SM is illustrated. The adjustment unit and the switching circuit are disposed outside the active area of the display panel 2, and the adjustment unit is provided with a first adjustment unit KAD5 disposed along the side 2-R of the display panel 2, and a second adjustment unit KAD6 disposed along the side 2-L of the display panel 2 also in this embodiment. In addition, the switching circuit is also provided with a first switching circuit DD5 disposed along the side 2-R of the display panel 2, and a second switching circuit DD6 disposed along the side 2-L of the display panel 2. Hereinafter, a description will be given based on the portion of the display panel 2 illustrated in FIG. 16. Incidentally, reference numeral SM of the auxiliary electrode is attached only to the auxiliary electrodes provided in the drive electrode TL(n−6) and TL(n+9) in order to prevent the complicacy of the drawing.

Similar to FIG. 8, coils CY(n−2) to CY(n+1) are configured using the drive electrodes TL(n−6) to TL(n−3), TL(n) to TL(n+3) and TL(n+6) to TL(n+9) and the auxiliary electrodes SM formed on these drive electrodes during the touch detection period also in FIG. 16. The coils CY(n−2) to CY(n+1) are disposed in a direction to intersect the signal lines SL(0) to SL(p). That is, each of the coils CY(n−2) to CY(n+1) extends in the horizontal direction (row direction) of the display panel 2 and is disposed in parallel in the vertical direction (column direction). In addition, the drive electrodes TL(n), TL(n+1), TL(n+8) and TL(n+9) are used as a winding of the coil CY(n), and the drive electrodes TL(n−6), TL(n−5), TL(n+2) and TL(n+3) are used as a winding of the coil CY(n−1). Further, the drive electrodes TL(n−3) and TL(n−4) are used as a winding of the coil CY(n−2), and the drive electrodes TL(n+6) and TL(n+7) are used as a winding of the coil CY(n+1).

In this third embodiment, the input/output nodes Yp1(n−1) to YP1(n+1) of the coil are provided alternately in the first switching circuit DD5 and the second switching circuit DD6 although not particularly limited. That is, the input/output node Yp1(n−1) of the coil CY(n−1) and the input/output node Yp1(n+1) of the coil CY(n+1) are provided in the second switching circuit DD6, and the input/output node Yp1(n) of the coil CY(n) is provided in the first switching circuit DD5.

The first adjustment unit KAD5 is provided with the signal wirings 603-1(n), 603-1(n−2), 603-2(n−1), 603-2(n+1), 603-3(n−1) and 603-3(n+1) which are connected to the drive electrode and the auxiliary electrode on the side 2-R side of the display panel 2. Here, the signal wiring 603-1(n) connects between the drive electrode TL(n+1) and the auxiliary electrode SM, and between the drive electrode TL(n+8) and the auxiliary electrode SM. In addition, the signal wiring 603-2(n−1) connects between the drive electrode TL(n−5) and the auxiliary electrode SM, and between the drive electrode TL(n+3) and the auxiliary electrode SM, and the signal wiring 603-3(n−1) connects between the drive electrode TL(n−6) and the auxiliary electrode SM, and between the drive electrode TL(n+2) and the auxiliary electrode SM. Further, the signal wiring 603-1(n−2) is connected to the drive electrode TL(n−4) and the auxiliary electrode SM, the signal wiring 603-2(n+1) is connected to the drive electrode TL(n+7) and the auxiliary electrode SM, and the signal wiring 603-3(n+1) is connected to the drive electrode TL(n+6) and the auxiliary electrode SM.

In addition, the second adjustment unit KAD6 is provided with the signal wirings 603-1(n−1), 603-2(n), 603-3(n), 603-1(n+1), 603-2(n−2) and 603-3(n−2) which are connected to the drive electrodes on the side 2-L side of the display panel 2. Here, the signal wiring 603-1(n−1) connects between the drive electrode TL(n−5) and the auxiliary electrode SM, and between the drive electrode TL(n+2) and the auxiliary electrode SM. In addition, the signal wiring 603-2(n) connects between the drive electrode TL(n) and the auxiliary electrode SM, and between the drive electrode TL(n+8) and the auxiliary electrode SM, and the signal wiring 603-3(n) connects between the drive electrode TL(n+1) and the auxiliary electrode SM, and between the drive electrode TL(n+9) and the auxiliary electrode SM. Further, the signal wiring 603-3(n−2) is connected to the drive electrode TL(n−3) and the auxiliary electrode SM, the signal wiring 603-2(n−2) is connected to the drive electrode TL(n−4) and the auxiliary electrode SM, and the signal wiring 603-1(n+1) is connected to the drive electrode TL(n+7) and the auxiliary electrode SM.

Figure 17:
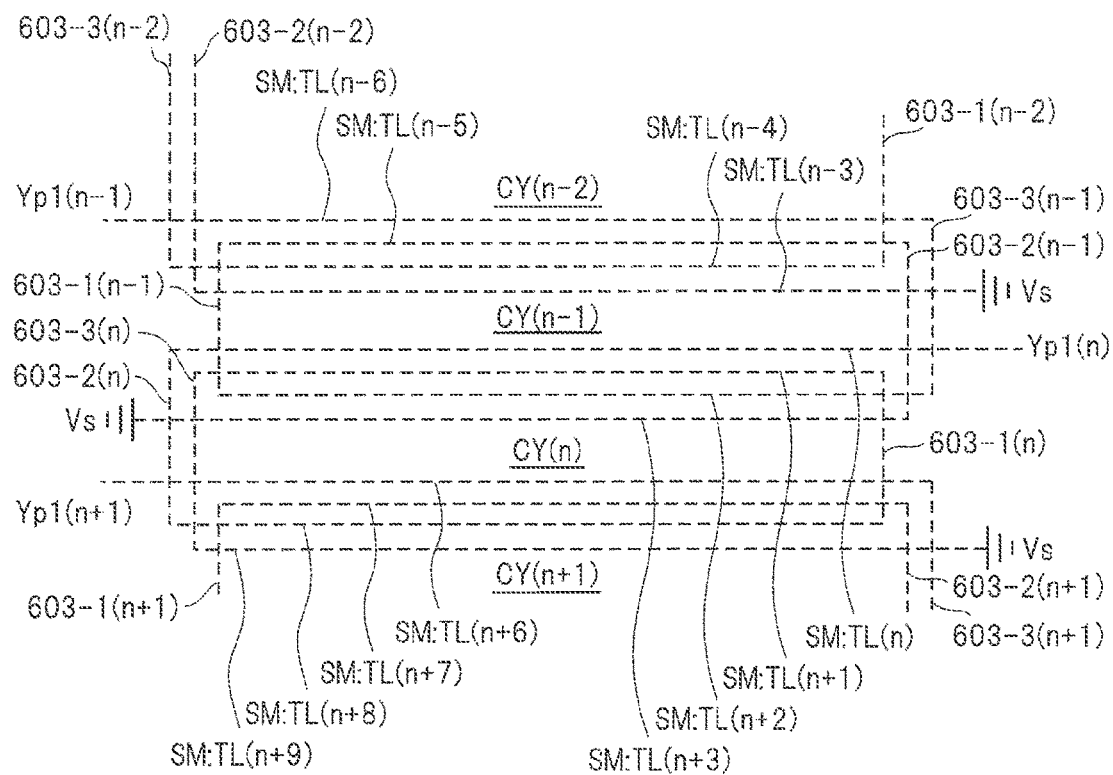
FIG. 17 is a circuit diagram illustrating a configuration of a coil according to the third embodiment.

Accordingly, as illustrated in FIG. 17, the coils CY(n−2) to CY(n+1) are configured using the drive electrodes and the auxiliary electrodes and the signal wirings. A display form of the auxiliary electrode and the drive electrode in FIG. 17 is the same as that of FIG. 9.

The first switching circuit DD5 is provided with the seventh switches S7(n−6) to S7(n+9), the eighth switch S8(n) and the ninth switches S9(n) and S9(n−1). Each of the seventh switches S7(n−6) to S7(n+9) is connected between each of the drive electrodes TL(n−6) to TL(n+9) and the auxiliary electrodes SM, and the voltage wiring VL1 on the side 2-R side of the display panel 2, and these seventh switches are turned into the OFF state during the touch detection period, and are simultaneously or selectively turned into the ON state during the display period. The eighth switch S8(n) is connected between the drive electrode TL(n) and the auxiliary electrode SM, and the input/output node Yp1(n) on the side 2-R side of the display panel 2. In addition, the ninth switch S9(n) is connected between the drive electrode TL(n+9) and the auxiliary electrode SM, and the voltage wiring VL2 on the side 2-R side of the display panel 2, and the ninth switch S9(n−1) is connected between the drive electrode TL(n−3) and the auxiliary electrode SM, and the voltage wiring VL2 on the side 2-R side of the display panel 2.

The second switching circuit DD6 has the same configuration as the first switching circuit DD5. That is, the second switching circuit DD6 is provided with the tenth switches S10(n−6) to S10(n+9), the eleventh switches S11(n+1) and S11(n−1) and the twelfth switch S12(n−1). Each of the tenth switches S10(n−6) to S10(n+9) is connected between each of the drive electrodes TL(n−6) to TL(n+9) and the auxiliary electrodes SM, and the voltage wiring VL1 on the side 2-L side of the display panel 2, and these tenth switches are turned into the OFF state during the touch detection period, and are simultaneously or selectively turned into the ON state during the display period.

The eleventh switch S11($n$−1) is connected between the drive electrode TL(n−6) and the auxiliary electrode SM, and the input/output node Yp1($n$−1) on the side 2-L side of the display panel 2, and the eleventh switch S11($n$+1) is connected between the drive electrode TL(n+6) and the auxiliary electrode SM, and the input/output node Yp1($n$+1) on the side 2-L side of the display panel 2. In addition, the twelfth switch S12($n$−1) is connected between the drive electrode TL(n+3) and the auxiliary electrode SM, and the voltage wiring VL2 on the side 2-L side of the display panel 2.

The eighth switch S8($n$) and the eleventh switches S11 ($n$−1) and S11($n$+1) are turned into the OFF state during the display period, and are simultaneously or selectively turned into the ON state during the touch detection period. In addition, the ninth switches S9($n$−1) and S9($n$) and the twelfth switch S12($n$−1) are turned into the OFF state during the display period, and turned into the ON state during the touch detection period.

The seventh switches S7($n$−6) to S7($n$+9) and the tenth switches S10($n$−6) to S10($n$+9) are simultaneously or selectively turned into the ON state during the display period. Accordingly, the voltage VCOMDC in the voltage wiring VL1 is supplied to the drive electrodes TL(n−6) to TL(n+9) as the display drive signal. That is, the display drive signal is supplied to the drive electrodes TL(n−6) to TL(n+9) from both the first switching circuit DD5 and second switching circuit DD6.

On the other hand, the seventh switches S7($n$−6) to S7($n$+9) and the tenth switches S10($n$−6) to S10($n$+9) are turned into the OFF state during the touch detection period, and thus, the drive electrodes TL(n−6) to TL(n+9) are separated from the voltage wiring VL1. When the ninth switch S9($n$), S9($n$−1) and the twelfth switch S12($n$−1) are turned into the ON state at this time, any one end portion of the coils CY(n), CY(n−1) and CY(n+1) is connected to the voltage wiring VL2 via the ninth switch and the twelfth switch as illustrated in FIG. 17, and the ground voltage Vs is supplied thereto.

In addition, when the eighth switch S8($n$) and the eleventh switch S11($n$−1) to S11($n$+1) are turned into the ON state during the touch detection period, the other end portions of the coils CY(n−1) to CY(n+1) are connected to the input/output nodes Yp1($n$−1) to Yp1($n$+1) as illustrated in FIG. 17. When a description is given by exemplifying the coil CY(n) illustrated in FIG. 17, the drive electrodes TL(n), TL(n+1), TL(n+8) and TL(n+9) and the signal wirings 603-1($n$), 603-2($n$) and 603-3($n$) are connected in series between the input/output node Yp1($n$) and the ground voltage Vs. The drive electrodes TL(n), TL(n+1), TL(n+8) and TL(n+9) are disposed in parallel with each other, thereby forming the coil CY(n). The same applies to the other coils.

Figure 18:
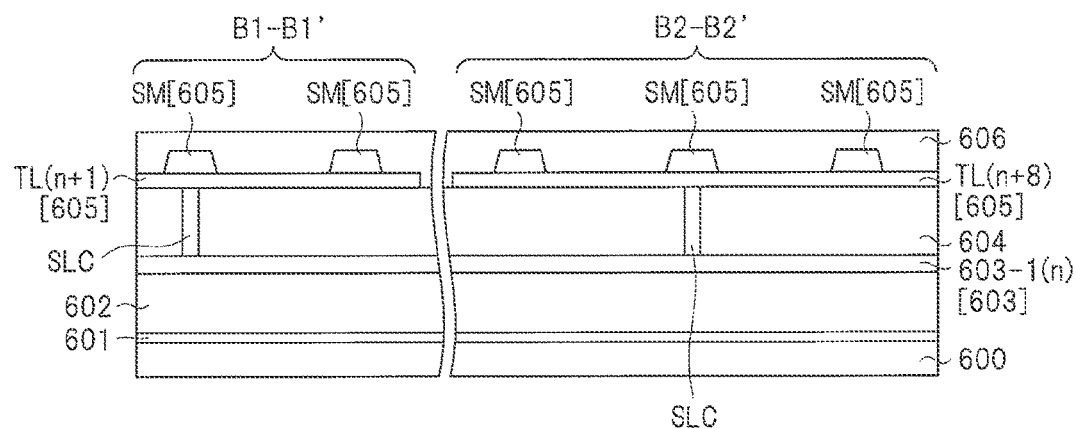
FIG. 18 is a cross-sectional view illustrating a cross-section of the liquid crystal display device according to the third embodiment.

Similar to the first and second embodiments, the first adjustment unit KAD5 and the second adjustment unit KAD6 are disposed outside the active area of the display panel 2 (the pixel array LCD) also in the third embodiment. That is, the signal wirings to be included in the first adjustment unit KAD5 and the second adjustment unit KAD6 are configured using wirings disposed outside the active area of the display panel 2. When a description is given with the example illustrated in FIG. 16, the signal wirings 603-1($n$−2) to 603-1($n$+1), 603-2($n$−2) to 603-2($n$+1) and 603-3($n$−2) to 603-3($n$+1) are configured using the wirings disposed outside the active area of the display panel 2. Here, a description will be given regarding a structure of a signal wiring using the wiring disposed outside the active area of the display panel 2 by exemplifying the signal wiring 603-1($n$). FIG. 18 is a cross-sectional view illustrating a cross-section of B1-B1' and a cross-section of B2-B2' of FIG. 16. Here, a structure of the cross-section in the display panel 2 is similar to the structure illustrated in FIG. 6, and thus, a description thereof will be omitted.

In FIG. 18, [603] represents the wiring of the second wiring layer 603, and [605] represents the wiring of the third wiring layer 605. The drive electrodes TL(0) to TL(p) and the auxiliary electrodes SM are configured using the wirings formed in the third wiring layer. The drive electrodes TL(0) to TL(p) and the auxiliary electrodes SM formed in the display panel 2 extend to the first adjustment unit KAD5 and the second adjustment unit KAD6 which are disposed outside the active area of the display panel 2. FIG. 18 illustrates the drive electrodes TL(n+1) and TL(n+8) extending to the first adjustment unit KAD5 and the auxiliary electrodes SM formed on these drive electrodes. The drive electrodes TL(n+1) and TL(n+8) and the auxiliary electrodes SM are represented as TL(n+1)[605] and TL(n+8)[605] and SM[605] in FIG. 18 in order to specify that these drive electrodes and auxiliary electrodes are configured using the wirings of the third wiring layer 605.

Although the description has been given by exemplifying the first adjustment unit KAD5, the drive electrode and the plurality of auxiliary electrodes SM formed in the third wiring layer 605 are electrically connected to the signal wiring of the second wiring layer 603, for example, to the signal wiring 603-3($n$), via the interlayer wiring SLC, similarly in the second adjustment unit KAD6.

In addition, in the first adjustment unit KAD5 and/or the second adjustment unit KAD6, the signal wiring to be connected between the drive electrodes (including the plurality of auxiliary electrodes SM) formed in the third wiring layer 605 is not limited to the signal wiring formed in the second wiring layer 603, but may use the signal wiring formed in the first wiring layer 601.

In this third embodiment, the signal wiring to be included in the first adjustment unit KAD5 and the second adjustment unit KAD is configured using the wirings of the second wiring layer. That is, the signal wiring 603-1($n$) is configured using the wiring 603-1($n$)[603] formed in the second wiring layer 603. This wiring 603-1($n$)[603] is connected to the drive electrode TL(n+1)[605] and the auxiliary electrode SM[605], and the drive electrode TL(n+8)[605] and the auxiliary electrode SM[605] via the interlayer wiring SLC. Incidentally, the first adjustment unit KAD5 and the second adjustment unit KAD6 are present outside the active area of the display panel 2, and thus, the liquid crystal layer 607 is not necessarily formed on the insulating layer 606 illustrated in FIG. 18.

In this third embodiment, the wiring of the second wiring layer 603 is used as the signal wiring that connects the drive electrodes in order to form the coil. That is, the wirings of the same wiring layer as the signal lines SL(0) to SL(p) are used as the signal wirings 603-1($n$−2) to 603-1($n$+1), 603-2($n$−2) to 603-2($n$+1) and 603-3($n$−2) to 603-3($n$+1). In addition, the drive electrode and the auxiliary electrode are used as a winding of the coil. Thus, it is possible to form the coil without additionally providing the wiring layer, thereby suppressing the increase of the price.

It may be configured such that a wiring, which is parallel with the signal lines SL(0) to SL(p), is also formed outside the active area of the display panel 2 when forming the signal lines SL(0) to SL(p), and the wiring formed at the outer side of the display panel 2 is used as the above-described signal wiring. In this case, a portion which is not connected to the drive electrode may be cut. The unnecessary portion of the wiring, which is cut, may be left or removed.

Figure 19:
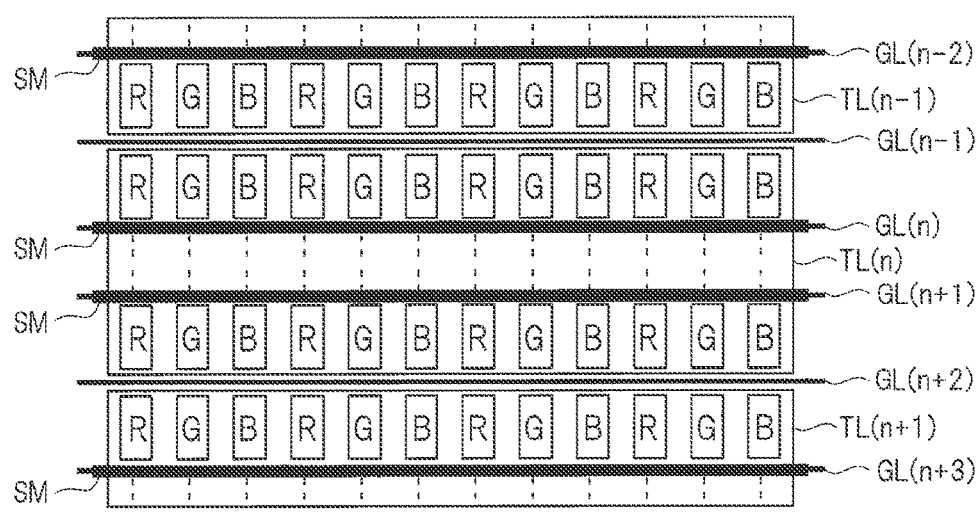
FIG. 19 is a plan view illustrating a partial plane of a display panel according to the third embodiment.

FIG. 19 is a plan view illustrating the area C1 surrounded by the broken line circle of FIG. 16 in detail. In FIG. 19, R, G and B represent the pixels of the three primary colors, and TL(n−1) to TL(n+1) represent the drive electrodes. In addition, SM represents the auxiliary electrode which is electrically connected to the drive electrode. Further, GL(n−2) to GL(n+3) represent the scan lines in FIG. 19.

As illustrated in FIG. 19, the plurality of auxiliary electrodes SM are connected to the single drive electrode TL(n). For example, several tens of the auxiliary electrodes SM extend in parallel with the drive electrode TL(n) and are connected to the drive electrode TL(n). Accordingly, it is possible to reduce the resistance of the coil when forming the coil using the drive electrode and the auxiliary electrode SM.

Since the number of turns of the coil is also two in the third embodiment, it is possible to strengthen the magnetic field at the time of the touch detection. As a matter of course, the number of turns is not limited to two.

It is possible to increase the number of turns of the coil by changing the connection in the first adjustment unit KAD5 and the second adjustment unit KAD6. In addition, it is possible to use any drive electrode as a winding of the coil by changing the connection in the first adjustment unit KAD5 and the second adjustment unit KAD6. Further, it is possible to change the overlapping amount between the coils adjacent to each other by changing the connection in the first adjustment unit KAD5 and the second adjustment unit KAD6. That is, it is possible to adjust the coil to be used during the touch detection period by the adjustment unit.

In addition, since the number of turns of the coil is equal to or larger than two, the detection accuracy of the magnetic field to be generated by a pen is also increased.

Although the description has been given regarding the example in which the wiring of the second wiring layer 603 is used as the signal wiring, the invention is not limited thereto. For example, the wiring of the first wiring layer 601 may be used as the signal wiring, or the wiring of the third wiring layer 605 may be used as the signal wiring.

Thus, it is possible to say that the drive electrodes TL(0) to TL(p) are the common electrodes to be used for both the display and the generation of the magnetic field for the touch detection also in the third embodiment.

Further, since the input/output nodes Yp1(*n*), Yp1(*n*+1) and Yp1(*n*−1) of the coil are alternately disposed on the sides 2-R and 2-L of the display panel 2 in the third embodiment, the drive signal to be supplied to the coil is distributed into both the sides of the display panel 2. Accordingly, it is possible to prevent an increase in size of a picture frame of the sides 2-R and 2-L of the display panel 2.

Fourth Embodiment

FIG. 20 is a plan view illustrating the layout of the liquid crystal display device according to the fourth embodiment. In the fourth embodiment, the coil is configured of the scan lines GL(0) to GL(p) during the touch detection period, which is different from the first to third embodiments.

FIG. 20 illustrates a portion in relation to the scan lines GL(n−6) to GL(n+9) of the display panel 2. Hereinafter, the fourth embodiment will be described with reference to FIG. 20.

In FIG. 20, 5-R(n−6) to 5-R(n+9) and 5-L(n−6) to 5-L(n+9) represent unit gate drivers to be included in the gate driver 5. In FIG. 20, reference numerals 5-R(n−6), 5-L(n−6), 5-R(n+9) and 5-L(n+9) are attached only to the unit gate drivers drawn at the uppermost stage and the unit gate drivers drawn at the lowermost stage in order to prevent the complicacy of the drawing. The gate driver 5 (FIG. 5) is also disposed outside the active area of the display panel 2 in FIG. 20. That is, the unit gate drivers 5-R(n−6) to 5-R(n+9) are disposed along the side 2-R of the display panel 2, and the unit gate drivers 5-L(n−6) to 5-L(n+9) are disposed along the side 2-L of the display panel 2.

The unit gate drivers 5-R(n−6) to 5-R(n+9) and 5-L(n−6) to 5-L(n+9) output and supply the scan line signals, which sequentially become the high level, to the corresponding scan lines GL(n−6) to GL(n+9) during the display period. In contrast, the unit gate drivers 5-R(n−6) to 5-R(n+9) and 5-L(n−6) to 5-L(n+9) set each output thereof to be in the high impedance state during the touch detection period.

The adjustment unit and the switching circuit are disposed outside the active area of the display panel 2 also in the fourth embodiment. The adjustment unit is provided with a first adjustment unit KAD7 disposed along the side 2-R of the display panel 2, and a second adjustment unit KAD8 disposed along the side 2-L of the display panel 2. In addition, the switching circuit is provided with a first switching circuit DD7 disposed along the side 2-R, and a second switching circuit DD8 disposed along the side 2-L.

The first switching circuit DD7 is connected between the scan lines GL(n−6) to GL(n+9) and the first adjustment unit KAD7 on the side 2-R side. That is, the first switching circuit DD7 is provided with the thirteenth switches S13(*n*−6) to S13(*n*+9) each of which is connected between each of the scan lines GL(n−6) to GL(n+9) and the first adjustment unit KAD7. Since each output of the unit gate drivers 5-R(n−6) to 5-R(n+9) is connected to the scan line on the side 2-R side, it is possible to say that the first switching circuit DD7 is connected between the output of the unit gate driver and the first adjustment unit KAD7.

The second switching circuit DD8 is connected between each of the scan lines GL(n−6) to GL(n+9) and the second adjustment unit KAD8 on the side 2-L side. That is, the second switching circuit DD8 is provided with the fourteenth switches S14(*n*−6) to S14(*n*+9) each of which is connected between each of the scan lines GL(n−6) to GL(n+9) and the second adjustment unit KAD8. Since each output of the unit gate drivers 5-L(n−6) to 5-L(n+9) is also connected to the scan line on the side 2-L side, it is possible to say that the second switching circuit DD8 is connected between the output of the unit gate driver and the second adjustment unit KAD8.

In this fourth embodiment, the coils CY(n−2) to CY(n+1) are configured of the scan lines GL(n−6) to GL(n−3), GL(n) to GL(n+3) and GL(n+6) to GL(n+9). In this case, the scan lines GL(n), GL(n+1), GL(n+8) and GL(n+9) are used as a winding of the coil CY(n), and the scan lines GL(n−6), GL(n−5), GL(n+2) and GL(n+3) are used as a winding of the coil CY(n−1). In addition, the scan lines GL(n−3) and GL(n−4) are used as a winding of the coil CY(n−2), and the scan lines GL(n+6) and GL(n+7) are used as a winding of the coil CY(n+1).

The input/output nodes Yp1(*n*−1) to YP1(*n*+1) of the coil are alternately provided in the first switching circuit DD7 and the second switching circuit DD8 also in this fourth embodiment. That is, the input/output node Yp1(*n*−1) of the coil CY(n−1) and the input/output node Yp1(*n*+1) of the coil CY(n+1) are provided in the second switching circuit DD8, and the input/output node Yp1(*n*) of the coil CY(n) is provided in the first switching circuit DD7.

The first adjustment unit KAD7 is provided with the signal wirings 603-1(*n*), 603-1(*n*−2), 603-2(*n*−1), 603-2(*n*+1), 603-3(*n*−1) and 603-3(*n*+1), which are connected to the scan line, when the thirteenth switches S13(*n*−6) to S13(*n*+9) are turned into the ON state, that is, during the touch detection period. Here, the signal wiring 603-1(*n*) is connected between the scan line GL(n+1) and the scan line GL(n+8) via the thirteenth switches S13(*n*+1) and S13(*n*+8). In addition, the signal wiring 603-2(*n*−1) is connected between the scan line GL(n−5) and the scan line GL(n+3) via the thirteenth switches S13(*n*−6) and S13(*n*+3), and the signal wiring 603-3(*n*−1) is connected between the scan line GL(n−6) and the scan line GL(n+2) via the thirteenth switches S13(*n*−6) and S13(*n*+2). Further, the signal wiring 603-1(*n*−2) is connected to the scan line GL(n−4) via the thirteenth switch S13(*n*−4), the signal wiring 603-2(*n*+1) is connected to the scan line GL(n+6) via the thirteenth switch S13(*n*+6), and the signal wiring 603-3(*n*+1) is connected to the scan line GL(n+7) via the thirteenth switch S13(*n*+7).

In addition, the second adjustment unit KAD8 is provided with the signal wirings 603-1(*n*−1), 603-2(*n*), 603-3(*n*), 603-1(*n*+1), 603-2(*n*−2) and 603-3(*n*−2), which are connected to the scan line, when the fourteenth switches S14(*n*−6) to S14(*n*+9) are turned into the ON state. Here, the signal wiring 603-1(*n*−1) is connected between the scan line GL(n−5) and the scan line GL(n+2) via the fourteenth switches S14(*n*−5) and S14(*n*+2). In addition, the signal wiring 603-2(*n*) is connected between the scan line GL(n) and the scan line GL(n+8) via the fourteenth switches S14(*n*) and S14(*n*+8), and the signal wiring 603-3(*n*) is connected between the scan line GL(n+1) and the scan line GL(n+9) via the fourteenth switches S14(*n*+1) and S14(*n*+9). Further, the signal wiring 603-3(*n*−2) is connected to the scan line GL(n−3) via the fourteenth switch S14(*n*−3), the signal wiring 603-2(*n*−2) is connected to the scan line GL(n−4) via the fourteenth switch S14(*n*−4), and the signal wiring 603-1(*n*+1) is connected to the scan line GL(n+7) via the fourteenth switch S14(*n*+7).

Figure 21:
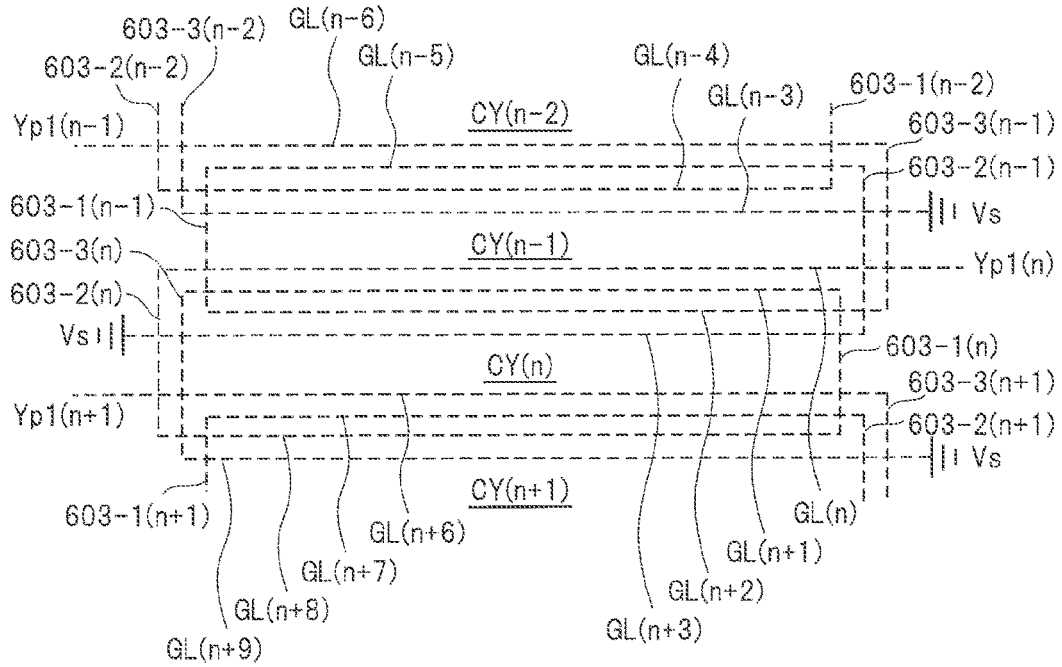
FIG. 21 is a circuit diagram illustrating a configuration of a coil according to the fourth embodiment.

Accordingly, the coils CY(n−2) to CY(n+1) are configured of the scan lines and the signal wirings, as illustrated in FIG. 21, since the thirteenth switch and the fourteenth switch are turned into the ON state during the touch detection period. When the coil CY(n) is taken as example, the scan lines GL(n), GL(n+1), GL(n+8) and GL(n+9) and the signal wirings 603-1(*n*), 603-2(*n*) and 603-3(*n*) are connected in series between the input/output node Yp1(*n*) and the ground voltage Vs. The scan lines GL(n), GL(n+1), GL(n+8) and GL(n+9) are disposed in parallel, and thus, the coil CY(n) is formed using these scan lines and signal wirings. The same applies to the other coils.

In the fourth embodiment, the signal wirings to be provided in the first adjustment unit KAD7 and the second adjustment unit KAD8 are configured using the wirings of the second wiring layer 603 disposed outside the active area of the display panel 2. In the display panel 2, the wirings to be formed in the second wiring layer 603 are used as the signal lines SL(0) to SL(p). Thus, there is no need of additionally providing the wiring layer in order to form the signal wirings to be provided in the first adjustment unit KAD7 and the second adjustment unit KAD8. As a result, it is possible to suppress the increase of the price as similar to the first to third embodiments.

Figure 22:
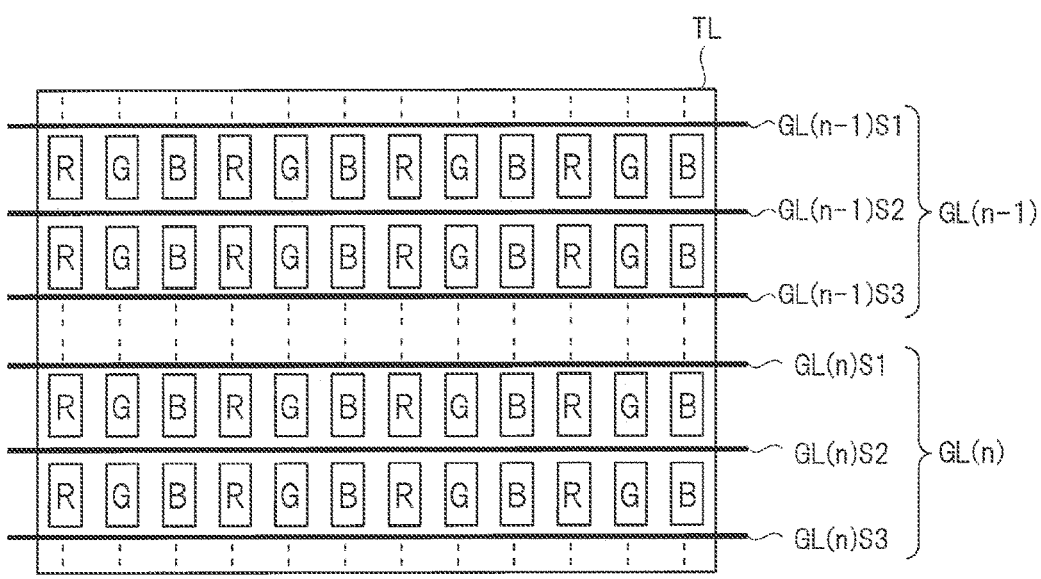
FIG. 22 is a plan view illustrating a partial plane of a display panel according to the fourth embodiment.

FIG. 22 is a plan view illustrating the area C1 surrounded by the broken line circle of FIG. 20 in detail. In FIG. 22, R, G and B represent the pixels of the three primary colors, and TL represents the drive electrode.

In the fourth embodiment, the plurality of scan lines are connected in parallel during the touch detection period. In FIGS. 20 and 21, the plurality of scan lines, which are connected in parallel with each other, are illustrated as one scan line. That is, each of the scan lines GL(0) to GL(p) drawn in FIGS. 20 and 21 represents the plurality of scan lines connected in parallel with each other. FIG. 22 illustrates a case where each of the scan lines, which have been described as the scan lines GL(n−1) and GL(n) in FIG. 20, is configured using three scan lines. That is, the scan lines GL(n−1)S1 to GL(n−1)S3, which function as the scan lines during the display period, are connected in parallel with each other to be used as the scan line GL(n−1) during the touch detection period. Similarly, the scan lines GL(n)S1 to GL(n)S3, which function as the scan lines during the display period, are connected in parallel with each other to be used as the scan line GL(n) during the touch detection period. In this manner, it is possible to reduce the resistance at the time of forming the coil during the touch detection period. As a result, it is possible to achieve improvement of the touch detection accuracy.

Although FIG. 22 illustrates the example in which the three scan lines GL(n)S1 to GL(n)S3 are connected in parallel with each other, it is desirable that several tens of scan lines be connected in parallel with each other. In addition, it is possible to achieve the parallel connection of scan lines, for example, by providing switches, which become the ON state during the touch detection period, among the scan lines GL(n)S1 to GL(n)S3.

Since the number of turns of the coil is also two in the fourth embodiment, it is possible to strengthen the magnetic field at the time of the touch detection. As a matter of course, the number of turns is not limited to two.

It is possible to increase the number of turns of the coil by changing the connection in the first adjustment unit KAD7 and the second adjustment unit KAD8. In addition, it is possible to use any scan line as a winding of the coil by changing the connection in the first adjustment unit KAD7 and the second adjustment unit KAD8. Further, it is possible to change the overlapping amount between the coils adjacent to each other by changing the connection in the first adjustment unit KAD7 and the second adjustment unit KAD8. That is, it is possible to adjust the coil to be used during the touch detection period by the adjustment unit.

In addition, since the number of turns of the coil is equal to or larger than two, the detection accuracy of the magnetic field to be generated by a pen is also increased.

Although the description has been given regarding the example in which the wiring of the second wiring layer 603 is used as the signal wiring, the invention is not limited thereto. For example, the wiring of the first wiring layer 601 may be used as the signal wiring, or the wiring of the third wiring layer 605 may be used as the signal wiring.

It is possible to say that the scan lines GL(0) to GL(p) are the common scan lines to be used for both the display and the generation of the magnetic field for the touch detection also in the fourth embodiment.

Further, since the input/output nodes Yp1(*n*), Yp1(*n*+1) and Yp1(*n*−1) of the coil are alternately disposed on the sides 2-R and 2-L of the display panel 2 in the fourth embodiment, the drive signal to be supplied to the coil is distributed into both the sides of the display panel 2. Accordingly, it is possible to prevent the increase in size of the picture frame of the sides 2-R and 2-L of the display panel 2.

Fifth Embodiment

FIG. 23 is a plan view illustrating the layout of the liquid crystal display device according to the fifth embodiment. In the fifth embodiment, sense lines ss(0) to ss(p) are provided in the display panel 2 to be parallel with the scan lines GL(0) to GL(p), respectively. The coil is configured of the sense lines ss(0) to ss(p) during the touch detection period.

A portion in relation to the scan lines GL(n−6) to GL(n+9) is drawn among the scan lines GL(0) to GL(p) in FIG. 23. Hereinafter, the fifth embodiment will be described with reference to FIG. 23. Incidentally, the drive electrode is not illustrated in FIG. 23.

The sense lines ss(n−6) to ss(n+9) are configured of the wirings of the same wiring layer as the scan lines GL(n−6) to GL(n+9). When the sense lines ss(n−6) to ss(n+9) are seen in a plan view, the sense line ss is disposed to be sandwiched between each pair of the scan lines GL(n−6) to GL(n+9). It is also possible to say that the scan line and the sense line are alternately disposed in the display panel 2 from another point of view.

The adjustment unit is provided outside the active area of the display panel 2 also in this fifth embodiment. That is, the adjustment unit is provided with a first adjustment unit KAD9 disposed along the side 2-R of the display panel 2, and a second adjustment unit KAD10 disposed along the side 2-L of the display panel 2. The sense lines ss(n−6) to ss(n+9) extend from the display panel 2 to the first adjustment unit KAD9 and the second adjustment unit KAD10 which are disposed outside the active area.

In this fifth embodiment, the input/output nodes Yp1(*n*−1) to YP1(*n*+1) of the coil are alternately provided in the first adjustment unit KAD9 and the second adjustment unit KAD10. That is, the input/output node Yp1(*n*−1) of the coil CY(*n*−1) and the input/output node Yp1(*n*+1) of the coil CY(*n*+1) are provided in the second adjustment unit KAD10, and the input/output node Yp1(*n*) of the coil CY(*n*) is provided in the first adjustment unit KAD9.

The first adjustment unit KAD9 is provided with the signal wirings 603-1(*n*), 603-1(*n*−2), 603-2(*n*−1), 603-2(*n*+1), 603-3(*n*−1) and 603-3(*n*+1) to be connected to the sense line. Here, the signal wiring 603-1(*n*) is connected to the sense line ss(n+1) and the sense line ss(n+8). In addition, the signal wiring 603-2(*n*−1) is connected to the sense line ss(n−5) and the sense line ss(n+3), and the signal wiring 603-3(*n*−1) is connected to the sense line ss(n−6) and the sense line ss(n+2). Further, the signal wiring 603-1(*n*−2) is connected to the sense line ss(n−4), the signal wiring 603-2(*n*+1) is connected to the sense line ss(n+7), and the signal wiring 603-3(*n*+1) is connected to the sense line ss(n+6).

In addition, the second adjustment unit KAD10 is provided with the signal wirings 603-1(*n*−1), 603-2(*n*), 603-3(*n*), 603-1(*n*+1), 603-2(*n*−2) and 603-3(*n*−2) to be connected to the sense line. Here, the signal wiring 603-1(*n*−1) is connected to the sense line ss(n−5) and the sense line ss(n+2). In addition, the signal wiring 603-2(*n*) is connected to the sense line ss(n) and the sense line ss(n+8), and the signal wiring 603-3(*n*) is connected to the sense line ss(n+1) and the sense line ss(n+9). Further, the signal wiring 603-3(*n*−2) is connected to the sense line ss(n−3), the signal wiring 603-2(*n*−2) is connected to the sense line ss(n−4), and the signal wiring 603-1(*n*+1) is connected to the sense line ss(n+7).

Figure 24:
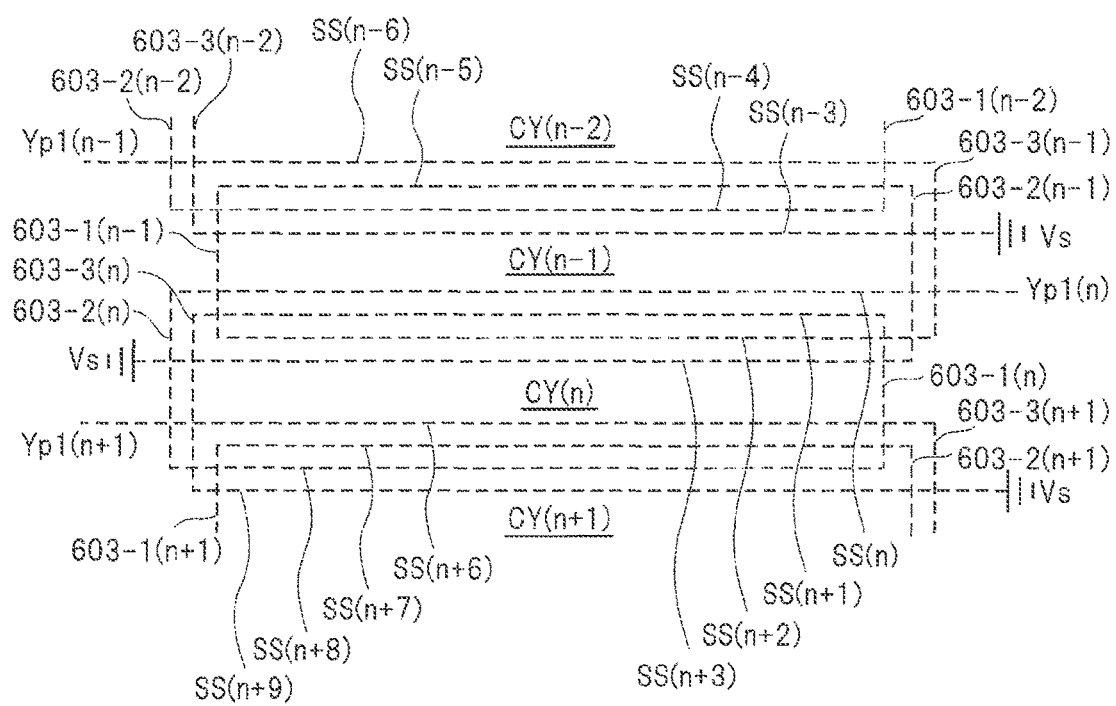
FIG. 24 is a circuit diagram illustrating a configuration of a coil according to the fifth embodiment.

Accordingly, as illustrated in FIG. 24, the coils CY(n−2) to CY(n+1) are configured using the sense lines and the signal wirings. When a description is also given by exemplifying the coil CY(n), the sense lines ss(n), ss(n+1), ss(n+8) and ss(n+9) and the signal wirings 603-1(*n*), 603-2(*n*) and 603-3(*n*) are connected in series between the input/output node Yp1(*n*) and the ground voltage Vs. Since the sense lines ss are disposed to be parallel with each other, the coil CY(n) having the sense line ss as a winding is formed. The same applies to the other coils.

In the fifth embodiment, the sense lines ss(n−6) to ss(n+9) are configured using the wirings of the same first wiring layer 601 as the scan lines GL(n−6) to GL(n+9). In addition, the signal wiring to be provided in the first adjustment unit KAD9 and the second adjustment unit KAD10 is configured using the wiring of the second wiring layer 603.

Figure 25:
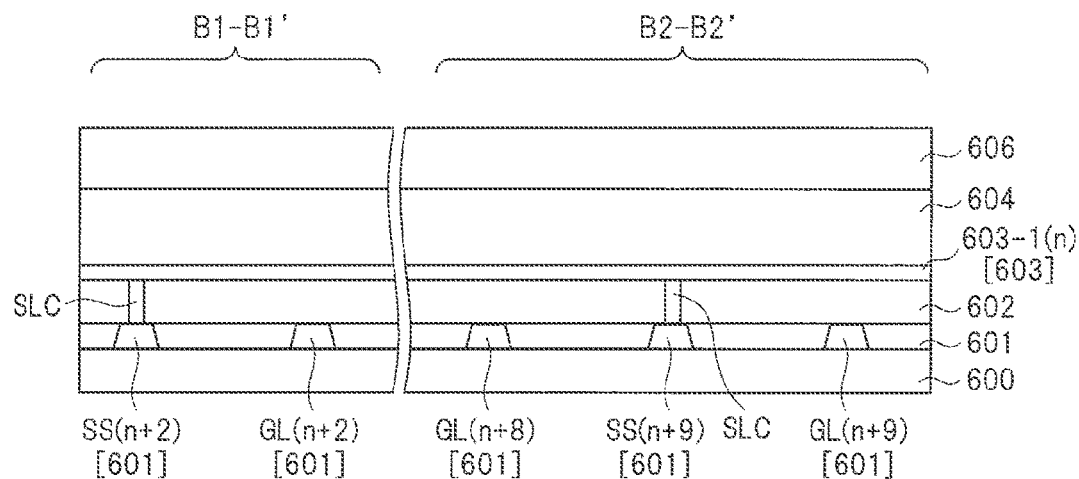
FIG. 25 is a cross-sectional view illustrating a cross-section of the liquid crystal display device according to the fifth embodiment.

A cross-section of B1-B1' and a cross-section of B2-B2' of FIG. 23 are illustrated in FIG. 25. In FIG. 25, GL(n+2)[601], GL(n+8)[601] and GL(n+9)[601] represent the scan lines GL(n+2) and GL(n) formed in the first wiring layer. In addition, ss(n+2)[601] and ss(n+9)[601] represent the sense lines ss(n+2) and ss(n+9) formed in the first wiring layer, and extend from the display panel 2 to the first adjustment unit KAD9. In FIG. 25, 603-1(*n*)[603] represents the wiring formed in the second wiring layer 603, that is, the signal wiring 603-1(*n*). The signal wiring 603-1(*n*) is connected to the sense line ss(n+2)[601] and the sense line ss(n+9)[601] via the interlayer wiring SLC.

The sense lines ss(0) to ss(p) forming the coil are formed in the same first wiring layer as the scan line, and the signal wiring that connects the sense lines is formed in the same second wiring layer as the signal lines SL(0) to SL(p). Thus, there is no need of additionally providing the wiring layer in order to form the coil, thereby suppressing the increase of the price.

Figure 26:
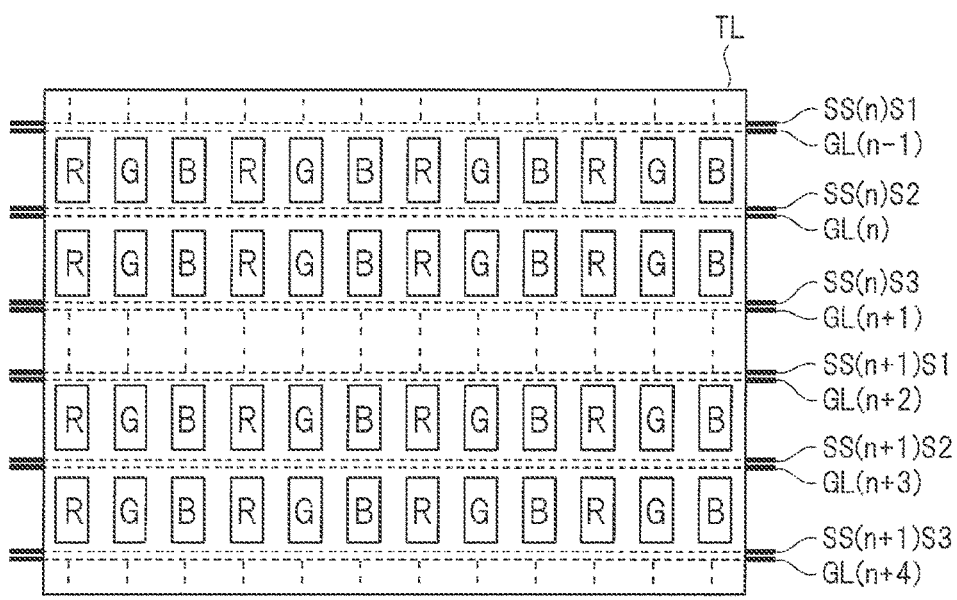
FIG. 26 is a plan view illustrating a partial plane of a display panel according to the fifth embodiment.

FIG. 26 is a plan view illustrating the area C1 surrounded by the broken line circle of FIG. 23 in detail. In FIG. 26, R, G and B represent the pixels of the three primary colors, and TL represents the drive electrode. In addition, GL(n−1) to GL(n+4) represent the scan lines, and ss(n)S1 to ss(n)S3 and ss(n+1)S1 to ss(n+1)S3 represent the sense lines in FIG. 26.

In this fifth embodiment, one sense line illustrated in FIGS. 23 and 24 is configured by connecting the plurality of sense lines to be parallel with each other. In FIG. 26, the sense lines ss(n)S1 to ss(n)S3 are connected to each other to form the sense line ss(n) illustrated in FIGS. 23 and 24. Similarly, the sense lines ss(n+1)S1 to ss(n+1)S3 are connected to each other to form the sense line ss(n+1) illustrated in FIGS. 23 and 24. When the sense line ss(n) is formed by connecting the plurality of sense lines ss(n)S1 to ss(n)S3 in parallel in this manner, it is possible to reduce the resistance of the coil at the time of the touch detection, and it is possible to achieve improvement of the detection accuracy. Although the description has been given regarding the parallel connection of three sense lines in FIG. 26, it is desirable that several tens of sense lines be connected in parallel to form the sense line illustrated in FIGS. 23 and 24.

Since the number of turns of the coil is also two in the fifth embodiment, it is possible to strengthen the magnetic field at the time of the touch detection. As a matter of course, the number of turns is not limited to two.

It is possible to increase the number of turns of the coil by changing the connection in the first adjustment unit KAD9 and the second adjustment unit KAD10. In addition, it is possible to use any sense line as a winding of the coil by changing the connection in the first adjustment unit KAD9 and the second adjustment unit KAD10. Further, it is possible to change the overlapping amount between the coils adjacent to each other by changing the connection in the first adjustment unit KAD9 and the second adjustment unit KAD10. That is, it is possible to adjust the coil to be used during the touch detection period by the adjustment unit.

In addition, since the number of turns of the coil is equal to or larger than two, the detection accuracy of the magnetic field to be generated by a pen is also increased.

Although the description has been given regarding the example in which the wiring of the second wiring layer 603 is used as the signal wiring, the invention is not limited thereto. For example, the wiring of the third wiring layer 605 may be used as the signal wiring.

There is no need of providing the switching circuit in this fifth embodiment, and thus, it is possible to achieve the reduction in size.

Further, since the input/output nodes Yp1(n), Yp1(n+1) and Yp1(n−1) of the coil are alternately disposed on the sides 2-R and 2-L of the display panel 2 in the fifth embodiment, the drive signal to be supplied to the coil is distributed into both the sides of the display panel 2. Accordingly, it is possible to prevent the increase in size of the picture frame of the sides 2-R and 2-L of the display panel 2.

Sixth Embodiment

<Overall Configuration of Liquid Crystal Display Device 1>

Figure 27:
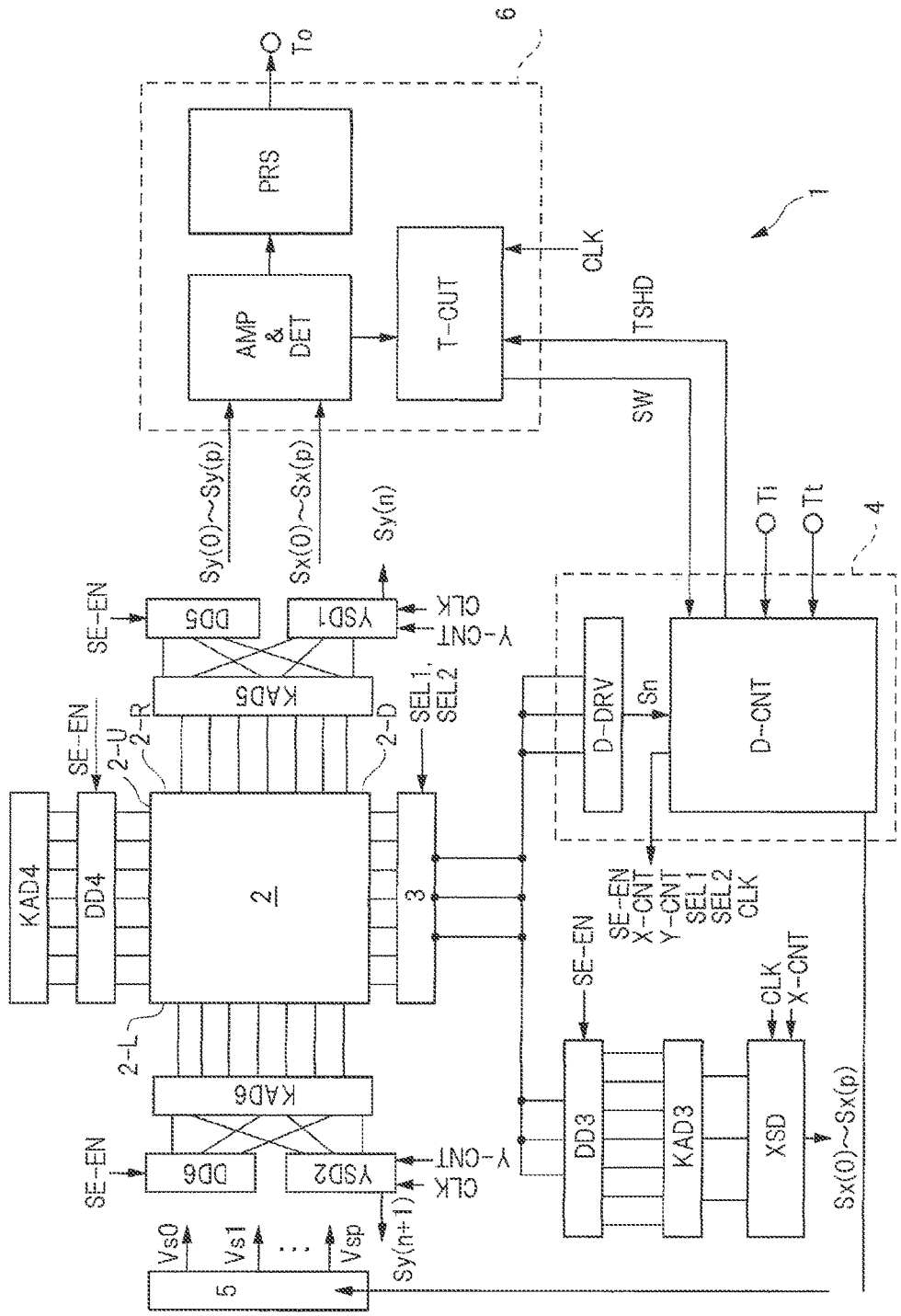
FIG. 27 is a block diagram illustrating a configuration of a liquid crystal display device with a touch detection function according to a sixth embodiment.

FIG. 27 is a block diagram illustrating a configuration of the liquid crystal display device with a touch detection function 1 according to the sixth embodiment. In this embodiment, the plurality of coils are formed so as to intersect with each other in the display panel 2 (the pixel array LCD) during the touch detection period. That is, a plurality of coils CY(0) to CY(p), which extend along the horizontal direction (row direction) of the display panel 2 and are disposed in parallel in the vertical direction (column direction), and a plurality of coils CX(0) to CX(p), which extend along the vertical direction and are disposed in parallel in the horizontal direction, are formed during the touch detection period.

The liquid crystal display device 1 is provided with the display panel 2, the signal line selector 3, the display control device 4, the gate driver 5 and a touch control device 6. In addition, the liquid crystal display device 1 is provided with an adjustment unit KAD, a switching circuit DD and a selection circuit SD that selects the coil during the touch detection period.

As described above, the display panel 2 is provided with the plurality of signal lines, the plurality of drive electrodes, the plurality of scan lines and the plurality of pixels.

The display control device 4 is provided with a control circuit D-CNT and a signal line driver D-DRV. The control circuit D-CNT receives the timing signal to be supplied to an external terminal Tt and image information to be supplied to an input terminal Ti, forms an image signal Sn according to the image information, which has been supplied to the input terminal Ti, and supplies the image signal Sn to the signal line driver D-DRV. The signal line driver D-DRV supplies the supplied image signal Sn to the signal line selector 3 in the time division manner during the display period. In addition, the control circuit D-CNT receives the timing signal to be supplied to the external terminal Tt and a switch control signal SW from the touch control device 6, and forms various types of control signals. The control signals to be formed by the control circuit D-CNT include selection signals SEL1 and SEL2, which are supplied to the signal line selector 3, a synchronization signal TSHD to identify the touch detection period and the display period, a clock signal CLK, control signals SE-EN, X-CNT and Y-CNT which relate to the touch detection, and the like.

The signal line driver D-DRV supplies the image signal to the signal line selector 3 in the time division manner according to the selection signals SEL1 and SEL2 during the display period. The signal line selector 3 supplies the image signal, which has been supplied, to a suitable signal line in the display panel 2 according to the selection signals SEL1 and SEL2 during the display period. The gate driver 5 forms scan line signals Vs0 to Vsp according to the timing signal from the control circuit D-CNT during the display period, and supplies the scan line signals to the scan line of the display panel 2. The display of the image is performed during the display period, when the pixel connected to the scan line to which the scan line signal of a high level is supplied performs display according to the image signal to be supplied to the signal line at the time.

The touch control device 6 is provided with amplification and detection circuits AMP and DET which receive detection signals Sx(0) to Sx(p) and Sy(0) to Sy(p), a processing circuit PRS, which performs processing with respect to a detection signal from the amplification and detection circuits AMP and DET and extracts a coordinate of a touched position, and a control circuit T-CNT. The control circuit T-CNT receives the synchronization signal TSHD and the clock signal CLK from the display control device 4, and controls the touch control device 6 to operate in synchronization with the display control device 4. That is, the control circuit T-CNT controls the amplification and detection circuits AMP and DET and the processing circuit PRS to operate when the synchronization signal TSHD indicates the touch detection period. In addition, the control circuit T-CNT receives the detection signal from the amplification and detection circuits AMP and DET, forms the switch control signal SW, and supplies the switch control signal to the control circuit D-CNT. The processing circuit PRS outputs the extracted coordinate, as coordinate information, through an external terminal To.

The adjustment unit KAD has the adjustment units KAD3, KAD4, KAD5 and KAD6 in this sixth embodiment. In addition, the switching circuit DD is provided with the switching circuits DD3, DD4, DD5 and DD6. Here, the adjustment units KAD3 and KAD4 and the switching circuits DD3 and DD4 are used at the time of forming the coils CX(0) to CX(p) during the touch detection period, and the adjustment units KAD5 and KAD6 and the switching circuits DD5 and DD6 are used at the time of forming the coils CY(0) to CY(p) during the touch detection period. That is, when the control signal SE-EN from the control circuit D-CNT indicates the touch detection period, the coils CX(0) to CX(p) and CY(0) to CY(p) are formed. Incidentally, the control signal SE-EN will be also referred to as a sense enable signal hereinafter.

The selection circuit SD is provided with selection circuits XSD, YSD1 and YSD2 in this sixth embodiment. The selection circuit XSD receives the control signal X-CNT and the clock signal CLK from the control circuit D-CNT, selects a coil among the coils CX(0) to CX(p) according to the control signal X-CNT (hereinafter, also referred to as a selection signal X-CNT), and supplies a drive signal according to the clock signal CLK to the selected coil. In addition, the selection circuit XSD outputs a voltage change in the selected coil as detection signals Sx(0) to Sx(p).

The selection circuits YSD1 and YSD2 receive the control signal Y-CNT and the clock signal CLK from the control circuit D-CNT, selects a coil among the coils CY(0) to CY(p) according to the control signal Y-CNT (hereinafter, also referred to as a selection signal Y-CNT), and supplies the drive signal according to the clock signal CLK to the selected coil. In addition, the selection circuits YSD1 and YSD2 output a voltage change in the selected coil as detection signals Sy(0) to Sy(p). The selection circuit YSD1 is disposed along the side 2-R of the display panel 2, the selection circuit YSD2 is disposed along the side 2-L of the display panel 2, and the selection circuits YSD1 and YSD2 alternately output the detection signal. That is, the selection circuit YSD1 outputs the detection signal Sy(n), and the selection circuit YSD2 outputs the detection signal Sy(n+1). Here, n is 0 to p−1.

During the touch detection period, the detection signals Sx(0) to Sx(p) and Sy(0) to Sy(p) are supplied from the selection circuits XSD, YSD1 and YSD2 to the touch control device 6, and the coordinate of the position touched by a pen is output as the coordinate information from the external terminal To.

As illustrated in FIG. 27, the adjustment unit KAD4 and the switching circuit DD4 are disposed along the side 2-U of the display panel 2, and the adjustment unit KAD3, the switching circuit DD3 and the selection circuit XSD are disposed along the side 2-D. In addition, the adjustment unit KAD5, the switching circuit DD5, and the selection circuit YSD1 are disposed along the side 2-R of the display panel 2, and the adjustment unit KAD6, the switching circuit DD6 and the selection circuit YSD2 are disposed along the side 2-L.

The display control device 4, illustrated by the broken line, is configured of one semiconductor device (the driver semiconductor device DDIC) and the touch control device 6, illustrated by the broken line, is also configured of one semiconductor device (touch semiconductor device) in the sixth embodiment, although not particularly limited.

Incidentally, the control circuit D-CNT forms the selection signals SEL1 and SEL2 suitable for allowing the image signal to be supplied to the suitable signal line during the display period, while forming the selection signals SEL1 and SEL2 allowing all the signal lines to be connected to the switching circuit DD3 via the signal line selector 3 during the touch detection period. In addition, the control circuit D-CNT controls the signal line driver D-DRV such that an output of the signal line driver D-DRV becomes the high impedance state during the touch detection period.

<Module Structure of Liquid Crystal Display Device>

Figure 28:
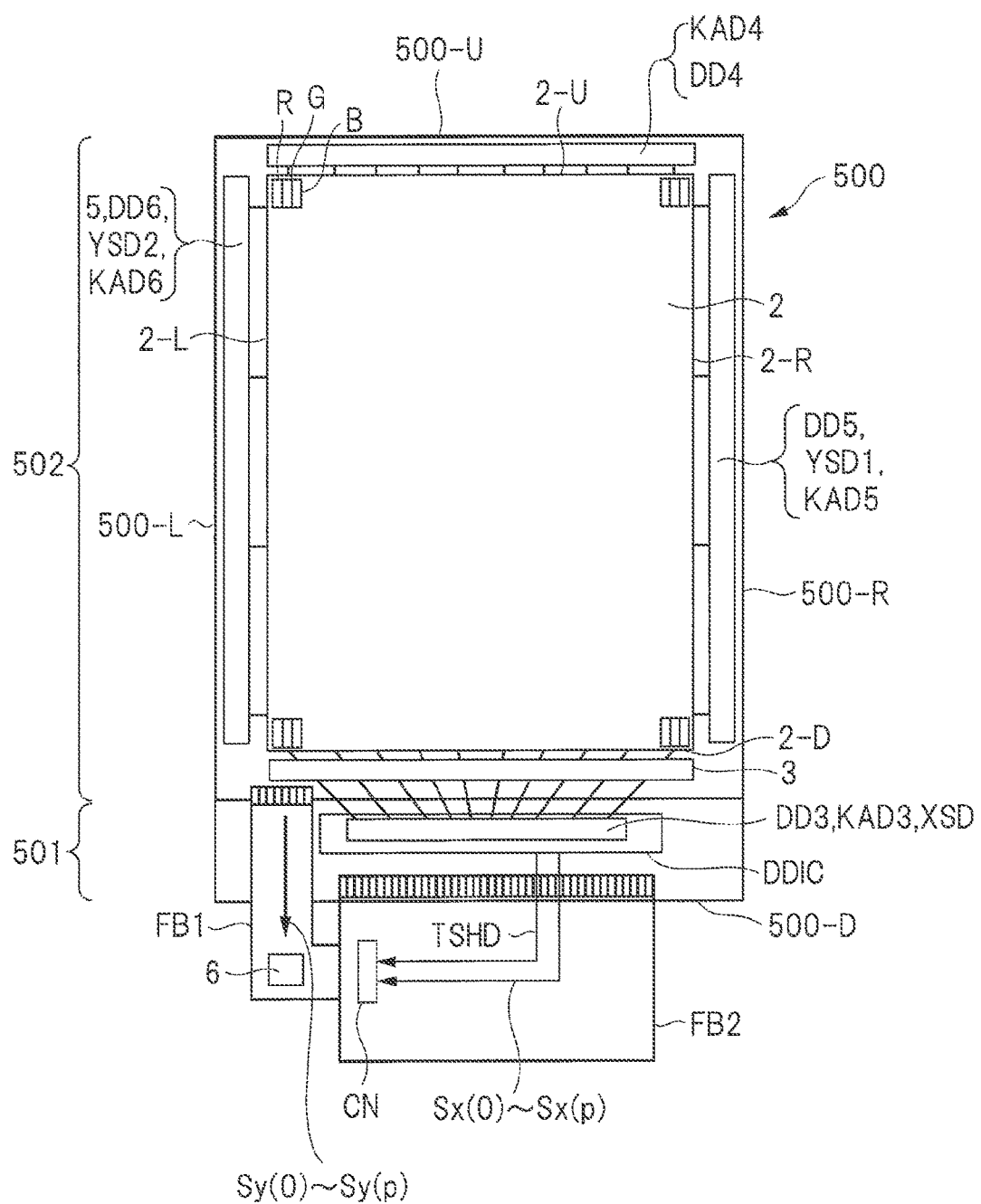
FIG. 28 is a plan view illustrating a configuration of a module of the liquid crystal display device according to the sixth embodiment.

FIG. 28 is a schematic plan view illustrating the overall configuration of a module 500 to which the liquid crystal display device with a touch detection function 1 is mounted. FIG. 28 is drawn in accordance with the actual disposition although schematic. In FIG. 28, 501 represents an area in the TFT glass substrate illustrated in FIGS. 3B and 6, and 502 represents an area including the TFT glass substrate and the CF glass substrate illustrated in FIG. 3B. The TFT glass substrate is integrated in the module 500. That is, the TFT glass substrate is common in the area 501 and the area 502, and the CF glass substrate and the like are additionally formed on an upper surface of the TFT glass substrate, illustrated in FIG. 3B, in the area 502.

In FIG. 28, 500-L represents a short side of the module 500, 500-D represents a side of the module 500, which is a short side opposing the short side 500-U. In addition, 500-L represents a long side of the module 500, and 500-R represents a side of the module 500, which is a long side opposing the long side 500-L.

The gate driver 5, the adjustment unit KAD6, the switching circuit DD6, and the selection circuit YSD2, illustrated in FIG. 27, are disposed in an area between the side 2-L of the display panel 2 and the long side 500-L of the module 500 in the area 502. In addition, the adjustment unit KAD5, the switching circuit DD5, and the selection circuit YSD1, illustrated in FIG. 27, are disposed in an area between the side 2-R of the display panel 2 and the long side 500-R of the module 500. The adjustment unit KAD4 and the switching circuit DD4, illustrated in FIG. 27, are disposed in an area between the side 2-U of the display panel 2 and the short side 500-U of the module 500.

In addition, the signal line selector 3, the adjustment unit KAD3, the switching circuit DD3, the selection circuit XSD and the driver semiconductor device DDIC, illustrated in FIG. 27, are disposed in an area between the side 2-D of the display panel 2 and the short side 500-D of the module 500. Here, the adjustment unit KAD3, the switching circuit DD3 and the selection circuit XSD are disposed in the area 501, and are configured using wirings and parts formed in the TFT glass substrate of the area 501. The parts include a switch part, and the switch part is a metal-oxide semiconductor field-effect-transistor (MOSFET), for example. In this sixth embodiment, the driver semiconductor device DDIC is mounted to the TFT glass substrate so as to cover the adjustment unit KAD3, the switching circuit DD3 and the selection circuit XSD when seen in a plan view. Accordingly, it is possible to suppress an increase in the size of a lower picture frame of the display panel 2.

In addition, parts that configure the adjustment units KAD4 to KAD6, the switching circuits DD4 to DD6 and selection circuits XSD1 and XSD2 are also formed on the TFT glass substrate in the above-described area.

The detection signals Sy(0) to Sy(p), which have been described in FIG. 27, are transmitted to a flexible cable FB1 via a wiring (not illustrated) disposed among the long sides 500-L of 500-R and the module 500 and the sides 2-L and 2-R of the display panel 2. The touch control device 6, which has been described in FIG. 27, is mounted to the flexible cable F131, and the detection signals Sy(0) to Sy(p) are supplied to the touch control device 6 via the wiring inside the flexible cable FB1. In addition, a flexible cable FB2 is connected to the area 501, and a connector CN is mounted to the flexible cable FB2. The detection signals Sx(0) to Sx(p) are supplied from the selection circuit XSD to the touch control device 6 via the connector CN. In addition, a signal transmission and reception is performed between the touch control device 6 and the driver semiconductor device DDIC via the connector CN. The synchronization signal TSHD is drawn as an example of the signal to be transmitted and received in FIG. 28. Incidentally, R, G and B illustrated at the four sides of the display panel 2 represent the pixels in FIG. 28.

<Configurations of Display Panel 2, Adjustment Unit and Switching Circuit>

FIG. 29 is a plan view illustrating a layout of the liquid crystal display device 1 illustrated in FIG. 27. FIG. 29 also illustrates configurations of the adjustment units KAD3 to KAD6 and the switching circuits DD3 to DD6 illustrated in FIG. 27.

The display panel 2 of the sixth embodiment has the structure in which the structure of the display panel 2 described in the second embodiment and the structure of the display panel 2 described in the third embodiment are combined.

That is, in this sixth embodiment, the signal lines SL(n−6) to (n+9) have the same structure as the signal lines SL(n−6)

to (n+9) illustrated in FIG. 12, and the drive electrodes TL(n–6) to TL(n+9) and the auxiliary electrode SM have the same structure as the drive electrodes TL(n–6) to TL(n+9) and the auxiliary electrode SM illustrated in FIG. 16. In addition, the scan lines GL(0) to GL(p) have the same structure as the scan lines GL(0) to GL(p) illustrated in FIG. 12 although not illustrated in FIG. 29.

The adjustment units KAD3 and KAD4 illustrated in FIG. 29 have the same structure as the first adjustment unit KAD3 and the second adjustment unit KAD4 illustrated in FIG. 12, and the adjustment units KAD5 and KAD6 illustrated in FIG. 29 have the same structure as the first adjustment unit KAD5 and the second adjustment unit KAD6 illustrated in FIG. 16. In addition, the switching circuits DD3 and DD4 illustrated in FIG. 29 have the same structure as the first switching circuit DD3 and the second switching circuit DD4 illustrated in FIG. 12, and the switching circuits DD5 and DD6 illustrated in FIG. 29 have the same structure as the first switching circuit DD5 and the second switching circuit DD6 illustrated in FIG. 16.

Cross-sections of B1-B1' and B2-B2' of FIG. 29 are the same as the cross-sections B1-B1' and B2-B2' illustrated in FIG. 14 since the adjustment units KAD3 and KAD4 have the same configurations as the first adjustment unit KAD3 and the second adjustment unit KAD4 illustrated in FIG. 12. Similarly, cross-sections of B3-B3' and B4-B4' of FIG. 29 are the same as the cross-sections B1-B1' and B2-B2' illustrated in FIG. 14 since the adjustment units KAD5 and KAD6 have the same configurations as the first adjustment unit KAD5 and the second adjustment unit KAD6 illustrated in FIG. 16.

Figure 30:
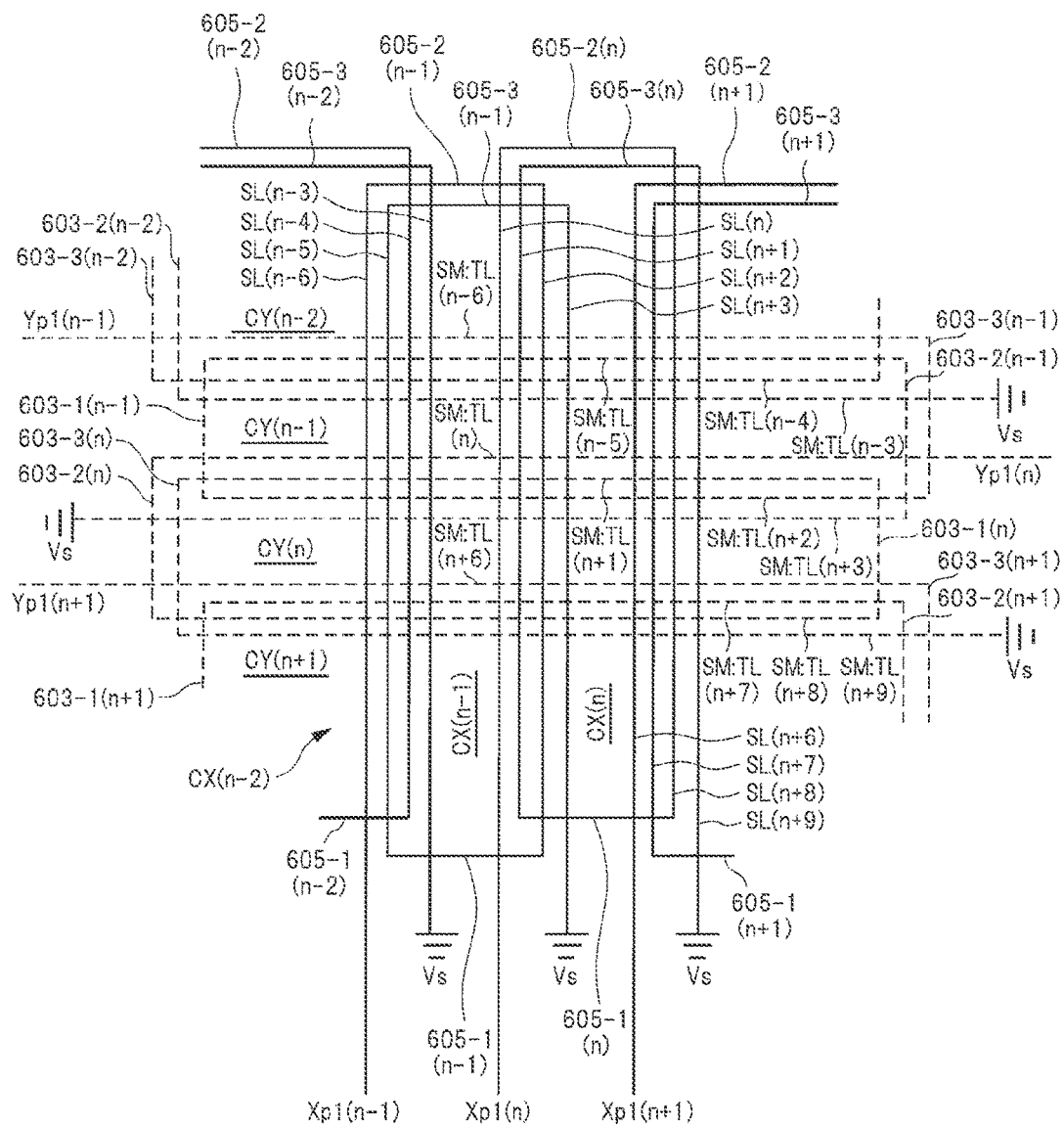
FIG. 30 is a circuit diagram illustrating a configuration of a coil according to the sixth embodiment.

As described in the second embodiment, the fifth switches S5(n–6) to S5(n+9) and the sixth switches S6(n–6) to S6(n+9) are turned into the ON state during the touch detection period. Accordingly, the coils CX(n–2) to CX(n+1) are formed using the signal line and the signal wiring inside the adjustment units KAD3 and KAD4 as illustrated in FIG. 30. In addition, as described in the third embodiment, the coils CY(n–2) to CY(n+1) are formed using the signal line and the signal wiring inside the adjustment units KAD5 and KAD6 as illustrated in FIG. 30 when the eighth switch S8(n), the ninth switches S9(n–1) and S9(n), the eleventh switches S11(n–1) and S11(n+1), and the twelfth switch S12(n–1) are turned into the ON state during the touch detection period.

<Selection Circuits XSD, YSD1 and YSD2>

Figure 31:
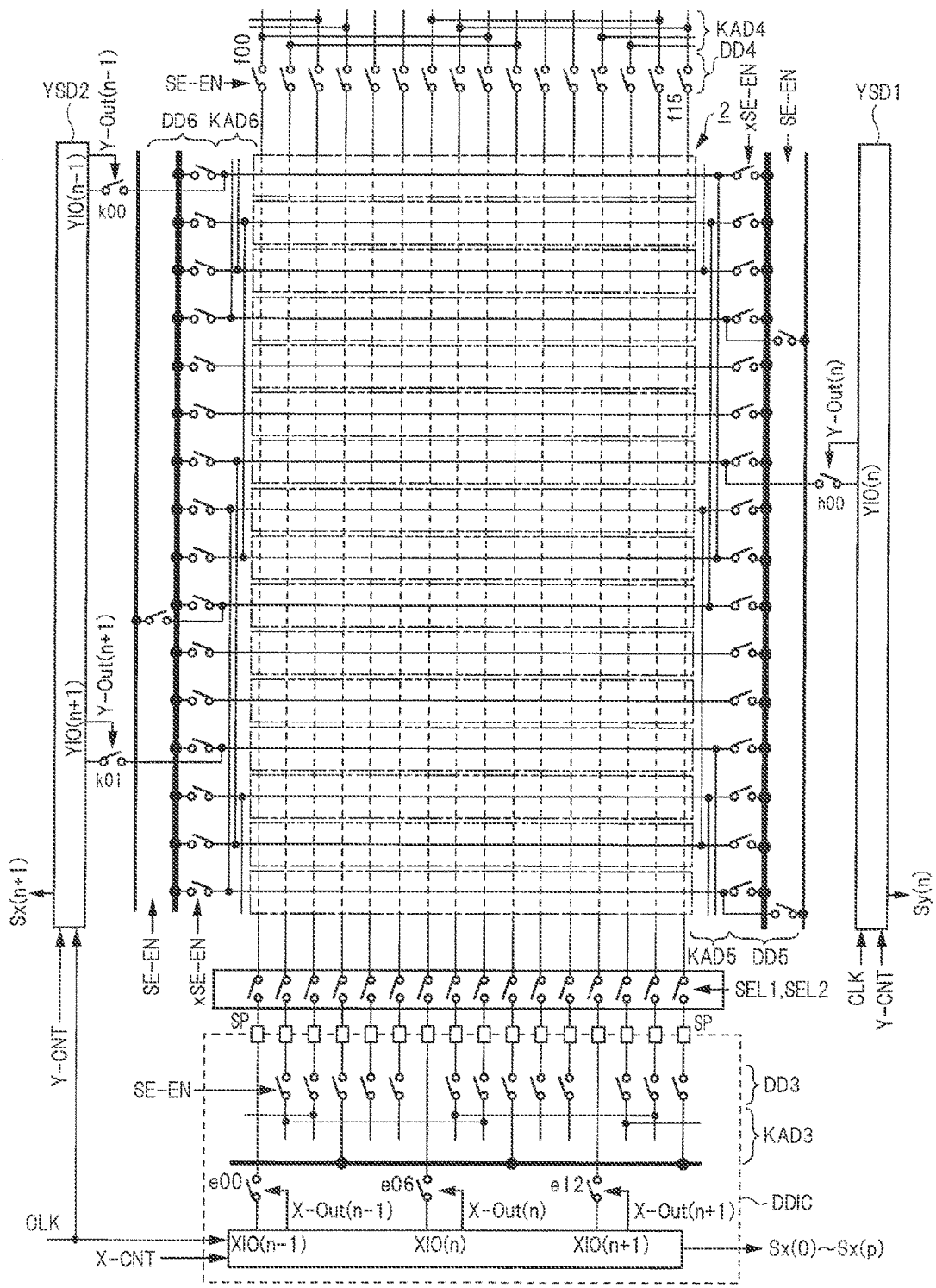
FIG. 31 is a block diagram illustrating a configuration of the liquid crystal display device according to the sixth embodiment.

FIG. 31 is a block diagram illustrating configurations of the display panel 2, the adjustment units KAD3 to KAD6, the switching circuits DD3 to DD6 and the selection circuits XSD, YSD1 and YSD2 illustrated in FIG. 27. The configuration of the display panel 2 in FIG. 31 is the same as the configuration of the display panel 2 illustrated in FIG. 29. In addition, the configurations of the adjustment units KAD3 to KAD6 are the same as those of the adjustment units KAD3 to KAD6 illustrated in FIG. 29. Thus, FIG. 31 does not illustrate reference numerals of the signal lines and the drive electrodes included in the display panel 2, and of the signal wirings included in the adjustment units KAD3 to KAD5.

Since the switching circuits DD3 to DD6 also have the same configurations as the switching circuits DD3 to DD6 illustrated in FIG. 29, reference numerals of switches that configure the switching circuits DD3 to DD6 are omitted in principle, except for switches necessary for the sake of description. However, signals for controlling the switches configuring each of the switching circuits DD3 to DD6 are illustrated in FIG. 31. Hereinafter, a description will be given regarding the switch control signals for controlling the switches configuring each of the switching circuits DD3 to DD6 with reference to FIGS. 12, 16 and 29.

The switching circuit DD3 has the fifth switches S5(n–6) to S5(n+9). The sense enable signal SE-EN is supplied, as the switch control signal, to the fifth switches among the fifth switches S5(n–6) to S5(n+9) except for the fifth switches S5(n–6), S5(n) and S5(n+6) each of which is connected between each of the input/output nodes Xp1(n–1) to Xp1(n+1) of the coil and the signal line.

The sense enable signal SE-EN is formed by the control circuit D-CNT as described in FIG. 27. The control circuit D-CNT sets the sense enable signal SE-EN to be a low level during the display period and sets the sense enable signal SE-EN to be a high level during the touch detection period. In addition, the control circuit D-CNT forms an inverted enable signal xSE-EN, which is phase-inverted with respect to the sense enable signal SE-EN, although not illustrated in FIG. 27. The inverted enable signal xSE-EN is set to the low level during the touch detection period and is set to the high level during the display period as being phase-inverted. In addition, it is set such that the switch is turned into the ON state when the switch control signal to be supplied to the switch is the high level, and the switch is turned into the OFF state when the switch control signal to be supplied to the switch is the low level in the following direction in order to facilitate the description. However, the invention is not limited thereto.

Meanwhile, selection signals X-Out(n–1), X-Out(n) and X-Out(n+1) from the selection circuit XSD are supplied to the fifth switches S5(n–6), S5(n) and S5(n+6) in the switching circuit DD3 as the switch control signal.

The switching circuit DD4 has the sixth switches S6(n–6) to S6(n+9). The sense enable signal SE-EN is supplied, as the switch control signal, to these sixth switches S6(n–6) to S6(n+9).

The switching circuit DD5 has the seventh switches S7(n–6) to S7(n+9), the eighth switch S8(n) and the ninth switches S9(n–1) and S9(n). Here, the sense enable signal SE-EN is supplied, as the switch control signal, to the seventh switches S7(n–6) to S7(n+9), and the inverted enable signal xSE-EN is supplied, as the switch control signal, to the ninth switches S9(n–1) and S9(n). Meanwhile, a selection signal Y-Out(n) from the selection circuit YSD1 is supplied, as the switch control signal, to the eighth switch S8(n) connected between the input/output node Yp1 (n) of the coil and the drive electrode (including the auxiliary electrode SM).

Lastly, when a description is given regarding the switching circuit DD6, the switching circuit DD6 has the tenth switches S10(n–6) to S10(n+9), the eleventh switches S11(n–1) and S11(n+1), and the twelfth switch S12(n–1). Here, the sense enable signal SE-EN is supplied, as the switch control signal, to the tenth switches S10(n–6) to S10(n+9), and the inverted enable signal xSE-EN is supplied as, the switch control signal, to the twelfth switch S12(n–1). Meanwhile, selection signals Y-Out(n–1) and Y-Out(n+1) from the selection circuit YSD2 are supplied, as the switch control signals, to the eleventh switches S11(n–1) and S11(n+1) each of which is connected between each of the input/output nodes Yp1(n–1) and Yp1(n+1) of the coil and the drive electrode (including the auxiliary electrode SM).

The selection circuit XSD has input/output nodes XIO(0) to XIO(p) corresponding to the respective coils which are formed to be disposed in parallel in the horizontal direction (column direction) of the display panel 2 during the touch detection period. In addition, the selection circuit XSD outputs the selection signals X-Out(0) to X-Out(p) which correspond to the input/output nodes XIO(0) to XIO(p) one to one. Here, the input/output nodes XIO(0) to XIO(p) of the selection circuit XSD are connected, respectively, to corresponding input/output nodes Xp1(0) to Xp1(p) of the coil.

The selection circuit XSD forms and outputs the selection signals X-Out(0) to X-Out(p) based on the selection signal X-CNT and the clock signal CLK to be supplied from the control circuit D-CNT. In addition, the selection circuit XSD outputs voltages of the input/output nodes Xp1(0) to Xp1(p) of the coil as the detection signals Sx(0) to Sx(p). That is, the selection circuit XSD sets the selection signals to be the high level in order from the selection signal X-Out(0) to the selection signal X-Out(p), when the selection signal X-CNT is changed to the high level during the touch detection period. The selection circuit XSD operates by dividing a period of setting the selection signal to the high level into a first period and a second period subsequent to the first period. The selection circuit XSD supplies the clock signal CLK to the input/output nodes XIO(0) to XIO(p) as the drive signal of the coil, in the first period that is set as a magnetic field generation period. On the other hand, the selection circuit XSD outputs the voltages of the input/output nodes XIO(0) to XIO(p) as the detection signals Sx(0) to Sx(p), in the second period that is set as a magnetic field detection period.

Accordingly, the fifth switch to which the selection signal of the high level among the selection signals X-Out(0) to X-Out(p) is supplied as the switch control signal is turned into the ON state during the touch detection period. The clock signal CLK with periodically changing voltage is supplied as the drive signal to the coil via the fifth switch in the ON state in the magnetic field generation period, thereby generating a magnetic field. Subsequently to the magnetic field generation period, a voltage change of the coil is transmitted to the selection circuit XSD from the input/output node via the fifth switch in the ON state, and is output as the detection signal from the selection circuit XSD in the magnetic field detection period.

FIG. 31 illustrates the selection circuit XSD of a portion corresponding to the coil CX(n−1) to the coil CX(n+1), and thus, a description will be made regarding the operation of the selection circuit XSD by exemplifying the coil CX(n) as follows.

It is assumed that the selection signal X-CNT is the high level, and the selection signal X-Out(n−1) corresponding to the coil CX(n−1) is the high level in the previous touch detection period. In the next touch detection period, the selection circuit XSD sets the selection signal X-Out(n−1) to the low level, and sets the selection signal X-Out(n) to the high level. Accordingly, the fifth switch S5(n) is changed from the OFF state to the ON state. At this time, since the selection signal X-Out(n−1) is the low level while the selection circuit XSD supplies the clock signal CLK to the input/output nodes XIO(0) to XIO(p), the fifth switch S5(n−1) is in the OFF state, and the clock signal CLK is not supplied to the coil CX(n−1) as the drive signal. In contrast, the fifth switch S5(n) is in the ON state, and thus, the clock signal CLK is supplied to the coil CX(n) as the drive signal.

Accordingly, in a period in which the selection signal X-Out(n) is in the high level which is a selection state, the coil CX(n) generates the magnetic field which changes in synchronization with the clock signal CLK in the magnetic field generation period. As described in FIGS. 2A to 2D, the magnetic field energy is stored in the capacitive element C inside a pen if the pen is present in the vicinity of the coil CX(n) at this time. The coil inside the pen generates the magnetic field due to the magnetic field energy stored in the capacitive element C in the next magnetic field detection period. The magnetic field energy generated by the coil inside the pen is applied to the coil CX(n), so that a voltage of the coil CX(n) is changed. This change in voltage is transmitted to the input/output node XIO(n) of the selection circuit XSD via the fifth switch S5(n) in the ON state, and the selection circuit XSD outputs the voltage change as the detection signal Sx(n).

Although the description has been given by exemplifying the coil CX(n), the same applies to the other coils CX(0) to CX(n−1) and CX(n+1) to CX(p).

Incidentally, the operation of the selection circuit XSD described above is an operation during the touch detection period. Because of the touch detection period, the sense enable signal SE-EN becomes the high level. Thus, all the sixth switches S6(n−6) to S6(n+9) configuring the switching circuit DD4 are in the ON state as described also in the second embodiment. In addition, the fifth switch, except for the one receiving the selection signal X-Out of the high level as the switch control signal among the fifth switches configuring the switching circuit DD3, is in the OFF state.

The selection circuits YSD1 and YSD2 are configured in the same manner as the selection circuit XSD. That is, the selection circuits YSD1 and YSD2 sequentially set the selection signals Y-Out to the high level in order from the selection signal Y-Out(0) to the selection signal Y-Out(p) as the selection signal Y-CNT becomes the high level during the touch detection period. Accordingly, the eighth switch or the eleventh switch is turned into the ON state, and the clock signal CLK is supplied as the drive signal to the coil via the eighth switch or the eleventh switch in the ON state in the magnetic field generation period. In addition, the voltage change of the coil is supplied to the selection circuits YSD1 and YSD2 via the eighth switch or the eleventh switch in the ON state, and is output as the detection signals Sy(0) to Sy(p) in the magnetic field detection period.

Incidentally, since the inverted enable signal xSE-EN is in the low level during the touch detection period, the seventh switch of the switching circuit DD5 and the tenth switch of the switching circuit DD6 are turned into the OFF state. In addition, the ninth switch of the switching circuit DD5 and the twelfth switch of the switching circuit DD6 are turned into the ON state. Accordingly, the coils CY(0) to CY(p) are formed as described also in the third embodiment.

In this sixth embodiment, the coils CY(0) to CY(p) are alternately selected by the selection circuits YSD1 and YSD2. Thus, the selection circuit YSD2 sets the selection signal Y-Out(n+1) to the high level during the touch detection period after the selection circuit YSD1 has set the selection signal Y-Out(n) to the high level.

In addition, since the inverted enable signal xSE-EN is in the high level during the display period, the seventh switch of the switching circuit DD5 and the tenth switch of the switching circuit DD6 are turned into the ON state. Accordingly, the display drive signal is supplied from the switching circuits DD5 and DD6 to the drive electrodes TL(0) to TL(p) during the display period. Further, during the display period, the enable signal SE-EN becomes the low level, the selection signal X-Out also becomes the low level, and thus, the fifth switch in the switching circuit DD3 and the sixth switch in the switching circuit DD4 are turned into the OFF state. Accordingly, the signal lines SL(0) to SL(p) are electrically separated from the adjustment units KAD3 and KAD4, and the display is performed according to the image signal Sn.

<Overall Operation of Liquid Crystal Display Device with Touch Detection Function 1>

Figure 32:
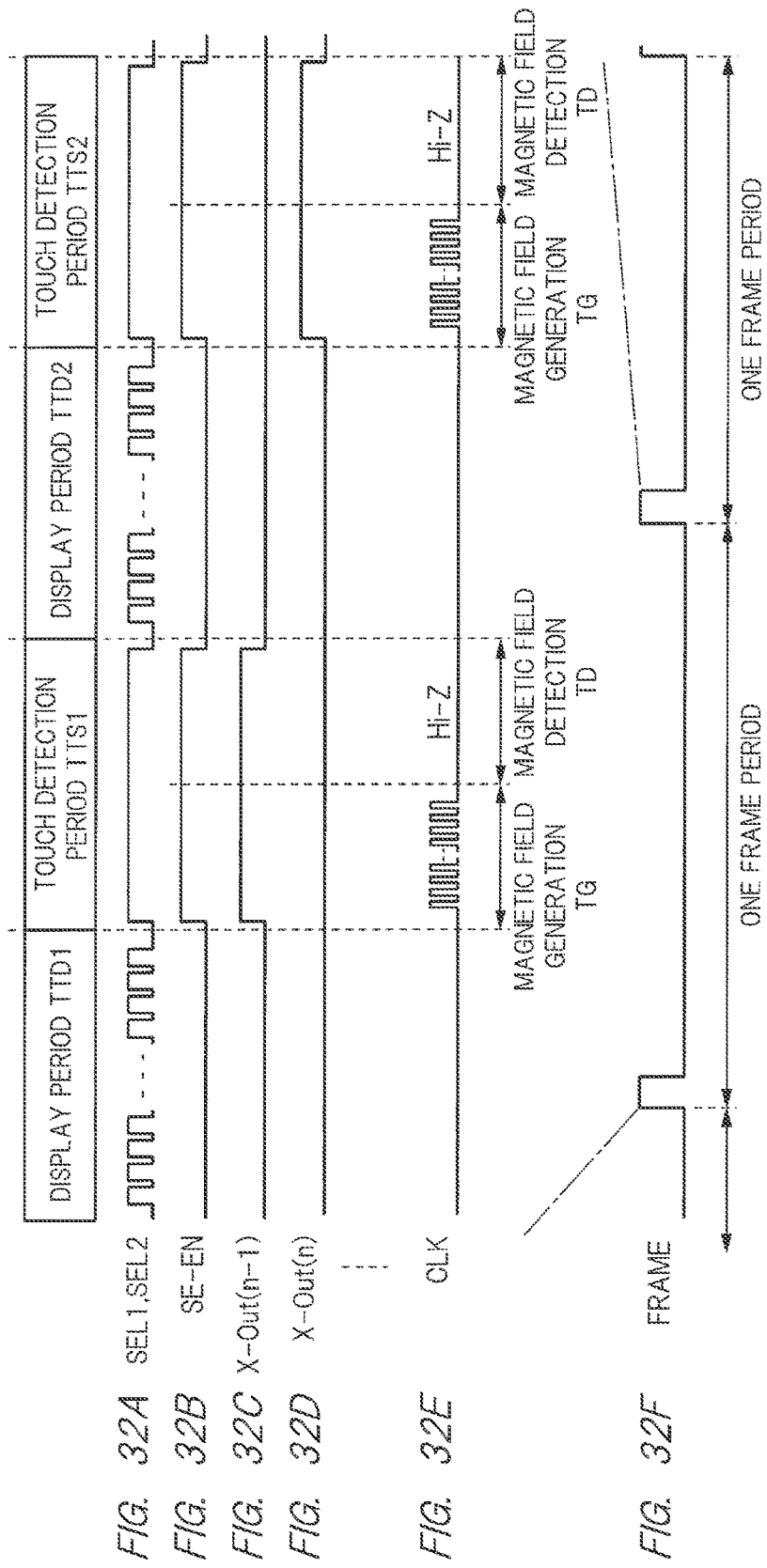
FIGS. 32A to 32F are waveform diagrams illustrating operations of the sixth embodiment.

FIGS. 32A to 32F are waveform diagrams illustrating operations of the liquid crystal display device 1 according to the sixth embodiment. The horizontal axis represents time, and the vertical axis represents voltage in FIGS. 32A to 32F. FIG. 32A illustrates the waveforms of the selection signals SEL1 and SEL2 that control the signal line selector 3, and FIG. 32B illustrates the waveform of the sense enable signal SE-EN. FIG. 32E illustrates the waveform of the clock signal CLK. The selection circuits XSD, YSD1 and YSD2 outputs the selection signals X-Out(0) to X-Out(p) and Y-Out(0) to Y-Out(p), but only waveforms of the selection signal X-Out(n−1) and the selection signal X-Out(n) are illustrated in FIGS. 32C and 32D as representatives in FIGS. 32A to 32F. In addition, FIG. 32F illustrates a cycle of a frame in the liquid crystal display device 1.

In this sixth embodiment, the driver semiconductor device DDIC is controlled such that display periods TTD1 and TTD2 and touch detection periods TTS1 and TTS2 are alternately generated in one frame period as illustrated in FIG. 32F. In this manner, a period in which the display is performed is increased in the one frame period, for example, by alternately generating the display period and the touch detection period in the one frame period, and thus, it is possible to reduce delay in the touch detection. The driver semiconductor device DDIC may alternately change a voltage of the sense enable signal SE-EN between the high level and the low level as illustrated in FIG. 32A in order to alternately generate a plurality of the display periods TTD1 and TTD2 and a plurality of the touch detection periods TTS1 and TTS2 in the one frame period. Accordingly, the switching circuit alternately supplies the display drive signal and the touch detection drive signal to the drive electrode, and thus, a display operation and the touch detection operation are alternately executed.

First, the sense enable signal SE-EN is set to the low level by the driver semiconductor device DDIC during the display periods TTD1 and TTD2. In addition, the selection signals X-Out and Y-Out from the selection circuits XSD, YSD1 and YSD2 are set to the low level, for example, as illustrated in FIGS. 32C and 32D. At this time, since the sense enable signal SE-EN is in the low level, the fifth switch and the sixth switch in the switching circuits DD3 and DD4 are turned into the OFF state. On the other hand, the seventh switch and the tenth switch in the switching circuits DD5 and DD6 are turned into the ON state.

Accordingly, the voltage VCOMDC, which is a drive voltage for the display, is supplied as the drive signal to the drive electrodes TL(0) to TL(p) via the seventh switch and the tenth switch. In addition, since the fifth switch and the sixth switch are turned into the OFF state, the signal lines SL(0) to SL(p) are electrically separated from the adjustment units KAD3 and KAD4.

The selection signals SEL1 and SEL2, although illustrated collectively as a single selection signal in FIG. 32A, are changed in a complementary manner during the display period. When the selection signals SEL1 and SEL2 are changed, the image signals Sn, which have been supplied from the signal line driver D-DRV (FIG. 27) in the driver semiconductor device DDIC to the signal line selector 3, are sequentially transmitted to suitable signal lines. In addition, the scan lines are sequentially set to the high level by the gate driver 5 during the display period. Accordingly, the voltage difference between the voltage VCOMDC to be supplied to the drive electrode and a voltage of the image signal Sn to be transferred to the signal line is applied to the pixel connected to the scan line in the high level, and the display is performed according to the voltage difference.

The driver semiconductor device DDIC sets both the selection signals SEL1 and SEL2 to the high level in the touch detection period TTS1. Accordingly, the signal line selector 3 connects all the signal lines SL(0) to SL(p) to the corresponding terminals SP (FIG. 29). In addition, the driver semiconductor device DDIC sets the sense enable signal SE-EN to the high level.

Accordingly, the seventh switch and the tenth switch in the switching circuit DD5 and DD6 are turned into the OFF state. In addition, the sixth switch in the switching circuit DD4 is also turned into the OFF state. At this time, when the selection circuit XSD set the selection signal X-Out(n−1) and the selection signal X-Out(n) to the high level and the low level, respectively, the fifth switch S5(n+5) receiving the selection signal X-Out(n−1) in the high level as the switch control signal is turned into the ON state, and the remaining fifth switches S5(n) and S5(n+6) receiving the selection signals X-Out(n) and X-Out(n+1) in the low level as the switch control signal are turned into the OFF state, among the fifth switches S5(n+6), S5(n) and S5(n+5) receiving the selection signal as the switch control signal as exemplified in FIGS. 32C and 32D. At this time, the fifth switches S5(n−5) to S5(n−1), S5(n+1) to S5(n+5) and S5(n+7) to S5(n+9), except for the fifth switches S5(n+6), S5(n) and S5(n+5) receiving the selection signal as the switch control signal, are turned into the ON state.

When the fifth switch S5(n−6) is turned into the ON state, the clock signal CLK illustrated in FIG. 32E is supplied as the drive signal for the touch detection to the signal line SL(n−6) via the fifth switch S5(n−6). At this time, the coil CX(n−1) is formed of the signal lines SL(n−6), SL(n−5), SL(n+2) and SL(n+3) as illustrated in FIG. 30. Thus, the magnetic field is generated in the coil CX(n−1). The selection circuit XSD manages the first period as the magnetic field generation period TG and the second period, subsequent to the first period, as the magnetic field detection period TD in a period in which the selection signal X-Out(n−1) is set to the high level. The selection circuit XSD outputs the clock signal CLK from the input/output node XIO(n−1) in the magnetic field generation period TG. In addition, the selection circuit XSD outputs the voltage change in the input/output node XIO(n−1) as the detection signal Sx(n−1) in the magnetic field detection period TD.

In the touch detection period TTS1, a voltage of the input/output node XIO(n−1) in the magnetic field detection period TD is different depending on whether the pen touches or comes close to the coil CX(n−1) corresponding to the selection signal X-Out(n−1). Thus, it is possible to perform detection on whether the pen touches or comes close to the coil, using the amplification and detection circuits AMP and DET (FIG. 27) of the touch control device 6.

The selection circuit XSD sets the selection signal (for example, X-Out(n)) except for the selection signal X-Out(n−1) to the low level in the touch detection period TTS1 (FIG. 32D). Accordingly, the fifth switch (for example, S5(n)), except for the selection signal X-Out(n−1), receiving the selection signal as the switch control signal is turned into the OFF state. As a result, the clock signal CLK is not supplied as the drive signal to the coils CX(0) to CX(n−2) and CX(n) to CX(p), except for the coil CX(n−1), and the magnetic field is not generated in these coils.

The selection circuit XSD changes the next selection signal X-Out(n) subsequent to the selection signal X-Out(n−1) to the high level, and changes the selection signal X-Out(n−1) to the low level in the touch detection period TTS2. Accordingly, the magnetic field is generated in the coil CX(n) corresponding to the selection signal X-Out(n) (the magnetic field generation period TG), similar to the touch detection period TTS1. Further, the detection on whether the magnetic field in the vicinity of the coil CX(n) changes is performed as the change in voltage of the input/output node XIO(n) in the magnetic field detection period TD.

The display periods TTD1 and TTD2 and the touch detection periods TTS1 and TTS2 described above are alternately repeated. The selection circuit XSD sequentially sets the selection signal, from the selection signal X-Out(0) toward X-Out(p), to the high level when repeating the touch detection period. Accordingly, it is possible to perform the display of the image and the detection of touch.

The same operation as the selection circuit XSD is performed regarding the selection circuits YSD1 and YSD2. That is, the selection signal X-Out(n−1) illustrated in FIG. 32C is substituted by the selection signal Y-Out(n−1), and the selection signal X-Out(n) is substituted by the selection signal Y-Out(n) illustrated in FIG. 32D. The magnetic field is generated sequentially in the coil CY(0) toward the coil CY(p) in the magnetic field generation period TG, and the detection of the magnetic field is performed in the magnetic field detection period TD. As a result, the detection on whether the pen touches or comes close to the coils CY(0) to CY(p) is performed.

The detection using the coils CX(0) to CX(p) and the detection using the coils CY(0) to CY(p) may be performed such that the detection of the coils CY(0) to CY(p) is performed after ending the detection of the coils CX(0) to CX(p), or the detection of the coils CX and the detection of the coils CY are alternately performed. Alternatively, the detection of the coils CX and the detection of the coils CY may be performed at the same time. In any case, the touch control device 6 obtains, with use of the processing circuit PRS (FIG. 27), the coordinate touched by the pen based on the detection signals Sx(0) to Sx(p) and Sy(0) to Sy(p) from the selection circuits XSD, YSD1 and YSD2, and outputs the obtained coordinate from the external terminal To as the coordinate information.

The signal lines SL(0) to SL(p) that transmit the image signal during the display period are also used as the wirings to form the coil during the touch detection period in the sixth embodiment. In addition, the drive electrode that transmits the display drive signal, and the auxiliary electrode are also used as the wirings to form the coil during the touch detection period. Accordingly, it is not necessary to add a wiring layer in order to form the coil to be used for obtaining the coordinate of the position touched by the pen, thereby suppressing the increase of the price.

In addition, since the coils to be formed during the touch detection period overlap with each other, it is possible to prevent generation of an area in which the accuracy of detection is degraded. Further, since the coil is configured by a multiple-turn winding, it is possible to achieve improvement of the detection accuracy.

Further, the selection circuits XSD, YSD1 and YSD2 sequentially select the coil during the touch detection period. Thus, it is possible to reduce the number of the signal wirings for the selection circuits XSD, YSD1 and YSD2, thereby preventing an increase in size of the liquid crystal display device 1.

Seventh Embodiment

FIGS. 33A to 33F are waveform diagrams illustrating operations of the liquid crystal display device 1 according to a seventh embodiment. A configuration of the liquid crystal display device 1 according to the seventh embodiment is the same as the configuration of the liquid crystal display device 1 according to the sixth embodiment. A difference from the sixth embodiment is an operation during the touch detection period. Thus, here, a description will be given regarding the operation different from that of the sixth embodiment here.

Figure 33:
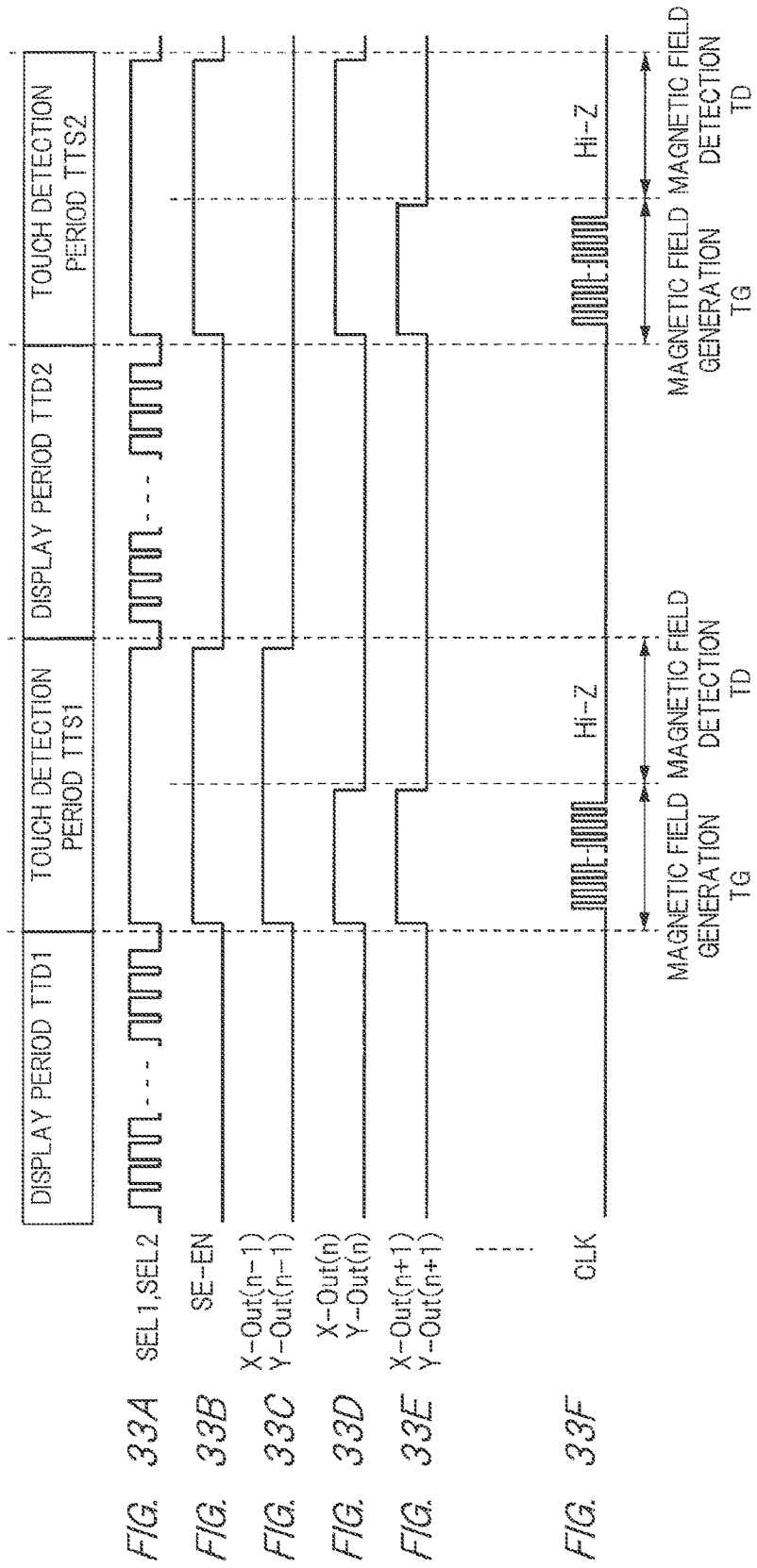
FIGS. 33A to 33F are waveform diagrams illustrating operations of a seventh embodiment.

The horizontal axis represents time and the vertical axis represents voltage in FIGS. 33A to 33F. FIG. 33A illustrates the waveforms of the selection signals SEL1 and SEL2 that control the signal line selector 3, and FIG. 33B illustrates the waveform of the sense enable signal SE-EN. FIG. 33F illustrates the waveform of the clock signal CLK. FIGS. 33A, 33B and 33F are the same as FIGS. 32A, 32B and 32E.

In the seventh embodiment, the selection circuits XSD, YSD1 and YSD2 operate differently from those of the sixth embodiment, and operate such that the plurality of coils generate the magnetic field in the magnetic field generation period. The waveforms of the selection signals X-Out(n−1) to X-Out(n+1) and the selection signals Y-Out(n−1) to Y-Out(n+1) are illustrated in FIGS. 33A to 33F as representatives of the selection signals X-Out(0) to X-Out(p) and Y-Out(0) to Y-Out(p) to be formed by the selection circuits XSD, YSD1 and YSD2. That is, FIG. 33C illustrates the waveforms of the selection signals X-Out(n−1) and Y-Out(n−1), FIG. 33D illustrates the waveforms of the selection signals X-Out(n) and Y-Out(n), and FIG. 33E illustrates the waveforms of the selection signals X-Out(n+1) and Y-Out(n+1).

Operations during the display periods TTD1 and TTD2 are the same as those of the sixth embodiment, and the selection signals SEL1 and SEL2, the sense enable signal SE-EN and the clock signal CLK are the same as those of the sixth embodiment. Thus, a description will be omitted regarding the operations during the display periods TTD1 and TTD2, and the selection signals SEL1 and SEL2, the sense enable signal SE-EN and the clock signal CLK.

In the seventh embodiment, the selection circuits XSD, YSD1 and YSD2 set the selection signals X-Out(0) to X-Out(p) and Y-Out(0) to Y-Out(p) to the high level in the magnetic field generation period TG during the touch detection period. In the magnetic field detection period TD subsequent to the magnetic field generation period TG, the selection circuits XSD, YSD1 and YSD2 maintains the high level of the selection signal corresponding to the coil disposed in an area in which the detection of touch is performed, and changes the remaining selection signals to the low level. In this manner, the clock signal CLK is supplied as the drive signal to each of the signal lines SL(0) to SL(p) in the magnetic field generation period TG. In addition, the clock signal CLK is also supplied as the drive signal to each of the drive electrodes TL(0) to TL(p) and the auxiliary electrode SM in the magnetic field generation period TG.

Since the signal lines SL(0) to SL(p) are disposed to be adjacent to each other, there is a parasitic capacitance between the signal wirings. Similarly, there is a parasitic capacitance also mutually between the drive electrodes TL(0) to TL(p) and the auxiliary electrodes SM. In the magnetic field generation period TG, it is necessary to charge the parasitic capacitance between two signal lines (drive electrodes), adjacent to each other, in a case where one signal line (drive electrode) of the two signal lines (drive electrodes) is fixed to a predetermined voltage, and a voltage of the other signal line (drive electrode) is changed by supplying the clock signal CLK to the other signal line (drive electrode) as the drive signal. In contrast, it is possible to reduce the charging of the parasitic capacitance by driving the plurality of signal lines (drive electrodes and the auxiliary electrodes) using the same clock signal in the magnetic field generation period as described above. In other words, it is possible to reduce the parasitic capacitance associated with the signal lines (drive electrodes and the auxiliary electrodes). As a result, it is possible to reduce the magnetic field generation period TG, and start the magnetic field detection period TD at an earlier timing, thereby achieving speeding-up of the detection.

An example will be described based on the selection signals illustrated in FIGS. 33A to 33F. The selection circuits XSD, YSD1 and YSD2 set each of the selection signal X-Out(n−1) to X-Out(p) and Y-Out(n−1) to Y-Out(p) to the high level in the magnetic field generation period TG during the touch detection period TTS1. Accordingly, the clock signal CLK is supplied as the drive signal to each of the coils CX(n−1) to CX(p) and CY(n−1) to CY(p) corresponding to the selection signals X-Out(n−1) to X-Out(p) and Y-Out(n−1) to Y-Out(p). Since the parasitic capacitances of the signal wiring, the drive electrode and the auxiliary electrode are reduced at this time, it is possible to make the change in voltage of the coil fast accompanying the change of the drive signal. As a result, it is possible to shorten the magnetic field generation period TG.

Next, in the magnetic field detection period TD, the selection circuits XSD, YSD1 and YSD2 change the other selection signals (X-Out(n), X-Out(n+1), Y-Out(n) and Y-Out(n+1)) to the low level in the state of maintaining the selection signals X-Out(n−1) and Y-Out(n−1), which correspond to the coils that detect the touch, in the high level. Accordingly, a state in which the coils CX(n−1) and CY(n−1) corresponding to the selection signals X-Out(n−1) and Y-Out(n−1) are connected to the input/output nodes of the selection circuits XSD and YSD2 is maintained. As a result, the selection circuits XSD and YSD2 outputs the detection signal indicating whether the pen touches or comes close to the coils CX(n−1) and CY(n−1).

In this seventh embodiment, the selection circuits XSD, YSD1 and YSD2 maintain the selection signals X-Out(n−1) and Y-Out(n−1) in the low level, and set each of the selection signals X-Out(n) to X-Out(p) and Y-Out(n) to Y-Out(p) to the high level in the magnetic field generation period TG during the next touch detection period TTS2. Thereafter, in the magnetic field detection period TD, the selection circuits XSD, YSD1 and YSD2 change the other selection signals (X-Out(n+1), Y-Out(n+1)) to the low level in the state of maintaining the selection signals X-Out(n) and Y-Out(n), which correspond to the coils that detect touch, in the high level. Accordingly, it is possible to output the detection signals of the coils CX(n) and CY(n) while achieving the shortening of the magnetic field generation period TG.

Hereinafter, the display period and the touch detection period are alternately repeated in the same manner.

According to the seventh embodiment, it is possible to achieve the speeding-up of the touch detection. In addition, the magnetic field generated by the coil CY and the magnetic field generated by the coil CX are superimposed in an area in which the coils CY(0) to CY(p) disposed in parallel in the column direction of the display panel 2 (the pixel array LCD) and the coils CX(0) to CX(p) disposed in parallel in the row direction intersect with each other in the magnetic field generation period TG during the touch detection period. Accordingly, it is possible to strengthen the magnetic field in the intersection area, and it is possible to increase the magnetic field energy to be stored in the pen. It is also possible to say that the intersection area corresponds to the coordinate of the touched position to be obtained.

Although FIGS. 33A to 33F illustrate the example in which the drive signal is not supplied to the coil for which the detection of the magnetic field has been ended in the magnetic field detection period TD, in the magnetic field generation period TG during the next touch detection period, the invention is not limited thereto. That is, the drive signal may be supplied to the coil for which the detection of the magnetic field has been ended in the magnetic field detection period TD, so as to generate the magnetic field in the magnetic field generation period TG during the next touch detection period.

In addition, although FIGS. 33A to 33F illustrate the example in which the magnetic fields of both the coil CX and the coil CY are detected in the magnetic field detection period TD by causing both the coil CX and the coil CY to generate the magnetic field in the magnetic field generation period TG during the touch detection period, the generation and detection of the magnetic field may be performed only for either one thereof.

Eighth Embodiment

Figure 34:
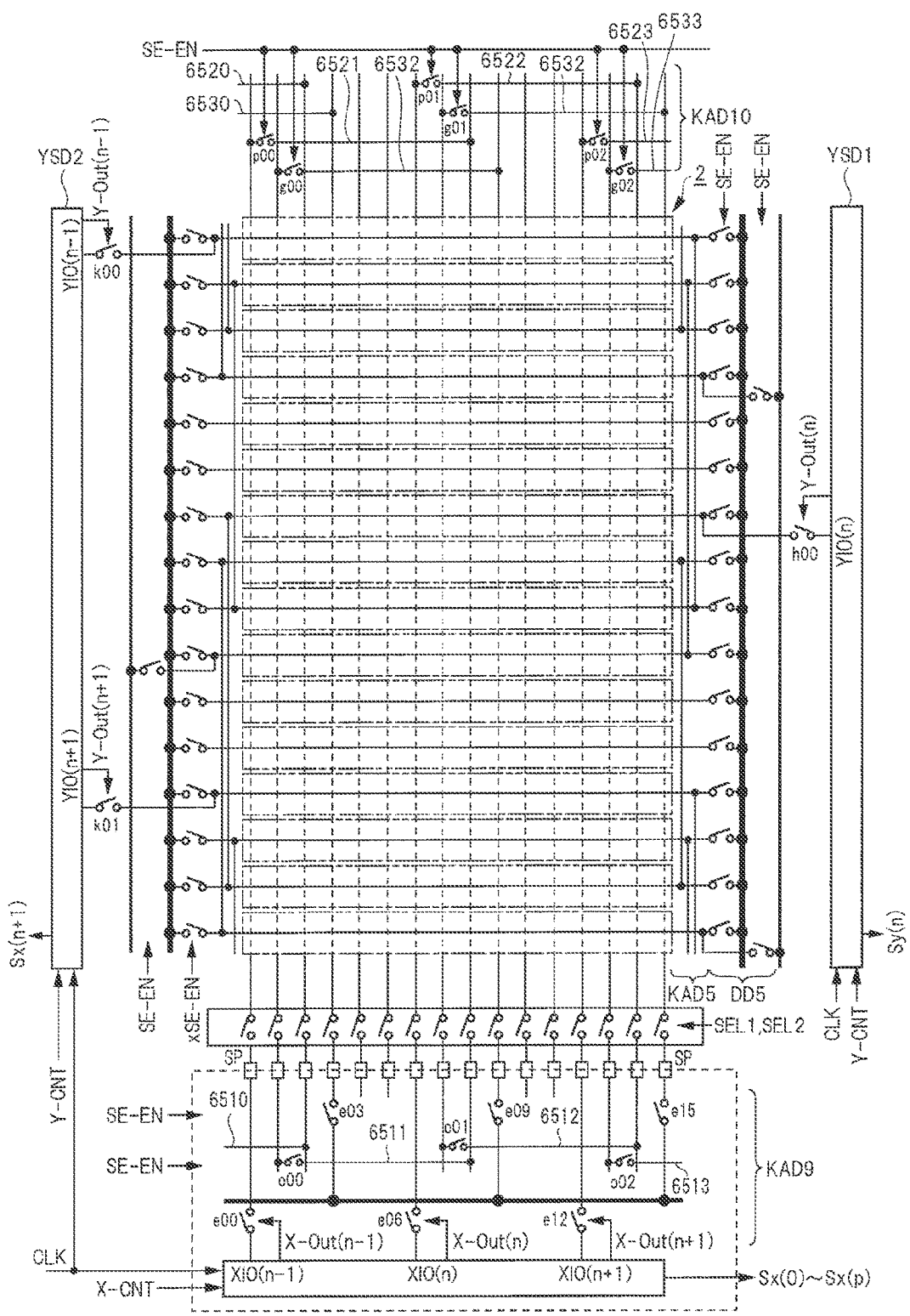
FIG. 34 is a block diagram illustrating a configuration of a liquid crystal display device according to an eighth embodiment.

FIG. 34 is a block diagram illustrating a liquid crystal display device according to an eighth embodiment. The eighth embodiment is similar to the sixth embodiment, and thus, differences will be mainly described here. When the block diagram of FIG. 31 according to the sixth embodiment is compared to the block diagram illustrated in FIG. 34, a portion different therebetween is that the adjustment units KAD3 and KAD4 and the switching circuits DD3 and DD4 illustrated in FIG. 31 are changed to the adjustment unit KAD9 and the adjustment unit KAD10.

In the eighth embodiment, the functions of the adjustment unit KAD4 and the switching circuit DD3 in the sixth embodiment are achieved by the adjustment unit KAD9. In addition, the functions of the adjustment unit KAD4 and the switching circuit DD4 in the sixth embodiment are achieved by the adjustment unit KAD10.

First, the adjustment unit KAD9 will be described. The adjustment unit KAD9 has the fifth switches S5(n−6), S5(n−3), S5(n), S5(n+3), S5(n+6) and S5(n+9) among the fifth switches S5(n−6) to S5(n+9), which have been included in the switching circuit DD3, and does not have the other fifth switches. In addition, the adjustment unit KAD9 has a fifteenth switch S15(n−1) functioning instead of the fifth switches S5(n−5) and S5(n+2), which have been included in the switching circuit DD3, a fifteenth switch S15(n) functioning instead of the fifth switches S5(n+1) and S5(n+8), and a fifteenth switch S15(n+1) functioning instead of the fifth switch S5(n+7). The fifteenth switches S15(n−1), S15(n) and S15(n+1) are drawn as fifteenth switches o00 to o02 in FIG. 34.

In addition, the adjustment unit KAD9 has signal wirings of the signal wirings 605-1(n−2) to 605-1(n+1) that have been included in the adjustment unit KAD3. In the adjustment unit KAD9, the signal wiring 605-1(n−1) is connected between the signal line SL(n−5) and the signal line SL(n+2) via the fifteenth switch S15(n−1) during the touch detection period. In addition, the signal wiring 605-1(n) is connected to the signal line SL(n+1) via the fifteenth switch S15(n) during the touch detection period. Further, the signal wiring 605-1(n−2) is connected to the signal line SL(n−4), and the signal wiring 605-1(n+1) is connected to the signal line SL(n+9) via the fifteenth switch o02 during the touch detection period.

The sense enable signal SE-EN is supplied as the switch control signal to the fifth switches S5(n−3), S5(n+3) and S5($n$+9), and the fifteenth switches S15($n$−2), S15($n$) and S15($n$+1). In addition, the fifth switches S5($n$−6), S5($n$) and S5($n$+6) of the adjustment unit KAD9 are controlled by the selection signals X-Out(n−1), X-Out(n) and X-Out(n+1) from the selection circuit XSD, similar to the switching circuit DD3.

The adjustment unit KAD10 has sixteenth switches S16-1($n$−1) to S16-1($n$+1) and S16-2($n$−1) to S16-2($n$+1), and the signal wirings 605-2($n$−2) to 605-2($n$+1) and 605-3($n$−2) to 605-3($n$+1) that have been included in the adjustment unit KAD4. Here, the sixteenth switch S16-1($n$−1) functions instead of the sixth switches S6($n$−6) and S6($n$+2), which have been included in the switching circuit DD4, and the sixteenth switch S16-2($n$−1) functions instead of the sixth switches S6($n$−5) and S6($n$+3). In addition, the sixteenth switch S16-1($n$) functions instead of the sixth switches S6($n$) and S6($n$+8), and the sixteenth switch S16-2($n$) functions instead of the sixth switches S6($n$+1) and S6($n$+9). Further, the sixteenth switch S16-1($n$+1) functions instead of the sixth switch S6($n$+6), and the sixteenth switch S16-2($n$+1) functions instead of the sixth switch S6($n$+7).

The sixteenth switches S16-1($n$−1) to S16-1($n$+1) are drawn as sixteenth switches p00 to p02 in FIG. 34, and the sixteenth switches S16-2($n$−1) to S16-2($n$+1) are drawn as sixteenth switches g00 to g02. The sense enable signal SE-EN is supplied as the switch control signal to these sixteenth switches.

When the switch enable signal SE-EN is set to the high level during the touch detection period, the fifteenth switch and the sixteenth switch are turned into the ON state. Accordingly, the coil CX(n−2) to the coil CX(n+1) are formed using the signal wiring and the signal line described above, similar to the sixth embodiment.

It is possible to reduce the number of switches according to the eighth embodiment, thereby achieving the reduction in size.

Ninth Embodiment

Figure 35:
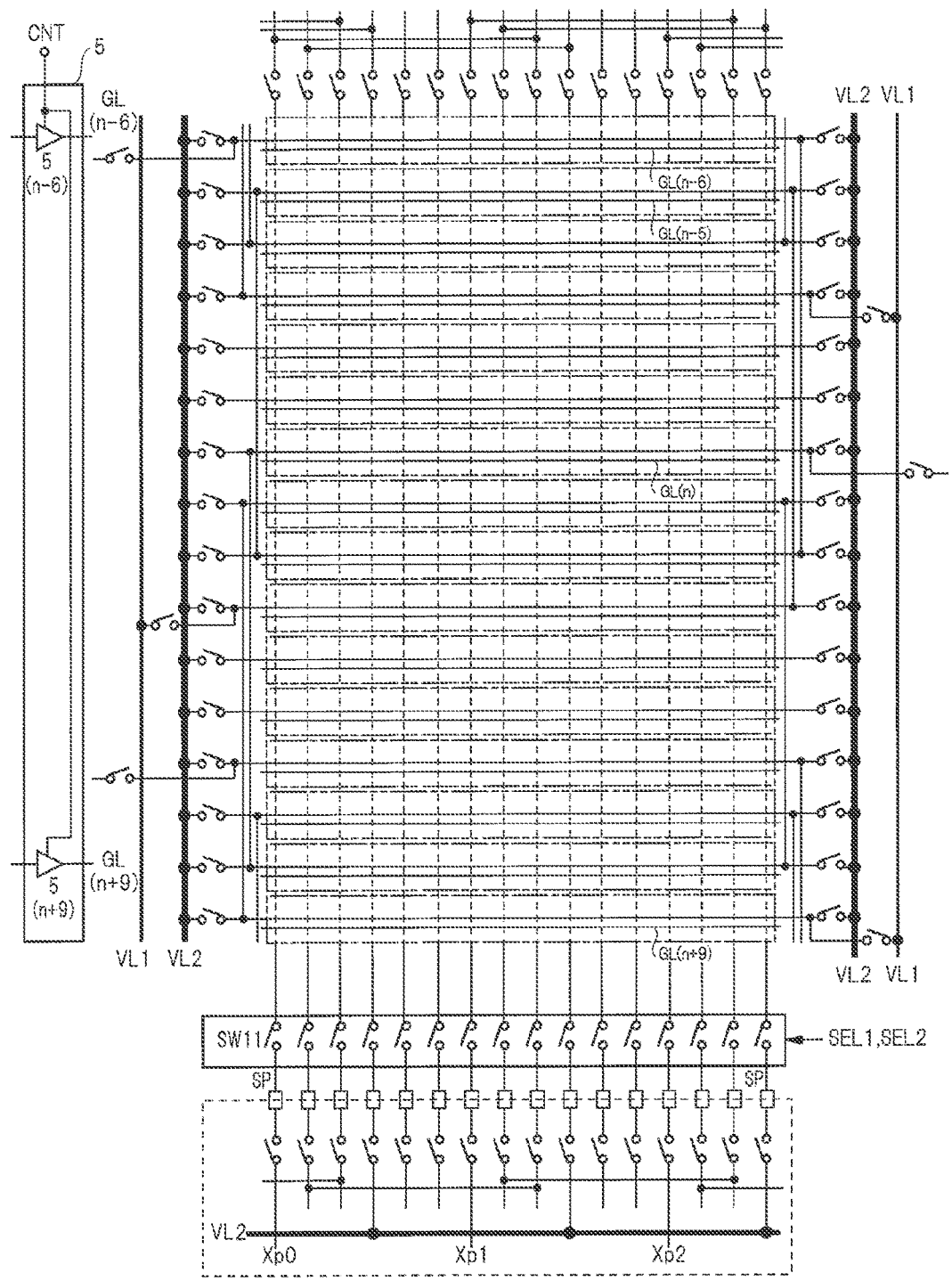
FIG. 35 is a block diagram illustrating a configuration of a liquid crystal display device according to a ninth embodiment.

FIG. 35 is a block diagram illustrating a configuration of a liquid crystal display device according to a ninth embodiment. In this ninth embodiment, the gate driver 5 is changed. The configurations of the display panel 2, the adjustment unit and the switching circuit may be the configurations of any embodiment except for the fourth embodiment. Here, a description will be given by exemplifying a case where the configurations of the display panel 2, the adjustment unit and the switching circuit are the same as those of the sixth embodiment.

The gate driver 5 (the scan line driving circuit) (FIGS. 5 and 27) has a plurality of unit gate drivers 5($n$−6) to 5($n$+9). In this embodiment, each of the unit gate drivers 5($n$−6) to 5($n$+9) is configured using a driver circuit capable of outputting three states. Each output of the unit gate drivers 5($n$−6) to 5($n$+9) becomes a high impedance state or a state in accordance with an input signal by the control signal to be supplied to the control terminal CNT. For example, each output of the unit gate drivers 5($n$−6) to 5($n$+9) becomes the high impedance state when the control signal to be supplied to the control terminal CNT is the low level. In contrast, each of the unit gate drivers 5($n$−6) to 5($n$+9) outputs a voltage of the high level or the low level according to the input signal to be supplied to each thereof when the control signal to be supplied to the control terminal CNT is the high level.

The control signal is supplied from the control circuit D-CNT to control terminals of the unit gate drivers 5($n$−6) to 5($n$+9). The control circuit D-CNT supplies the control signal of the low level to the control terminal CNT during the touch detection period. In contrast, the control circuit D-CNT supplies the control signal of the high level to the control terminal CNT during the display period. In addition, the control circuit D-CNT supplies the timing signal as the input signal of the unit gate drivers 5($n$−6) to 5($n$+9) during the display period. Accordingly, the unit gate drivers 5($n$−6) to 5($n$+9) outputs the scan line signal of the high level or the low level to the corresponding scan lines GL(n−6) to GL(n+9), respectively, according to the timing signal from the control circuit D-CNT during the display period. The voltage of the low level at this time is set to a low voltage in order to reliably turn off the thin film transistor forming the pixels.

In this ninth embodiment, the control circuit D-CNT sets each of the unit gate drivers 5($n$−6) to 5($n$+9) to be in the high impedance state by the control signal to be supplied to the control terminal CNT during the touch detection period.

For example, when a voltage of the low level is supplied from the gate driver 5 to the scan lines GL(0) to GL(p) during the touch detection period, it is necessary to charge the parasitic capacitance present between the drive electrode and the scan line in order to change the voltage of the drive electrode according to the drive signal when supplying the drive signal to the drive electrode during the touch detection period. Thus, there is a concern that the voltage change of the drive electrode is delayed.

Since the output of the gate driver becomes the high impedance state during the touch detection period in the ninth embodiment, the scan lines GL(n−6) to GL(n+9) become the floating state. Thus, it is possible to reduce the delay of the voltage change in the drive electrode. Accordingly, it is possible to achieve the improvement in the detection speed.

Tenth Embodiment

Figure 36:
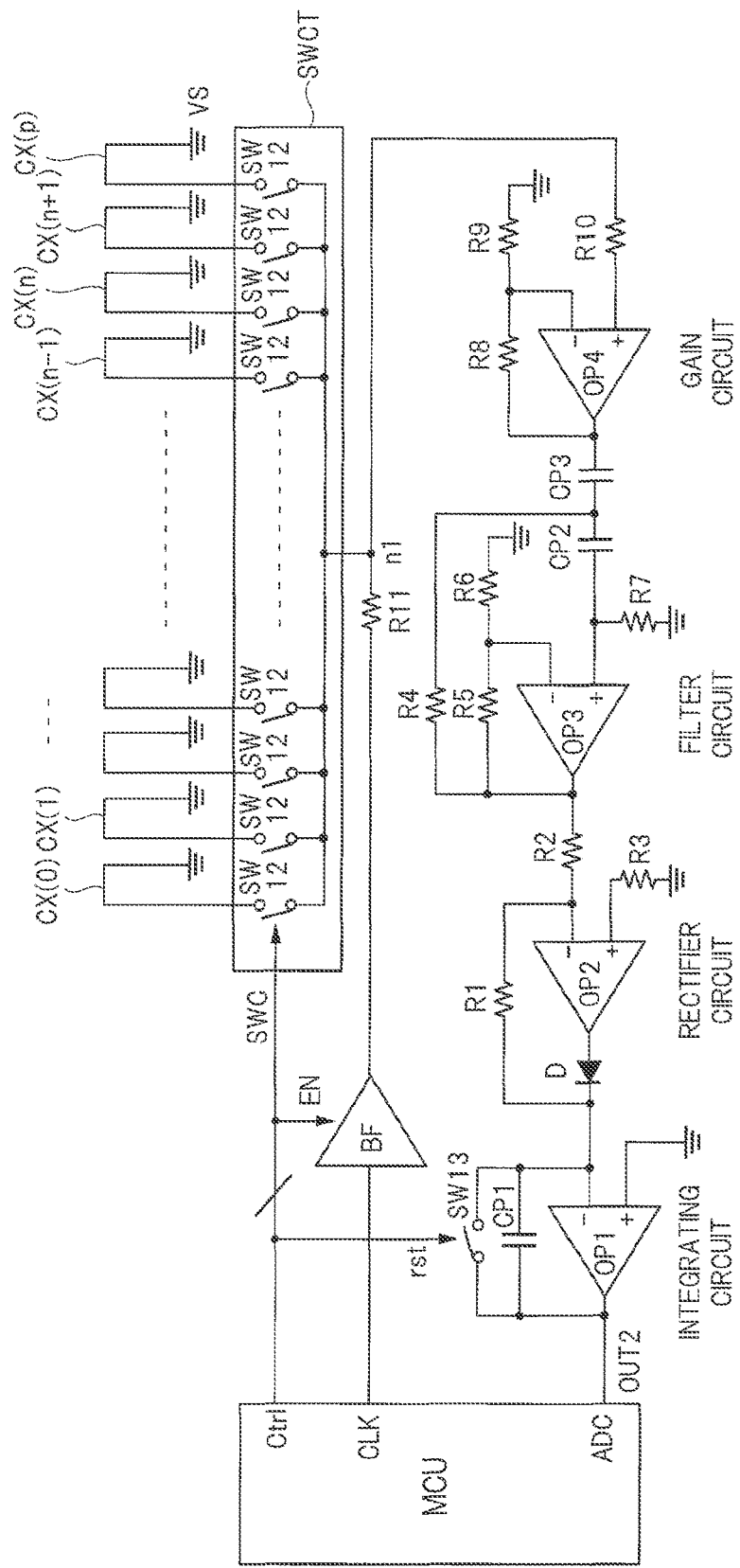
FIG. 36 is a circuit diagram illustrating a configuration of a liquid crystal display device according to a tenth embodiment.

FIG. 36 is a circuit diagram illustrating a configuration of a touch detection circuit of the liquid crystal display device 1 according to a tenth embodiment. In FIG. 36, CX(0) to CX(p) represent the coils to be formed during the touch detection period. In addition, SWCT represents a switch unit that has a plurality of switches SW12 to be controlled by switch control signals SWC. Here, the switches SW12 correspond to the fifth switches S5($n$−6), S5($n$) and S5($n$+9), illustrated in FIG. 29, for example, and the switch control signal SWC corresponds to the selection signals X-Out(n−1) to X-Out(n+1).

One end portion of each of the coils CX(0) to CX(p) is connected to the ground voltage Vs during the touch detection period, and the other end portion is connected to a node n1 via the corresponding switch SW12. A detection signal of the node n1 is supplied to a gain circuit, and is amplified by the gain circuit. The amplified detection signal is supplied to a filter circuit in order to remove noise, and an output of the filter circuit is rectified by a rectifier circuit, and then is supplied to an integrating circuit. An output of the integrating circuit is supplied to a microcontroller MCU.

The microcontroller MCU has an analog/digital conversion circuit, a clock signal generation circuit, a non-volatile memory in which a program is stored, and a processing unit that operates according to the program stored in the non-volatile memory, although these are not illustrated. The output from the above-described integrating circuit is supplied to the analog/digital conversion circuit via a terminal ADC of the microcontroller MCU, and is converted into a digital signal. The digital signal obtained by the conversion is processed by the processing unit, and the determination is performed on whether the pen is close to any one of the coils CX(0) to CX(p).

The processing unit of the microcontroller MCU forms a control signal according to the program. Examples of this control signal include the switch control signal SWC, an enable signal EN and a reset signal rst. In addition, a clock signal CLK with periodically changing voltage is generated by the clock signal generation circuit of the microcontroller MCU.

The clock signal CLK is supplied to a buffer circuit BF. The buffer circuit BF is controlled by the enable signal EN. When the enable signal CE is the high level, the clock signal CLK is supplied to the node n1 via a resistance R11. On the other hand, an output of the buffer circuit BF becomes the high impedance state (Hi-Z) when the enable signal EN is the low level.

The gain circuit has resistances R8 to R10, an operational amplifier OP4, and a DC cut capacitive element CP3. The detection signal is supplied to a positive phase input (+) of the operational amplifier OP4, and an inverting input (−) of the operational amplifier OP4 is connected to the ground voltage Vs via the resistance R9, and further, is connected to an output of the operational amplifier OP4 via the resistance R8.

The filter circuit has resistances R4 to R7, a capacitive element CP2, and an operational amplifier OP3. A positive phase input (+) of the operational amplifier OP3 is connected to the ground voltage Vs via the resistance R7, and an output signal from the gain circuit is supplied thereto via the capacitive element CP2. In addition, an inverting input (−) of the operational amplifier OP3 is connected to the ground voltage Vs via the resistance R6, and further, is connected to an output of the operational amplifier OP3 via the resistance R5. Further, the output of the operational amplifier OP3 is connected to an input of the filter circuit via the resistance R4.

The rectifier circuit has resistances R1 to R3, an operational amplifier OP2, and a diode D. A positive phase input (+) of the operational amplifier is connected to the ground voltage Vs via the resistance R3, and an output of the filter circuit is supplied to an inverting input (−) of the operational amplifier OP2 via the resistance R2, and further an output of the rectifier circuit is supplied thereto via the resistance R1. An output of the operational amplifier OP2 is output via the diode D.

The integrating circuit has a capacitive element CP1, a switch SW13 that receives the reset signal rst as the switch control signal, and an operational amplifier OP1. A positive phase input (+) of the operational amplifier is connected to the ground voltage Vs, and an inverting input (−) is connected to an output of the integrating circuit via the capacitive element CP1. In addition, the switch SW13 is connected between the output and an input of the integrating circuit.

FIGS. 37A to 37F are waveform diagrams illustrating operations of the touch detection circuit illustrated in FIG. 36. The horizontal axis represents time and the vertical axis represents voltage in FIGS. 37A to 37F. FIG. 37A illustrates a waveform of the clock signal CLK, FIG. 37B illustrates a waveform of the switch control signal SWC, and FIG. 37C illustrates a waveform of the enable signal EN. In addition, FIG. 37D illustrates a waveform of the reset signal rst, FIG. 37E illustrates a waveform of an output OUT1 of the gain circuit, and FIG. 37F illustrates a waveform of an output OUT2 of the integrating circuit.

FIGS. 37A to 37F illustrate the operation during the touch detection period, and the operation during the display period is not illustrated.

First, the reset signal rst is set to the low level at time t0, and accordingly, reset is released. At this time, the microcontroller MCU sets the enable signal EN to the high level. Accordingly, the clock signal CLK is supplied from the buffer circuit BF to the node n1 via the resistance R11. At this time, the microcontroller MCU outputs the switch control signal SWC such that all the switches SW12 corresponding to the coils CX(0) to CX(p), for example, are turned into the ON state. Accordingly, the clock signal CLK, which has been supplied to the node n1, is supplied to one end portion of each of the coils CX(0) to CX(p) as the drive signal.

The clock signal CLK, which has been supplied to the node n1, is also supplied to the gain circuit. The output OUT1 of the gain circuit is changed according to a voltage change of the clock signal CLK as illustrated in FIG. 37E. The output OUT1 of the gain circuit is supplied to the rectifier circuit via the filter circuit, and the rectified output is supplied to the integrating circuit. Although a voltage of the node n1 periodically changes, the output of the integrating circuit has a constant value from the time t0 to a time t1 because there is no change in terms of an envelope curve.

At the time t1, the microcontroller MCU sets the enable signal EN to the low level. Accordingly, the node n1 becomes the high impedance state (Hi-Z). In addition, the microcontroller MCU forms the switch control signal SWC such that the switch SW12 corresponding to the coil CX(n−1) is maintained in the ON state, and the other switches SW11 are turned into the OFF state, for example, at the time t1. Accordingly, a state in which the other end portion of the coil CX(n−1) is connected to the node n1 is maintained, and the other coils are separated from the node n1. In the examples of FIGS. 37A to 37F, the pen is not close to the coil CX(n−1) between the time t1 and the time t2, and thus, the magnetic field energy is not applied to the coil CX(n−1) from the pen. Thus, the output OUT2 of the integrating circuit is not changed.

The microcontroller MCU once sets the reset signal rst to the high level, and sets all of the switch control signals SWC to the low level before moving on to a time t2. Accordingly, the reset is performed, and then, the reset signal rst is set to the low level again to release the reset. The same operations as the operations from the time t0 to t1 are performed from the time t2 to t3.

At the time t3, the microcontroller MCU forms the switch control signal SWC such that the switch SW12 corresponding to the coil CX(n) is maintained in the ON state, and the switches SW12 corresponding to the other coils are turned into the OFF state, for example. The switch control signal SWC to be supplied to the switch SW12 corresponding to the coil CX(n) is drawn by the solid line, and the switch control signal SWC to be supplied to the other switches SW12 is drawn by the alternate long and short dash line (between the time t3 and the time t4) in FIG. 37B.

In addition, the microcontroller MCU sets the enable signal EN to the low level at the time t3. Accordingly, the node n1 becomes the high impedance state. At this time, the pen is present in the vicinity of the coil CX(n), and thus, the magnetic field energy is applied to the coil inside the pen and the capacitive element C (FIG. 2) from the coil CX(n) between the time t2 and t3, and the stored magnetic field energy is applied to the coil CX(n) from the pen from the time t3.

As a result, the output OUT1 of the gain circuit is attenuated while vibrating as illustrated in FIG. 37E. That is, the voltage is attenuated in terms of the envelope curve. The output OUT2 of the integrating circuit gradually increases, since the output OUT1 of the gain circuit is attenuated while vibrating from the time t3. The microcontroller MCU converts the output OUT2 of the integrating circuit into the digital signal, and thus determines that the pen is present. At this time, the microcontroller MCU is capable of grasping a position of a selected coil among the coils CX(0) to CX(p) by setting the switch control signal SWC to the high level, and thus, it is possible to determine a position at which the pen is present, that is, the touched position, the writing pressure of the pen and the like, from a value of the digital signal obtained by the conversion and the grasped position of the coil.

It is possible to determine the absence or presence of the pen, the writing pressure, and the like, by repeating the operations described above. Although the description has been given by exemplifying the coils CX(0) to CX(p), the same operations are performed regarding the coils CY(0) to CY(p). Accordingly, it is also possible to obtain the coordinate of a position at which the pen is present.

In the tenth embodiment, the resistance R9 of the gain circuit may be connected to the ground voltage Vs via a switch which is controlled by the reset signal rst. In this manner, it is possible to achieve reduction in power consumption. In addition, the resistance R11 is provided in order to limit current when the clock signal CLK is supplied, and thus, is not necessarily provided in a case where the resistance of the coil is relatively high.

Although the description has been given with the example in which the detection signals are acquired in parallel from the respective coils in the sixth embodiment, the common node n1 may be provided with respect to the plurality of coils as described in the tenth embodiment. In this manner, it is possible to reduce the number of detection signal lines between the coil and the touch semiconductor device, thereby suppressing an increase in area.

The drive electrode and the auxiliary electrode SM are configured of the wirings of the third wiring layer 605 as illustrated in FIG. 6. It is desirable that the drive electrode and the auxiliary electrode be configured of the plurality of drive electrodes and auxiliary electrodes, in a case where a coil for the touch detection is formed using the wiring (the signal line or the scan line) to be formed in the wiring layer (the second wiring layer or the first wiring layer) lower than the third wiring layer with respect to the pen.

For example, when a description is given by exemplifying the sixth embodiment, the signal line formed in the second wiring layer is used to form the coil for the touch detection. When the drive electrode is configured using one electrode at this time, an eddy current is generated in the drive electrode due to the magnetic field generated by the coil formed using the signal lines. Thus, the magnetic field reaching the pen decreases. Similarly, the amount of a magnetic field, which is generated by the pen, reaching the coil formed using the signal lines also decreases. In contrast, it is possible to narrow the area that generates the eddy current when the drive electrode is configured of the plurality of drive electrodes as described in the sixth embodiment, and thus, it is possible to reduce the decrease of the magnetic field by the drive electrodes. Each resistance of the drive electrodes increases when the drive electrode is configured of the plurality of drive electrodes. However, it is possible to reduce the resistance of the drive electrode (including the auxiliary electrode) at the time of forming the coil by causing the auxiliary electrode to be connected to the drive electrode and using the auxiliary electrode also as the wiring of the coil as described in the embodiment, thereby suppressing the decrease of the magnetic field to be generated.

In the category of the idea of the present invention, a person with ordinary skill in the art can conceive various modification examples and revised examples, and such modification examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

For example, the description has been given regarding a case where the common electrodes TL(0) to TL(p) and the signal lines SL(0) to SL(p) extend in the column direction and are disposed in the row direction in the embodiments, but the row direction and the column direction are changed depending on a point of view. A case where the common electrodes TL(0) to TL(p) and the signal lines SL(0) to SL(p) extend in the row direction and are disposed in the column direction, is also included in the scope of the invention.

Although the description has been given with the example in which the coil to be used during the touch detection period is the coil of a two-turn winding in the plurality of embodiments described above, the invention is not limited thereto. For example, the coil may be a coil of a single-turn winding or a coil of a three or more-turn winding. In addition, when a description is given regarding a case where the coils with a single-turn winding overlap with each other, one winding of each of the coils CX(n−1) and CX(n+1) is placed inside the winding of the coil CX(n), for example. When a case where the coil is configured using the drive electrodes is exemplified, one drive electrode of each of the coils CX(n−1) and CX(n+1) is placed inside the winding of the coil CX(n). Although the description has been given by exemplifying the coil CX(n), the same applies to the coil CY(n).

What is claimed is:
1. A display device comprising:
a pixel array that has a plurality of pixels disposed in a matrix form;
a plurality of scan lines that are disposed in each row of the pixel array;
a plurality of signal lines that are disposed in each column of the pixel array;
a plurality of pixel electrodes, wherein each of the plurality of pixel electrodes is included in a corresponding one of the plurality of pixels;
a plurality of thin film transistors, wherein each of the plurality of thin film transistors is included in the corresponding one of the plurality of pixels, and is coupled to a corresponding one of the plurality of pixels, a corresponding one of the plurality of scan lines, and a corresponding one of the plurality of signal lines; and
a plurality of common electrodes opposed to the plurality of pixel electrodes and coupled to an adjustment circuit,
wherein the adjustment circuit and the plurality of common electrodes forms coils that generate a magnetic field in a touch detection period, and wherein the plurality of common electrodes is configured to generate an electric field in a display period different from the touch detection period.

2. The display device according to claim 1,
wherein each of the plurality of common electrodes includes a transparent electrode and an auxiliary electrode coupled with each other.

3. The display device according to claim 2,
wherein the auxiliary electrode is coupled to the adjustment circuit and the auxiliary electrode has a smaller resistance value than the transparent electrode.

4. The display device according to claim 2,
wherein the adjustment circuit is disposed at an outer side of the pixel array, and causes the plurality of common electrodes to be electrically connected to each other to form the coils.

5. The display device according to claim 4, further comprising:
a first wiring layer, a second wiring layer and a third wiring layer that are electrically separated from each other,
wherein each of the plurality of scan lines is formed using each of a plurality of wirings of the first wiring layer, each of the plurality of signal lines is formed using each of a plurality of wirings of the second wiring layer, and a plurality of auxiliary electrodes are formed using each of a plurality of wirings of the third wiring layer, and
the plurality of the wirings of the third wiring layer are electrically connected to each other by each of the plurality of wirings of the first wiring layer or the second wiring layer in the adjustment unit.

6. The display device according to claim 5,
wherein the plurality of common electrodes are disposed in a row of the pixel array, and
the adjustment circuit has a wiring of the second wiring layer disposed in parallel with the column of the pixel array, and
the plurality of wirings of the third wiring layer are electrically connected by the wiring of the second wiring layer.

7. The display device according to claim 6, further comprising:
a switching circuit that is provided at an outer side of the pixel array,
wherein the switching circuit supplies a drive signal having a first voltage to each of the plurality of common electrodes at the display period, and supplies a drive signal with a periodically changing voltage value to the plurality of common electrodes to generate the magnetic field in the touch detection period for the external proximity object.

8. The display device according to claim 5,
wherein the adjustment circuit has a first adjustment circuit disposed along a first side of the pixel array and a second adjustment circuit disposed along a second side of the pixel array, which opposes the first side, and the coils are formed by causing the plurality of wirings of the third wiring layer, which form the plurality of common electrodes, to be electrically connected to each other by the wiring of the first wiring layer or the second wiring layer in each of the first adjustment circuit and the second adjustment circuit.

9. The display device according to claim 8, further comprising:
a scan line driving circuit that supplies a scan signal to the plurality of scan lines,
wherein the scan line driving circuit sets the plurality of scan lines to a floating state at the touch detection period.

10. The display device according to claim 2,
wherein the coils that generate the magnetic field are further formed by using the plurality of signal lines at the touch detection period.

11. The display device according to claim 10, further comprising:
an adjustment and selection circuit that is disposed at an outer side of the pixel array, and is connected to the plurality of signal lines,
wherein the adjustment and selection circuit causes the plurality of signal lines, which form the coils, to be electrically connected to each other at the touch detection period.

12. The display device according to claim 11, further comprising:
a first wiring layer, a second wiring layer and a third wiring layer that are electrically separated from each other,
wherein each of the plurality of scan lines is formed using each of a plurality of wirings of the first wiring layer, each of the plurality of signal lines is formed using each of a plurality of wirings of the second wiring layer, and the plurality of common electrodes are formed using each of a plurality of wirings of the third wiring layer, and
the adjustment and selection circuit is provided with a switch and the wiring of the first wiring layer or the wiring of the third wiring layer, and the wirings of the second wiring layer corresponding to the plurality of signal lines, which form the coils, are electrically connected to each other via the switch and the wiring of the first wiring layer or the wiring of the third wiring layer at the touch detection period.

13. The display device according to claim 12,
wherein the adjustment and selection circuit is provided with a first adjustment and selection circuit disposed along a first side of the pixel array, and a second adjustment and selection circuit disposed along a second side of the pixel array, which opposes the first side,
the winding coil of a multiple-turn winding is formed by causing a plurality of the wirings of the second wiring layer, which form the plurality of signal lines, to be electrically connected to each other via the switch and the wiring of the first wiring layer or the wiring of the third wiring layer in each of the first adjustment and selection circuit and the second adjustment and selection circuit, and
the touch detection period and the display period alternately generate in one frame.

14. The display device according to claim 2,
wherein a plurality of the coils are formed using the plurality of common electrodes,
the plurality of coils include a first coil and a second coil,
the first coil has a first common electrode and a second common electrode,
the second coil has a third common electrode and a fourth common electrode, and
the third common electrode is disposed between the first common electrode and the second common electrode such that the first coil and the second coil overlap with each other.

15. The display device according to claim 10,
wherein a plurality of the coils are formed using the plurality of signal lines, the plurality of coils include a first coil and a second coil,
the first coil has a first signal line and a second signal line,
the second coil has a third signal line and a fourth signal line, and
the third signal line is disposed between the first signal line and the second signal line such that the first coil and the second coil overlap with each other.

16. A display device comprising:
a pixel array that has a plurality of pixels disposed in a matrix form;
a plurality of scan lines that are disposed in each row of the pixel array;
a plurality of signal lines that are disposed in each column of the pixel array;
a plurality of common electrodes and a plurality of pixel electrodes for display an image in a display period; and
an adjustment circuit coupled to each of the plurality of common electrodes to form coils that generate a magnetic field in a touch detection period for detecting an external proximity object,
wherein the plurality of common electrodes are supplied with a display drive signal in the display period, the image according to an image signal is displayed on the pixel array, and the plurality of common electrodes is configured to generate an electric field in the display period,
wherein the coils are formed by using the common electrodes, and generate the magnetic field based on detection drive signal supplied to the common electrodes in the touch detection period, and
wherein the display period and the touch detection period are alternately generated in one frame period.

17. The display device according to claim 16,
wherein the detection drive signal is supplied to a common electrode forming a selected coil among the coils, and detection on whether the external proximity object is close to the selected coil is performed in the touch detection period.

18. The display device according to claim 16,
wherein the coils are further formed by using the plurality of signal lines in the touch detection period, the detection drive signal is supplied to a signal line forming a selected coil among the coils.

19. The display device according to claim 16,
wherein the detection drive signal is supplied to the common electrodes respectively forming the coils, and detection on whether the external proximity object is close to each of the coils is performed in the touch detection period.

20. The display device according to claim 19,
wherein the coils are further formed by using the plurality of signal lines in the touch detection period, the detection drive signal is supplied to the plurality of signal lines respectively forming the coils, and detection on whether the external proximity object is close to each of the coils is performed in the touch detection period.

* * * * *